US011016506B2

(12) United States Patent
Irwin, III et al.

(10) Patent No.: US 11,016,506 B2
(45) Date of Patent: May 25, 2021

(54) PROPULSOR TRIM PREDICTION FOR AIRCRAFT

(71) Applicant: THE BOEING COMPANY, Chicago, IL (US)

(72) Inventors: Joseph G. Irwin, III, Landenberg, PA (US); David G. Miller, Mount Laurel, NJ (US); Nathaniel T. Morgan, Downingtown, PA (US)

(73) Assignee: THE BOEING COMPANY, Chicago, IL (US)

( * ) Notice: Subject to any disclaimer, the term of this patent is extended or adjusted under 35 U.S.C. 154(b) by 668 days.

(21) Appl. No.: 15/986,663

(22) Filed: May 22, 2018

(65) Prior Publication Data

US 2019/0332126 A1 Oct. 31, 2019

Related U.S. Application Data

(60) Provisional application No. 62/662,674, filed on Apr. 25, 2018.

(51) Int. Cl.
*G05D 1/08* (2006.01)
*B64C 27/22* (2006.01)
(Continued)

(52) U.S. Cl.
CPC ......... *G05D 1/0808* (2013.01); *B64C 13/506* (2018.01); *B64C 19/00* (2013.01);
(Continued)

(58) Field of Classification Search
CPC ...... G05D 1/042; G05D 1/0808; B64C 27/22; B64C 29/0033
See application file for complete search history.

(56) References Cited

U.S. PATENT DOCUMENTS

| 3,791,208 A | 2/1974 | Miller |
| 4,129,275 A | 12/1978 | Gerstine et al. |
| 5,222,691 A | 6/1993 | Gold et al. |
| 5,330,131 A | 7/1994 | Burcham et al. |
| 6,041,273 A * | 3/2000 | Burken .................. B64C 15/02 244/182 |

(Continued)

FOREIGN PATENT DOCUMENTS

| EP | 0125088 A2 | 11/1984 |
| GB | 2136603 A | 9/1984 |

OTHER PUBLICATIONS

European Search Report for Application No. 19170532.6 dated Sep. 16, 2019, 8 pgs.

(Continued)

*Primary Examiner* — Alan D Hutchinson
*Assistant Examiner* — Andy Schneider
(74) *Attorney, Agent, or Firm* — Moore IP Law

(57) ABSTRACT

A control circuitry includes a first filter configured to filter a gravity compensated longitudinal acceleration of an aircraft to generate a filtered gravity compensated longitudinal acceleration. The propulsor trim control circuitry also includes a second filter configured to generate a filtered speed of the aircraft based on a speed of the aircraft. The propulsor trim control circuitry includes intermediary circuitry configured to generate a filtered longitudinal control effector error based on the filtered gravity compensated longitudinal acceleration and the speed. The propulsor trim control circuitry also includes a third filter configured to generate a filtered longitudinal thrust effector command value based on a longitudinal thrust effector command value. The propulsor trim control circuitry further includes output circuitry configured to generate a predicted longitudinal thrust effector trim value for a target horizontal state based on the filtered longitudinal control effector error and the filtered longitudinal thrust effector command value.

20 Claims, 20 Drawing Sheets

(51) Int. Cl.
  *B64C 29/00* (2006.01)
  *B64C 19/00* (2006.01)
  *B64C 27/52* (2006.01)
  *G05B 13/04* (2006.01)
  *B64C 27/56* (2006.01)
  *B64C 27/57* (2006.01)
  *B64C 13/50* (2006.01)
  *G05D 1/04* (2006.01)
  *B64C 27/82* (2006.01)

(52) U.S. Cl.
  CPC .............. *B64C 27/22* (2013.01); *B64C 27/52* (2013.01); *B64C 27/56* (2013.01); *B64C 27/57* (2013.01); *B64C 29/0033* (2013.01); *G05B 13/048* (2013.01); *G05D 1/042* (2013.01); *G05D 1/0816* (2013.01); *G05D 1/0858* (2013.01); *B64C 2027/8227* (2013.01); *B64C 2027/8236* (2013.01)

(56) References Cited

U.S. PATENT DOCUMENTS

| | | |
|---|---|---|
| 6,679,458 B2 | 1/2004 | Einthoven et al. |
| 7,438,259 B1 | 10/2008 | Piasecki et al. |
| 8,668,162 B1 | 3/2014 | Sonneborn |
| 8,694,182 B2 | 4/2014 | Cherepinsky |
| 2008/0237392 A1 | 10/2008 | Piasecki et al. |
| 2016/0052626 A1 | 2/2016 | Mey |

OTHER PUBLICATIONS

Carico, Dean, "Helicopter Controllability" Thesis, Naval Postgraduate School, Sep. 1989, 218 pgs.
Miller, David G., "Trim Prediction for Rotorcraft Flight Control," Presented at the Royal Aeronautical Society Rotorcraft Handling Qualities Conference, Liverpool, England, Nov. 6, 2008, 19 pgs.
Communication pursuant to Article 94(3) EPC for Application 19170532.6 dated Sep. 2, 2020, p. 5.

* cited by examiner

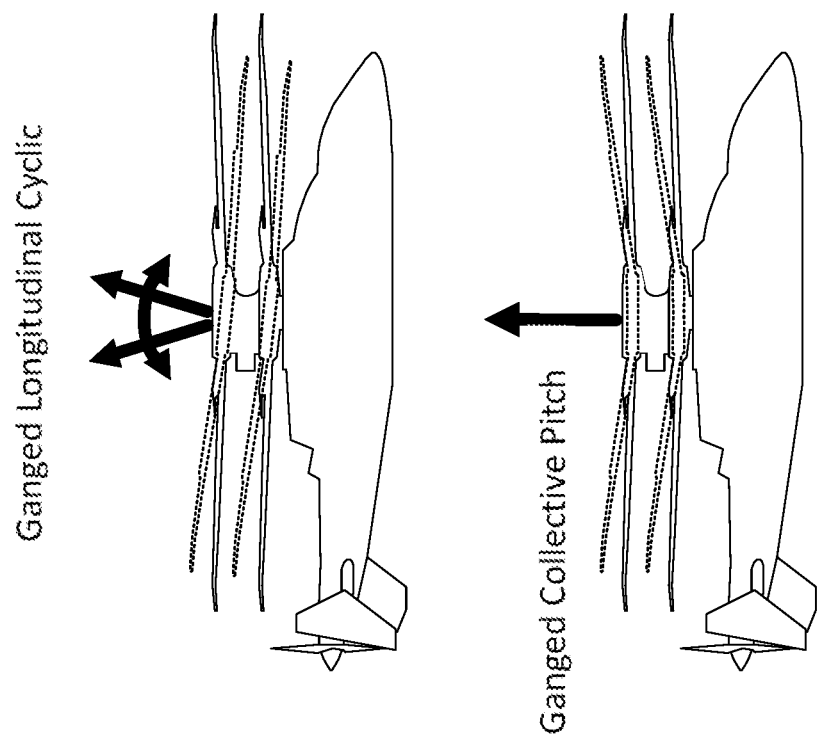
FIG. 2A
FIG. 2B
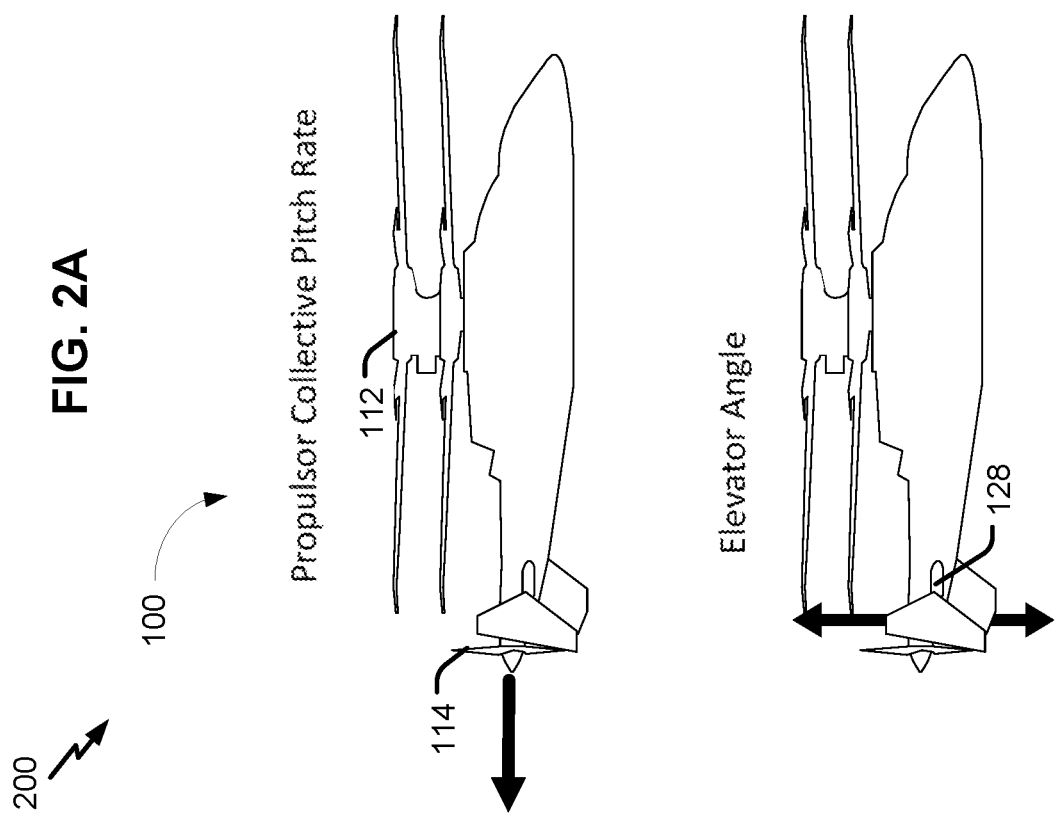
FIG. 2C
FIG. 2D

PROPULSOR TRIM PREDICTION FOR AIRCRAFT

CROSS-REFERENCE

This application claims priority from and the benefit of U.S. Provisional Patent Application No. 62/662,674, filed Apr. 25, 2018 and entitled "PITCH AND THRUST CONTROL FOR AIRCRAFT", the contents of which are expressly incorporated herein by reference in their entirety.

This application is related to U.S. patent application Ser. No. 15/986,581, filed on May 22, 2018 and entitled "PITCH AND THRUST CONTROL FOR COMPOUND AIRCRAFT", the contents of which are expressly incorporated herein by reference in their entirety.

This application is related to U.S. patent application Ser. No. 15/986,606, filed on May 22, 2018 and entitled "PITCH AND THRUST CONTROL FOR TILT-ROTOR AIRCRAFT", the contents of which are expressly incorporated herein by reference in their entirety.

This application is related to U.S. patent application Ser. No. 15/986,634, issued as U.S. Pat. No. 10,747,235, filed on May 22, 2018 and entitled "PITCH TRIM PREDICTION FOR AIRCRAFT", the contents of which are expressly incorporated herein by reference in their entirety.

FIELD OF THE DISCLOSURE

The present disclosure is generally related to propulsor trim prediction for aircraft.

BACKGROUND

Conventional rotorcraft (e.g., helicopters) require substantial pilot skill and workload for operation. As such, rotorcraft operators expend significant resources on pilot training and proficiency. High-speed Vertical Take-Off and Landing (VTOL) aircraft, such as compound aircraft (e.g., compound helicopters), tilt-rotor aircraft, and jump jets, are among the most complicated aircraft to pilot and require extensive training.

Such high-speed VTOL aircraft commonly require the pilot to simultaneously use five control inputs to control (indirectly control) two output states (e.g., airspeed and climb rate). For example, a tilt-rotor aircraft includes a first input to control pitch moment, a second input to control yaw moment, a third input to control roll moment, a fourth input to control proprotor thrust, and a fifth input to control proprotor shaft orientation. The pilot may have to coordinate all of these controls simultaneously to operate the aircraft. Additionally, such compound aircraft may include multiple trim solutions for specific states that are not intuitive, i.e., multiple solutions may exist to balance the moments and the thrust to achieve a desired state. For example, a particular trim solution may increase or minimize fuel burn, while another trim solution may reduce or minimize noise, and yet another trim solution may increase or maximize agility. Thus, with conventional controls the pilot cannot easily reconfigure the aircraft as the mission demands.

SUMMARY

In a particular implementation, a control circuitry includes a propulsor trim prediction circuitry and output circuitry. The propulsor trim prediction circuitry is configured to generate a predicted propulsor collective blade pitch trim value for an aircraft based on an aircraft velocity and a pitch attitude deviation from a reference. The output circuitry is configured to output a propulsor collective blade pitch angle command based on the predicted propulsor collective blade pitch trim value. The propulsor collective blade pitch angle command is configured to cause an adjustment in a collective blade pitch angle of a propulsor of the aircraft.

In another particular implementation, a control circuitry includes a propulsor trim prediction circuitry and output circuitry. The propulsor trim prediction circuitry is configured to generate a predicted proprotor nacelle trim value based on an aircraft velocity and a pitch attitude deviation from a reference. The output circuitry is configured to output a proprotor nacelle command based on the predicted proprotor nacelle trim value. The proprotor nacelle command is configured to cause an adjustment in a nacelle angle of a proprotor of an aircraft.

In another particular implementation, a control circuitry includes a pitch attitude trim prediction circuitry and output circuitry. The pitch attitude trim prediction circuitry is configured to generate a predicted pitch attitude trim value for an aircraft based on an aircraft velocity and a pitch attitude of the aircraft. The output circuitry is configured to output an aircraft pitch attitude trim command based on the predicted pitch attitude trim value and a pilot input signal from a pitch control inceptor. The aircraft pitch attitude trim command is configured to cause an adjustment in a pitch angle of the aircraft.

In a particular implementation, a propulsor trim control circuitry includes a first filter configured to filter a gravity compensated longitudinal acceleration of an aircraft to generate a filtered gravity compensated longitudinal acceleration. The propulsor trim control circuitry also includes a second filter configured to generate a filtered speed of the aircraft based on a speed of the aircraft. The propulsor trim control circuitry includes intermediary circuitry configured to generate a filtered longitudinal control effector error based on the filtered gravity compensated longitudinal acceleration and the filtered speed. The propulsor trim control circuitry also includes a third filter configured to generate a filtered longitudinal thrust effector command value based on a longitudinal thrust effector command value. The propulsor trim control circuitry further includes output circuitry configured to generate a predicted longitudinal thrust effector trim value for a target horizontal state based on the filtered longitudinal control effector error and the filtered longitudinal thrust effector command value. The predicted longitudinal thrust effector trim value is configured to cause a longitudinal thrust effector of the aircraft to be adjusted.

In a particular implementation, a pitch trim prediction circuitry includes a first filter configured to generate a filtered velocity based on a component of a vertical velocity of an aircraft. The pitch trim prediction circuitry also includes a second filter configured to generate a filtered pitch attitude based on a measured pitch attitude of the aircraft. The pitch trim prediction circuitry further includes output circuitry configured to generate a predicted pitch attitude trim value for a target vertical state based on a horizontal velocity of the aircraft, the filtered velocity, and the filtered pitch attitude. The predicted pitch attitude trim value is configured to cause a flight control effector to be adjusted.

In a particular implementation, a method for controlling an aircraft includes generating a predicted propulsor collective blade pitch trim value for a target state of the aircraft based on an aircraft velocity and a pitch attitude deviation from a reference. The method further includes adjusting a propulsor collective blade pitch angle of a propulsor of the aircraft based on the predicted propulsor collective blade pitch trim value.

In a particular implementation, a method for controlling an aircraft includes generating a predicted proprotor nacelle trim value for a target state of the aircraft based on an aircraft velocity and a pitch attitude deviation from a reference. The method further includes adjusting a nacelle angle of a proprotor of the aircraft based on the predicted proprotor nacelle trim value.

In another particular implementation, a method for controlling an aircraft includes generating a predicted pitch attitude trim value for a target state of an aircraft based on an aircraft velocity and a pitch attitude of the aircraft. The method also includes adjusting an aircraft pitch attitude command based on the predicted pitch attitude trim value and a pilot input signal from a pitch control inceptor.

In another particular implementation, a method of controlling an aircraft includes receiving a vertical velocity of the aircraft and a horizontal velocity of the aircraft. The method also includes filtering a component of the vertical velocity of the aircraft to generate a filtered vertical velocity. The method includes filtering a measured pitch attitude of the aircraft to generate a filtered pitch attitude. The method also includes generating a predicted pitch attitude trim value for a target vertical state, the predicted pitch attitude trim value generated based on the horizontal velocity, the filtered vertical velocity, and the filtered pitch attitude. The method further includes adjusting a flight control effector based on the predicted pitch attitude trim value.

In another particular implementation, a method of controlling an aircraft includes filtering a gravity compensated longitudinal acceleration of the aircraft to generate a filtered gravity compensated longitudinal acceleration. The method also includes filtering a speed of the aircraft to generate a filtered speed of the aircraft. The method includes generating a filtered longitudinal control effector error based on the filtered gravity compensated longitudinal acceleration and the filtered speed. The method also includes filtering a longitudinal thrust effector command value to generate a filtered longitudinal thrust effector command value. The method includes generating a predicted longitudinal thrust effector trim value for a target horizontal state based on the filtered longitudinal control effector error and the filtered longitudinal thrust effector command value. The method further includes adjusting a longitudinal thrust effector of the aircraft based on the predicted longitudinal thrust effector trim value.

By using pitch trim prediction, propulsor trim prediction, or both, flight control surfaces and thrust effectors of the aircraft can be controlled with less pilot input and produce more optimized or enhanced flight operations. Accordingly, pilot demand and workload are decreased, which may lead to reduced training, reduced pilot errors, and increased pilot satisfaction. Additionally, by using pitch trim prediction, propulsor trim prediction, or both, efficiency and/or operational capabilities of the aircraft are increased.

BRIEF DESCRIPTION OF THE DRAWINGS

FIGS. 2A, 2B, 2C, and 2D are each a diagram that illustrates controls of a compound helicopter;

DETAILED DESCRIPTION

Figure 1:
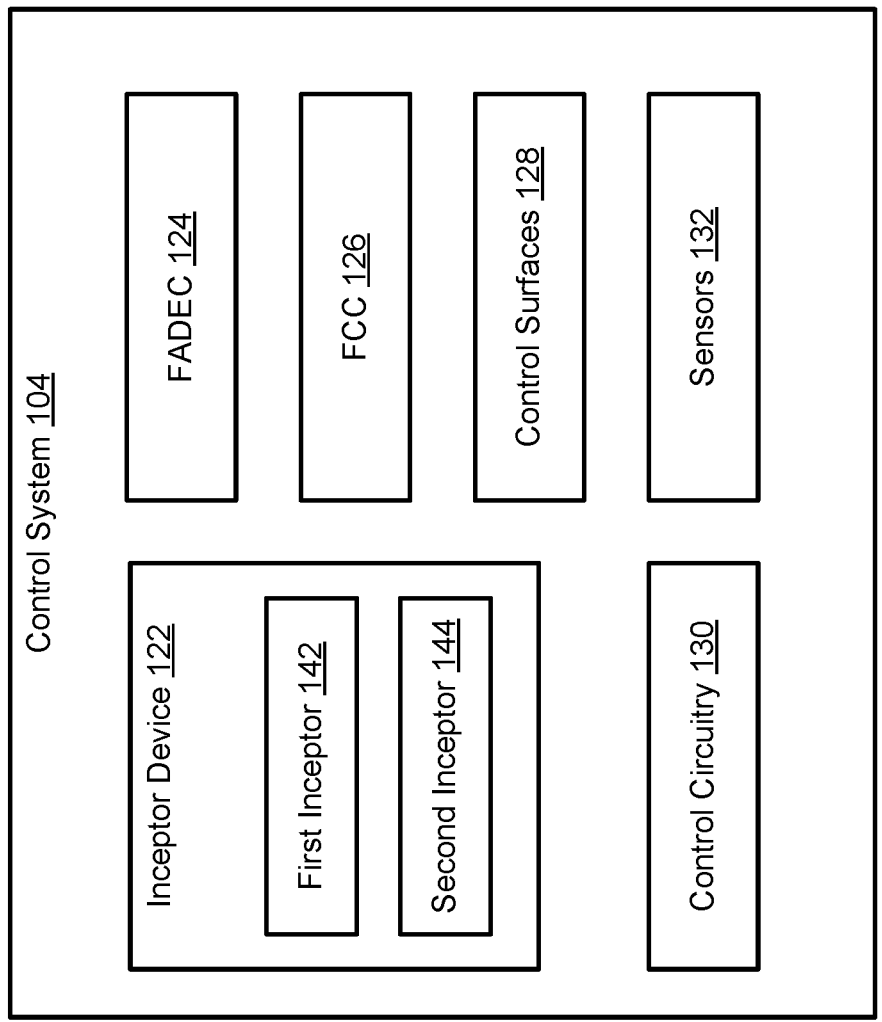
FIG. 1 is a block diagram that illustrates an example of an aircraft including a control system.
Figure 1:
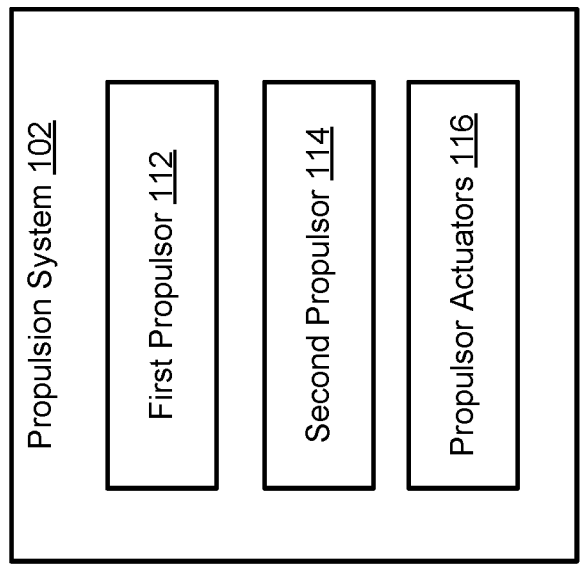

Implementations disclosed herein include control circuitry for compound aircraft having pitch trim prediction circuitry, propulsor trim prediction circuitry, or both. Such control circuitry enables more efficient control of the compound aircraft and improved performance with fewer pilot inputs (or autopilot inputs). The pitch trim prediction circuitry provides for automatic aircraft (e.g., fuselage) pitch control and automatic main rotor collective control. With the pitch trim prediction circuitry, pilots of compound aircraft fly like a helicopter in a low-speed regime (with a gravity amplifier) and fly like an airplane in a high-speed regime. Additionally, in the high speed regime, the aircraft pitch trim is automatically controlled (e.g., independent of additional pilot control inputs) such that vertical acceleration is maintained at zero and rate of climb is maintained at a desired value, where the desired value of rate of climb/descent can be zero or non-zero. Aft cyclic control pressure (e.g., moving the cyclic inceptor rearwards) in high-speed flight commands pitch rate and climb rate with automatic main rotor and propeller pitch control to hold airspeed constant and maximize the climb rate. Similarly, forward pressure on an inceptor (e.g., an acceleration thumbwheel) in high-speed flight commands an increase in airspeed through an increase in longitudinal thrust (e.g., by an increase in propeller collective blade pitch) while main rotor collective and aircraft pitch attitude are automatically controlled to maintain a desired rate of climb or descent, where the desired rate of climb or descent can be zero or non-zero.

The propulsor trim prediction circuitry (e.g., longitudinal thrust trim prediction circuitry) uses commanded propulsor values (e.g., propeller collective blade pitch), inertial sensor data, and dynamic inversion control to calculate propulsor variables for zero acceleration (rate of change of speed or v-dot). A propulsor variable can be adjusted to a command acceleration based on pilot inceptor inputs, thereby providing a flexible inner loop controller that can be coupled to any pilot inceptor and tailored based upon different flight regimes and mission tasks. The control circuitry overcomes non-linear characteristics introduced by propeller torque limits, propeller pitch angle limits, propeller pitch actuator rate limits, propeller stall, and propeller reverse torque and overcomes non-linear propeller response near zero torque.

The control circuitry enables increased airspeed-select performance as compared to conventional solutions, which exhibit overshoots (e.g., from integrator wind-up caused by using integral feedback). For example, when a pilot changes states or selects a new value for a current state, conventional control circuitry causes the aircraft to overshoot the desired value and then undershoot the desired value before settling on the desired value. During this time, pilots often try to correct the over or undershoots, which further exacerbates the delay until the aircraft achieves and maintains the desired value. Additionally, the control circuitry is also more robust to disturbances and changes in drag caused by external loads, external stores, landing gear deployment, etc.

As compared to conventional control circuitry for compound aircraft, the pilot commands two output states directly, rather than three or more intermediate states that affect the two output states relevant to flight path control. With the control circuitry, the pilot is not required to control a fifth control input (e.g., the collective stick) in high-speed flight. This reduces the control strategy to include four control inputs to control 2 (or 4) aircraft states. Similarly, in order to preserve helicopter-like handling qualities in low-speed flight, the pilot is not required to control a particular inceptor (e.g., the acceleration thumbwheel) and commands longitudinal acceleration instead through longitudinal cyclic stick inputs as in a conventional helicopter. In order to retain complete aircraft capability, in some implementations the fifth control input is available to the pilot in both modes. However, simultaneously working all five control inputs is not required to achieve a desired flight trajectory. For instance, additional inputs are provided to the pilot to command level-body acceleration, level-body climb, and constant speed trim pitch attitude adjustments for specific instances where this capability is desired. In these instances, the control circuitry reduces the workload associated with coordinating control inputs to achieve the desired response. Furthermore, in conventional compound aircraft, an airspeed hold is a separate mode that the pilot engages when desired, and the airspeed hold mode is not part of the primary flight control system (i.e., is not automatically engaged by the control circuitry based on one or more conditions). Thus, by using control circuitry with pitch trim prediction, propulsor trim prediction, or both, pilot workload is reduced and the aircraft has increased efficiency and improved performance and/or capabilities.

FIG. 1 illustrates a block diagram of an example of an aircraft 100 that includes a propulsion system 102 and a control system 104. The control system 104 is configured to control the propulsion system 102 and control surfaces 128 of the aircraft 100. The control system 104 receives inputs (e.g., pilot or autopilot inputs), and the control system 104 controls (e.g., directly controls) output states of the aircraft 100 based on the inputs. The aircraft 100 may include or correspond to a compound aircraft, such as a compound helicopter, a vertical take-off and landing (VTOL) aircraft, a tilt-rotor aircraft, etc. The aircraft 100 may be manned or autonomous.

The propulsion system 102 includes a first propulsor 112, a second propulsor 114, and one or more propulsor actuators 116. Although two propulsors 112, 114 are illustrated in FIG. 1, in other implementations, the propulsion system 102 includes one or more additional propulsors. The propulsors 112, 114 of the propulsion system 102 may include different types of propulsors. For example, in a first implementation, the first propulsor 112 includes or corresponds to a main rotor (e.g., a vertical propulsor) of the aircraft 100, and the second propulsor 114 corresponds to a propeller (e.g., a longitudinal thruster or propulsor) of the aircraft 100. Alternatively, the second propulsor 114 may include or correspond to other type of longitudinal thrusters, such as a ducted fan, a contra-rotating fan, a turbojet engine, a turbofan engine, a rocket, etc. In other implementations, the first and second propulsors 112, 114 are the same type of propulsor. For example, the aircraft 100 is a tilt-rotor aircraft, and the first and second propulsors 112, 114 correspond to proprotors of the aircraft 100.

The one or more propulsor actuators 116 are coupled to one or more of the propulsors 112, 114 and are configured to adjust one or more propulsors 112, 114 of the propulsion system 102. For example, a first propulsor actuator is configured to adjust a collective blade pitch angle of propeller blades of the first propulsor 112. As another example, the first propulsor actuator is configured to adjust a nacelle angle (or a rate of change of the nacelle angle) of the first propulsor 112.

The control system 104 includes at least one inceptor device 122, a full authority digital engine control (FADEC) 124, a flight control computer (FCC) 126, multiple control surfaces 128, a control circuitry 130, and sensors 132. The inceptor device 122 is configured to control various components of the aircraft 100. The inceptor device 122 include one or more inceptors 142, 144 each configured to control a particular component or components of the aircraft 100. As illustrated in FIG. 1, the inceptor device 122 include a first inceptor 142 and a second inceptor 144. As an illustrative example, the inceptor device 122 includes or corresponds to a cyclic stick which is moveable in multiple axes (e.g., first and second inceptors, one for each axis) and includes a thumbwheel (e.g., a third inceptor). Other inceptor devices include foot pedals and a collective stick (e.g., fourth and fifth inceptors).

The FADEC 124 is configured to control the propulsion system 102 responsive to signals from the inceptor device 122, the FCC 126, or a combination thereof. For example, the signals from the inceptor device 122 may be routed through the FCC 126 and processed by the FCC 126. In other implementations, the control system 104 does not include the FADEC 124. The FCC 126 is configured to control operation of the aircraft 100. The FCC is configured to receive signals from one or more components of the aircraft 100, process the signals, and outputs commands to one or more components of the aircraft 100.

The multiple control surfaces 128 are configured to adjust the aircraft 100 in flight responsive to signals from the FCC 126. The multiple control surfaces 128 may include or correspond to elevators, ailerons (e.g., flaperons), rudder, flaps, etc. Such control surfaces, generally are using in high speed flight (e.g., airplane mode) and have less impact or effect in low speed flight (e.g., helicopter mode).

The control circuitry 130 is configured to predict an aircraft pitch attitude trim value (a predicted pitch attitude trim value) and a propulsor trim value (a predicted propulsor trim value). The predicted pitch attitude trim value represents an estimated pitch attitude of the aircraft 100 used to trim the aircraft 100 to a particular state (e.g., an airspeed hold, an altitude hold, a vertical velocity hold, an acceleration hold, etc.). For example, the estimated pitch attitude value can be used to determine a setting for a particular control surface 128 that will cause the particular control surface 128 to adjust the pitch attitude of the aircraft 100 to trim the aircraft 100 to a particular state. The predicted propulsor trim value represents an estimated propulsor value (e.g., an estimated value of a collective blade pitch, a nacelle angle, a nacelle angular rate, a nozzle size, a nozzle direction, a fuel flow rate, etc.) of one or more of the propulsors 112, 114 used to trim the aircraft 100 to a particular state. For example, the estimated propulsor value is configured to cause the propulsor to generate a particular magnitude and/or direction of thrust to trim the aircraft 100 to a particular state. The control circuitry 130 may be included in the FCC 126, included in the FADEC 124, or may be separate from the FADEC 124 and/or the FCC 126.

The sensors 132 are configured to generate sensor data regarding the aircraft 100. For example, the sensors 132 include one or more of a pitot static tube, an accelerometer, a gyroscope, etc. The sensors outputs sensor data indicating velocity, acceleration, attitude altitude, etc. The sensors 132 output the sensor data to the FCC 126.

During operation of a compound helicopter (a particular aircraft 100) in a first flight regime (e.g., at a speed below a speed threshold), the pilot (or autopilot) controls the aircraft 100 similar to a conventional helicopter. For example, the pilot uses the collective and the inceptor device 122 (e.g., a cyclic) to fly the aircraft 100. To illustrate, the pilot can use the collective to increase vertical speed by commanding a collective blade pitch angle increase in the first propulsor 112 (e.g., a main rotor), and the pilot can use the inceptor device 122 (e.g., the cyclic) to increase longitudinal speed by commanding an increase in forward tilt of the first propulsor 112 (e.g., the main rotor) forward.

The aircraft 100 changes flight regimes in response to an increase in speed above the speed threshold. In the second regime, the pilot controls the aircraft 100 similar to a conventional airplane. For example, the pilot controls the aircraft 100 by moving the inceptor device 122 (which controls the control surfaces 128) and by controlling thrust of the second propulsor 114. To illustrate, the pilot controls the second inceptor 144 (e.g., a thumbwheel) of the inceptor device 122 to increase longitudinal thrust of the second propulsor 114. When the second propulsor 114 is a propeller, the propulsor actuator 116 receives a command to adjust the collective blade pitch of the propeller, which increases thrust of the second propulsor 114. As compared to conventional control systems, the aircraft 100 is controlled independent of the collective input device, and the pilot does not have to manage a fifth task (e.g., the collective in high speed flight). The pilot can choose to manage the fifth control input to directly control collective blade pitch of the first propulsor 112.

In other implementations, such as where a different type of second propulsor 114 is used in conjunction with the main rotor (the first propulsor 112), other aspects of the second propulsor 114 may be adjusted. For example, when the second propulsor 114 is a jet engine the longitudinal thrust may be adjusted by adjusting a fuel flow rate, a nozzle size, a bypass ratio, thrust bleeding, or thrust vectoring.

In another implementation for tilt-rotor aircraft (another particular type of aircraft 100), the pilot controls the aircraft 100 similar to a conventional helicopter or a conventional VTOL aircraft in the first regime. Upon a change to the second regime, the first and second propulsors 112, 114 tilt forward, and the pilot controls the aircraft 100 similar to a conventional airplane. When the first and second propulsors 112, 114 are tilt-rotors (known as proprotors), the propulsor actuator 116 receives a command to adjust a nacelle angle of the tilt-rotors (e.g., a pitch angle or orientation of the proprotors). In some implementations, the command indicates the adjustment to the nacelle angle in an angle value (e.g., radians). In other implementations, the command indicates the adjustment to the nacelle angle in an angular rate (e.g., rate of change of the nacelle angle). By a adjusting a direction of the thrust vector generated by the propulsors 112, 114, the longitudinal thrust and speed of the aircraft 100 is controlled to operate the aircraft in a desired state.

The control system 104 of the aircraft 100 reduces pilot workload, enables the aircraft 100 to fly more efficiently, and enables the aircraft 100 to have increased capabilities. For example, by replacing a conventional control system of a particular aircraft 100 with the control system 104, the particular aircraft 100 can increase sprint times by 30 percent and produce more consistent sprint times.

FIGS. 2A-2D illustrate the effects caused by inceptors of the aircraft 100. As illustrated in FIGS. 2A-2D, the aircraft 100 is a compound helicopter. FIG. 2A illustrates force (thrust) changes caused by adjusting propulsor collective blade pitch angle. FIG. 2B illustrates force changes caused by longitudinal (fore and aft) adjustments of the main rotor (e.g., the first propulsor 112) via the cyclic (e.g., the inceptor device 122). FIG. 2C illustrates force changes caused by elevator pitch angle adjustments via the elevator (e.g., a particular control surface 128). FIG. 2D illustrates force changes caused by main rotor collective blade pitch angle adjustments via the collective.

Figure 3A:
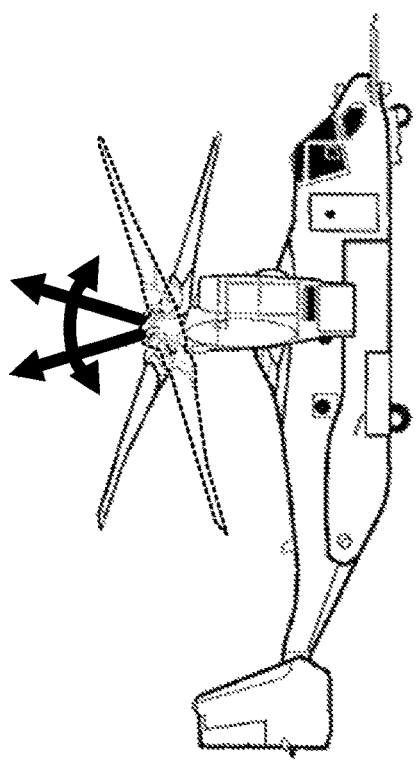
FIGS. 3A, 3B, 3C, and 3D are each a diagram that illustrates controls of a tiltrotor aircraft.
Figure 3B:
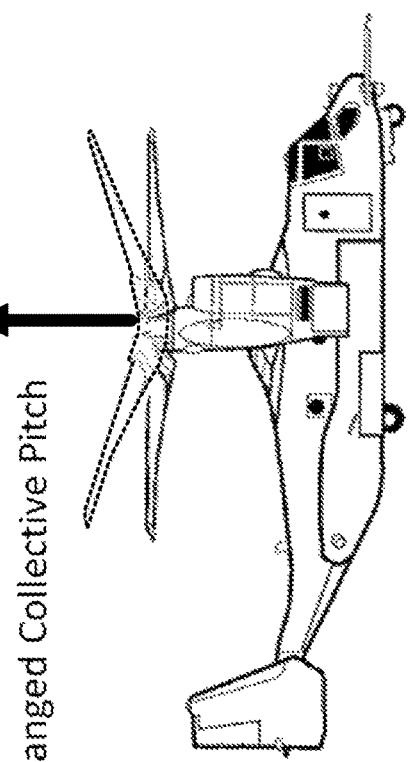
Figure 3C:
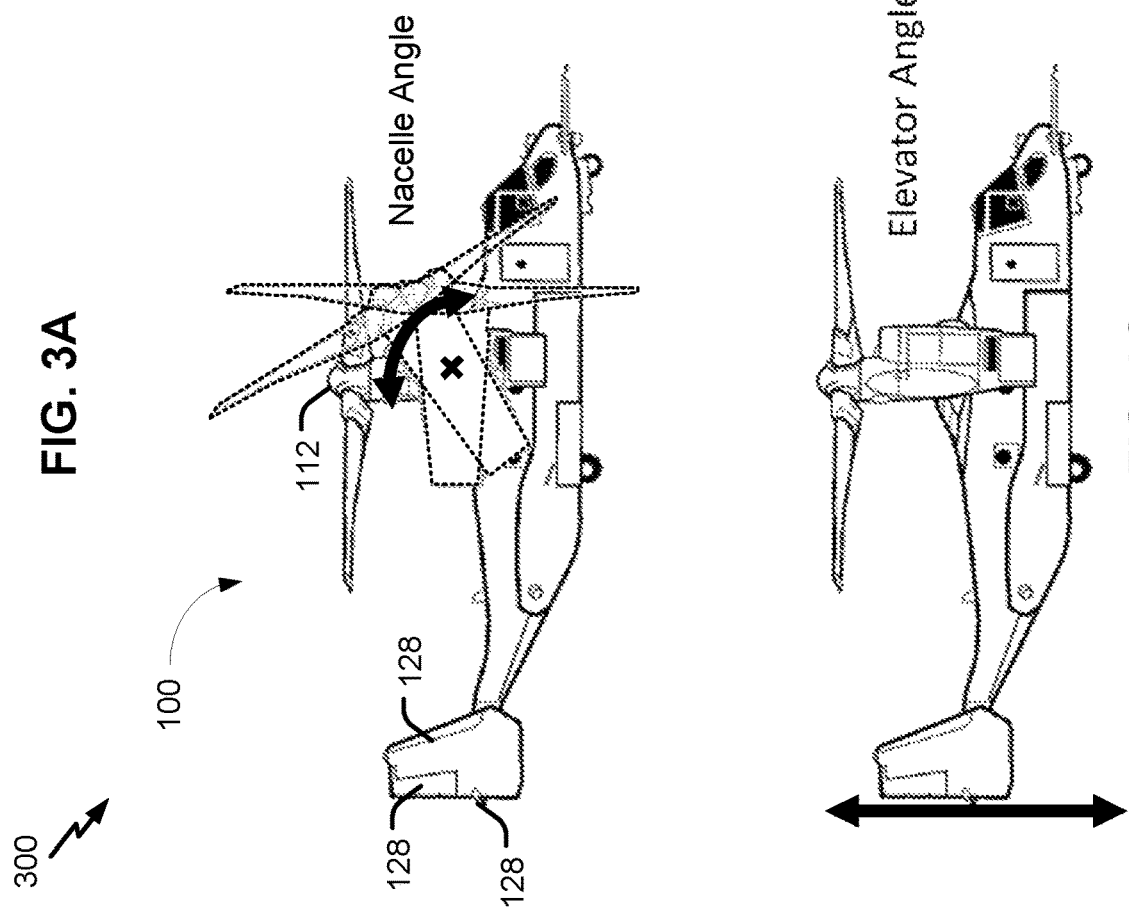
Figure 3D:
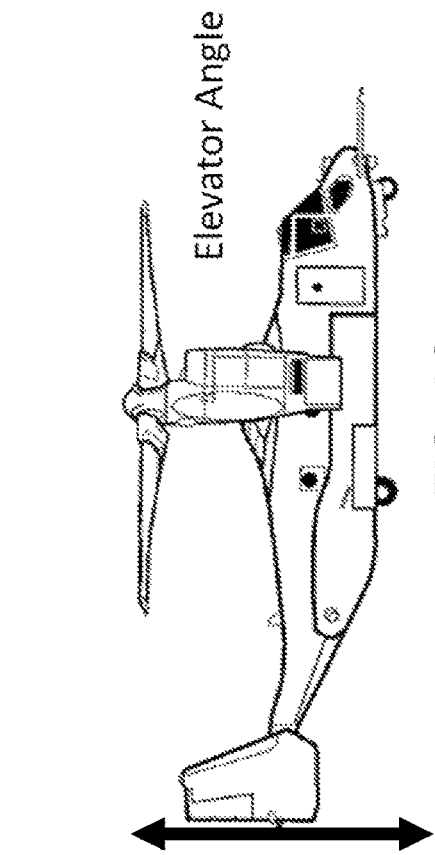

FIGS. 3A-3D illustrate the effects caused by inceptors of the aircraft 100. As illustrated in FIGS. 3A-3D, the aircraft 100 is a tilt-rotor aircraft. FIG. 3A illustrates force changes caused by a nacelle angle or nacelle angular rate of nacelles of the proprotors (e.g., the propulsors 112, 114). FIG. 3B illustrates force changes caused by longitudinal (fore and aft) adjustments of the proprotors via the cyclic. FIG. 3C illustrates force changes caused by elevator pitch angle adjustments via the cyclic. FIG. 3D illustrates force changes caused by proprotor collective blade pitch angle adjustments via the collective. Although FIG. 3D illustrated the force changes in the vertical direction, adjusting the collective blade pitch adjusts the thrust of the proprotors along a direction of the proprotors, which may be adjusted as shown in FIGS. 3A and 3B. In FIG. 3A the proprotors are physically adjusted in the pitch axis by adjusting a nacelle angle or nacelle angular rate, as compared to FIG. 2A where the collective blade pitch angle of the second propulsor 114, such as a propeller, is adjusted.

Figure 4:
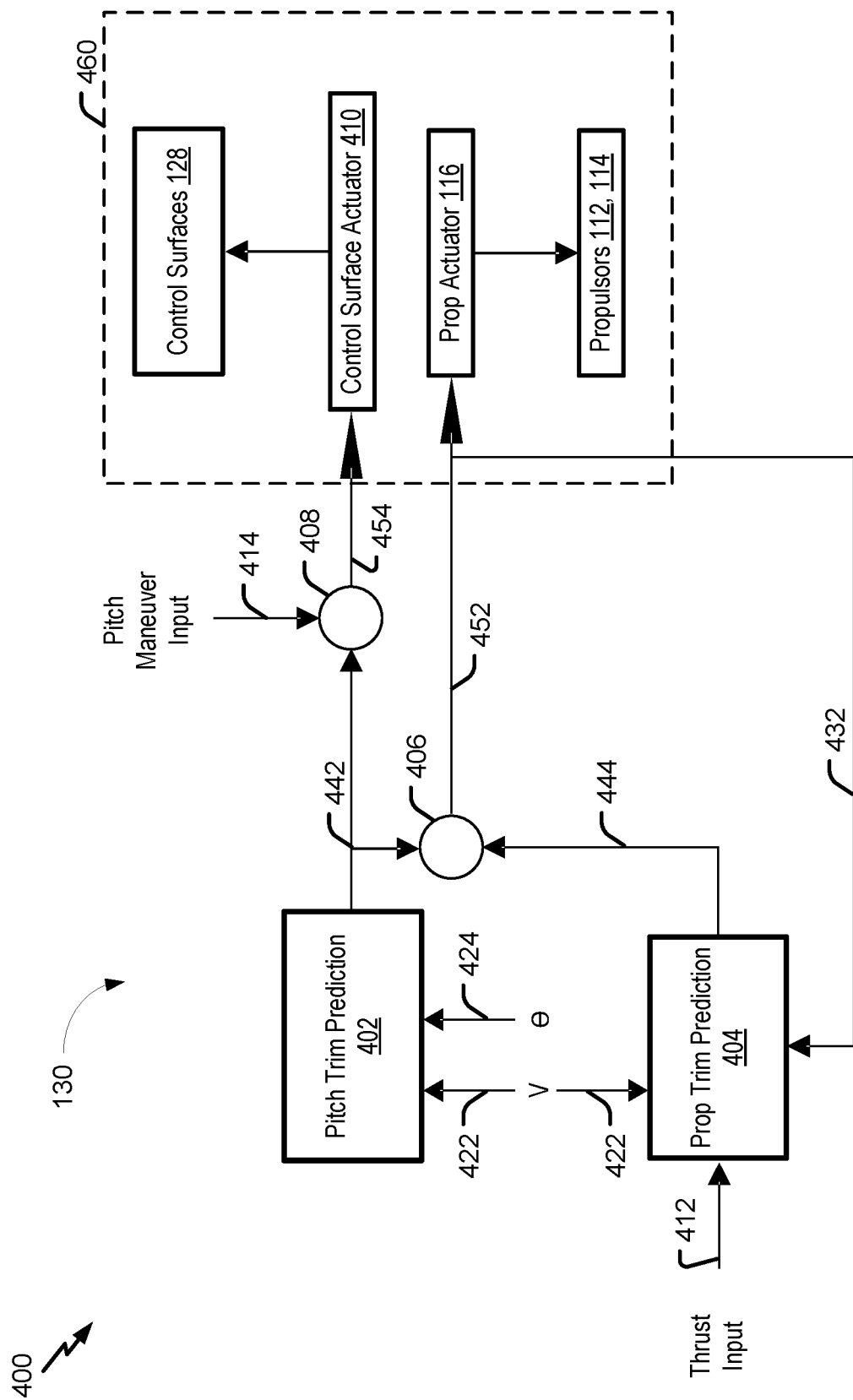
FIG. 4 is a circuit diagram that illustrates an example of the control circuitry of FIG. 1.

FIG. 4 is a circuit diagram 400 that illustrates an example of the control circuitry 130 of FIG. 1. The circuit diagram 400 can be used to control the aircraft 100 of FIG. 1, such as compound helicopters or tilt-rotor aircraft illustrated in FIGS. 2A-2D and 3A-3D. The control circuitry 130 of FIG. 4 includes pitch trim prediction circuitry 402, propulsor trim prediction circuitry 404, processing circuitry 406 and 408, a control surface actuator 410, the control surfaces 128, the propulsor actuator 116, and the propulsors 112, 114.

The pitch trim prediction circuitry 402 is configured to generate a predicted pitch attitude trim value 442. The predicted pitch attitude trim value 442 is generated at least based on an aircraft velocity 422 and a pitch attitude 424. The aircraft velocity 422 includes a vertical velocity, a horizontal velocity, or a combined velocity. For example, the aircraft velocity 422 may include or correspond to a vertical speed indicated (VSI), an airspeed, a ground speed, a true speed, or another velocity. The pitch attitude 424 (e.g., an input pitch attitude of the aircraft) includes or corresponds to a measured pitch attitude generated by data from one or more sensors, such as the sensors 132 of FIG. 1 or a feedback pitch attitude. Examples of generation of the predicted pitch attitude trim value 442 are described further with respect to FIGS. 5-8.

The predicted pitch attitude trim value 442 is or indicates an estimated pitch attitude of the aircraft 100 for an altitude hold state of the aircraft 100 or a vertical velocity hold state of the aircraft 100. The altitude hold state is a state where the aircraft 100 operates in level flight, such as when the vertical velocity (e.g., the vertical speed indicated (VSI)) is zero. The vertical velocity hold state is a state where the aircraft 100 operates with a fixed climb rate or a fixed descent rate (e.g., a fixed acceleration) or operates with a fixed, non-zero vertical velocity, such as when the vertical velocity is constant (no vertical velocity acceleration) and the altitude of the aircraft 100 is changing.

The propulsor trim prediction circuitry 404 is configured to generate a predicted propulsor trim value 444. The predicted propulsor trim value 444 is generated at least based on a first input (e.g., a thrust input 412 as illustrated in FIG. 4), the aircraft velocity 422, and a propulsor feedback value 432. The predicted propulsor trim value 444 may include or correspond to a predicted propulsor collective blade pitch trim value 562 of FIG. 5 or a predicted proprotor nacelle angle trim value 662 of FIG. 6. The propulsor feedback value 432 may include or correspond to a previous value of the propulsor command 452 or a measured propulsor value corresponding to the propulsor command 452, such as a measured collective blade pitch angle or a measured nacelle angle.

The predicted propulsor collective blade pitch trim value 562 is an estimated value of a propulsor collective blade pitch angle setting that produces a magnitude of propulsor thrust (e.g., longitudinal thrust) for a speed hold state of the aircraft 100 by adjusting a magnitude of the thrust generated by the propulsor. In some implementations, the predicted propulsor collective blade pitch trim value 562 is a negative value (indicating thrust in the opposite or forward direction) and causes a reduction in collective blade pitch angle of the propulsor. Reducing the collective blade pitch angle of the propulsor causes the propulsor to reduce thrust or to generate thrust in the opposite direction.

The predicted proprotor nacelle angle trim value 662 is an estimated value of a nacelle angle setting of a nacelle of a proprotor that produces a magnitude of propulsor thrust (e.g., longitudinal thrust) for a speed hold state of the aircraft 100 by adjusting a direction of the thrust generated by the proprotor. In other implementations, the predicted propulsor trim value 444 includes or corresponds to other values of thrust effectors, as described with reference to FIG. 1.

The processing circuitry 406 is configured to generate the propulsor command 452 based on the predicted pitch attitude trim value 442 and the predicted propulsor trim value 444. The processing circuitry 406 is configured to output the propulsor command 452 to one or more propulsor actuators 116. Example configurations of the processing circuitry 406 are described with reference to FIGS. 5-15.

The propulsor command 452 is configured to adjust a thrust effector of a propulsor, such as the propulsor actuator 116 of FIG. 1. For example, the propulsor command 452 is configured to adjust a magnitude of thrust generated by the propulsor by commanding the propulsor actuator 116 to adjust the magnitude of the thrust directly or indirectly (e.g., by adjusting a direction of the thrust). The propulsor command 452 is configured to cause the aircraft 100 to operate in an airspeed hold state (e.g., a constant speed or no acceleration state) or an acceleration hold state (e.g., constant rate of change of speed/velocity). The propulsor command 452 may include or correspond to a propulsor collective blade pitch angle command, a proprotor nacelle angle command, or a command that adjusts a magnitude or a direction of the thrust generated by a propulsor.

The processing circuitry 408 is configured to generate a pitch attitude command 454 (e.g., an aircraft pitch attitude command) based on the predicted pitch attitude trim value 442 and one or more other inputs, such as a second pilot input 414 (e.g., a pitch maneuver input as illustrated in FIG. 4). The processing circuitry 408 is configured to output the pitch attitude command 454 to one or more control surface actuators 410. Example configurations of the processing circuitry 408 are described with reference to FIGS. 5-15. The pitch attitude command 454 is configured to adjust a position of one or more control surfaces 128 of the aircraft 100. For example, the pitch attitude command 454 is configured to adjust the position of a particular control surface 128 by commanding a particular control surface actuator 410 to adjust the position of the particular control surface 128. The pitch attitude command 454 is configured to cause the aircraft to operate in the altitude hold state or the vertical velocity hold state. To illustrate, adjusting the position of the particular control surface 128 trims the aircraft to achieve and maintain the altitude hold state or the vertical velocity hold state.

The one or more control surface actuators 410 are configured to adjust one or more of the control surfaces 128 of the aircraft 100 based on the pitch attitude command 454. The one or more control surface actuators 410 may include or correspond to one or more elevator actuators, horizontal stabilizer actuators, spoiler actuators, aileron actuators, rudder actuators, flap actuators, slat actuators, thrust vectoring actuators, etc. The control surface actuators 410 may include pitch actuators (e.g., pitch actuators 520 of FIG. 5), yaw actuators, roll actuators, or a combination thereof.

The propulsor actuator 116 is configured to adjust one or more of the propulsors 112, 114 of the aircraft 100 based on the propulsor command 452. In some implementations, multiple propulsor actuators 116 are configured to adjust one or more of the propulsors 112, 114 of the aircraft 100 based on the propulsor command 452. The propulsor actuator 116 may include or correspond to a collective blade pitch actuator, a nacelle angle actuator, a nacelle angular rate actuator, a nozzle size actuator, a nozzle direction actuator, a fuel flow rate actuator, etc., or a combination thereof.

One or more of the propulsors 112, 114, the propulsor actuator 116, the control surfaces 128, or the control surface actuators 410 correspond to flight control effectors 460 of the aircraft 100. The flight control effectors 460 are configured to adjust properties (e.g., thrust, speed, acceleration, and attitude, such as pitch, roll and yaw) of the aircraft 100 to control states of the aircraft 100.

In other implementations, the control circuitry 130 includes one of the pitch trim prediction circuitry 402 or the propulsor trim prediction circuitry 404. In implementations where the control circuitry 130 includes the pitch trim prediction circuitry 402, the control circuitry 130 can generate the commands 452, 454 based on the predicted pitch attitude trim value 442 generated by the pitch trim prediction circuitry 402 and independent of a predicted propulsor trim value 444. In implementations where the control circuitry 130 includes the propulsor trim prediction circuitry 404, the control circuitry 130 can generate the propulsor command 452 based on the predicted propulsor trim value 444 generated by the propulsor trim prediction circuitry 404 and independent of a predicted pitch attitude trim value 442. Additionally, the control circuitry 130 can generate the propulsor command 452 (i.e., the predicted propulsor trim value 444) and the pitch attitude command 454 independent of pilot or autopilot inputs, i.e., independent of the inputs 412 and 414. For example, the control circuitry 130 can maintain a particular target state independent of pilot input in response to a change in the aircraft velocity 422 or the pitch attitude 424 (e.g., from a gust of wind, a change in ambient temperature, a change in ambient pressure, etc.). Operation of various embodiments of FIG. 4 are discussed with reference in FIGS. 5 and 6.

Figure 5:
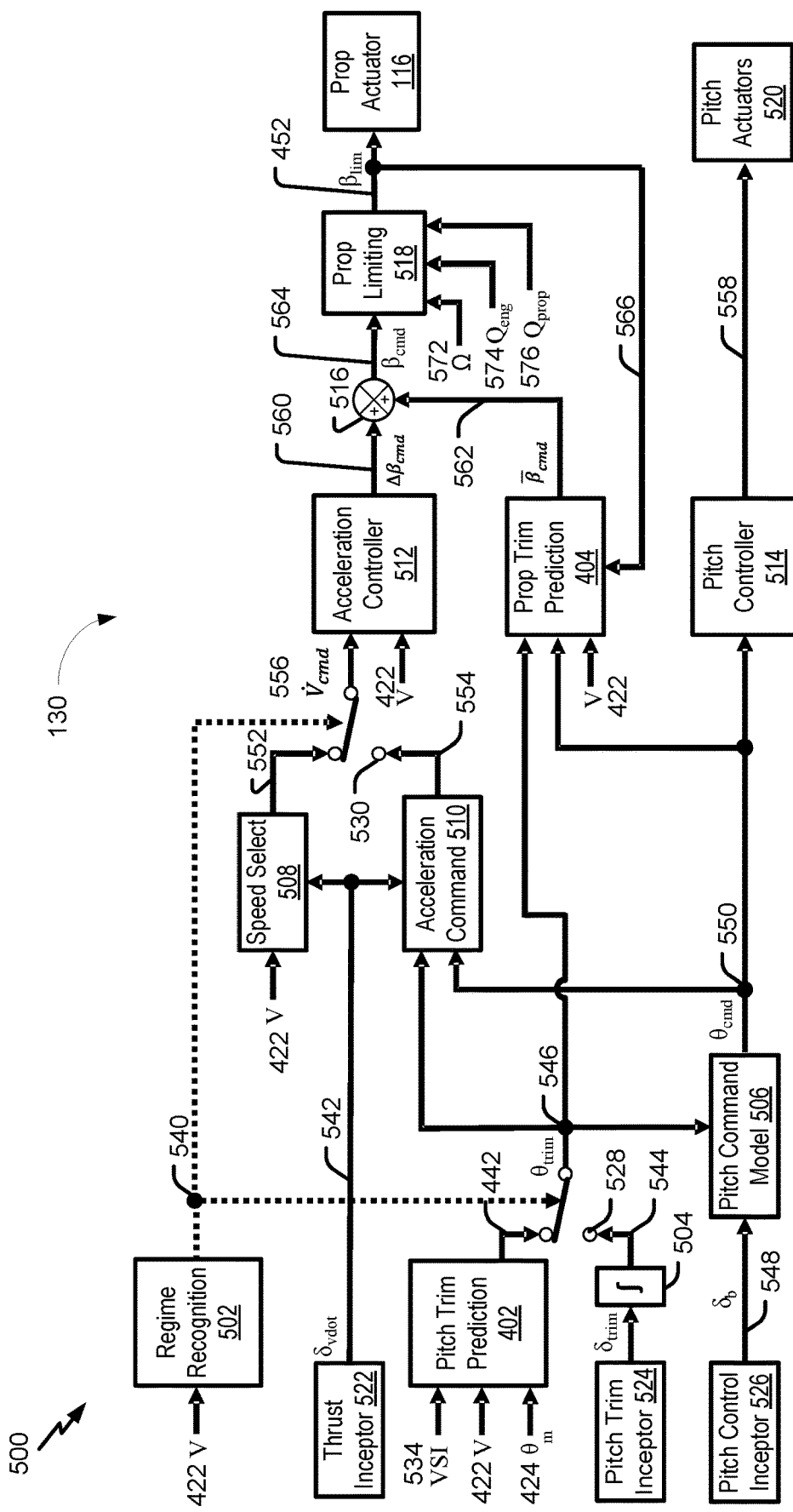
FIG. 5 is a circuit diagram that illustrates another example of the control circuitry of FIG. 1.

FIG. 5 is a circuit diagram 500 that illustrates an example of the control circuitry 130 of FIG. 1. The circuit diagram 500 can be used to control the aircraft 100 of FIG. 1, such as a compound helicopter illustrated in FIG. 2A.

The control circuitry 130 of FIG. 5 includes the pitch trim prediction circuitry 402, the propulsor trim prediction circuitry 404, a regime recognition circuitry 502, an integrator 504, a pitch command model 506, a speed select circuitry 508 (e.g., high speed mode circuitry), an acceleration command circuitry 510 (e.g., low speed mode circuitry), an acceleration controller 512, a pitch controller 514, a combiner 516, a propulsor limiting circuitry 518, a first switch 528, and a second switch 530. In other implementations, the control circuitry 130 includes additional components or fewer components than illustrated in FIG. 5.

The pitch trim prediction circuitry 402 and the propulsor trim prediction circuitry 404 were described with reference to FIG. 4 and are described further with reference to FIGS. 7, 8, and 13. As illustrated in FIG. 5, the pitch trim prediction circuitry 402 is configured to receive a vertical velocity 534 (e.g., a vertical speed indicated (VSI)) and to generate the predicted pitch attitude trim value 442 based on the vertical velocity 534. The pitch trim prediction circuitry 402 is configured to output the predicted pitch attitude trim value 442 to the first switch 528.

In the example illustrated in FIG. 5, the propulsor trim prediction circuitry 404 generates a particular type of predicted propulsor trim value 444, i.e., the predicted propulsor collective blade pitch trim value 562. The propulsor trim prediction circuitry 404 is configured to generate the predicted propulsor collective blade pitch trim value 562 based on the aircraft velocity 422, a selected pitch attitude trim value 546, an aircraft pitch attitude command 550, and a propulsor collective blade pitch feedback 566. The propulsor collective blade pitch feedback 566 indicates a propulsor collective blade pitch angle value and may include or correspond to a previous value of the propulsor command 452 (e.g., a propulsor collective blade pitch angle command) or a measured propulsor collective blade pitch angle.

During operation, the regime recognition circuitry 502 receives an input and is configured to output a signal that controls one or more switches, such as the first and second switches 528, 530. As illustrated in FIG. 5, the regime recognition circuitry 502 receives the aircraft velocity 422 and outputs a regime signal 540 to the first and second switches 528, 530. For example, the regime recognition circuitry 502 generates the regime signal 540 by comparing the aircraft velocity 422 to a speed threshold.

The regime signal 540 indicates a current regime of the aircraft 100 and is configured to control operation of the first and second switches 528, 530. As illustrated in FIG. 5, the regime signal 540 indicates one of two regimes and controls a single-pole, dual-throw switch, in other implementations, the regime signal 540 indicates more than two regimes or multiple regime signals 540 are used to control the first and second switches 528, 530. In such implementations, the switches 528, 530 include additional poles or throws.

The thrust inceptor 522 receives a pilot input (e.g., a thumbwheel input or a collective input) or an autopilot input, and generates a v-dot command signal 542, where v-dot indicates acceleration or rate of change of speed/velocity. For example, the thrust inceptor 522 (or other circuitry) performs a table lookup using the thumbwheel input to generate the v-dot command signal 542. The thrust inceptor 522 outputs the v-dot command signal 542 to the speed select circuitry 508 and to the acceleration command circuitry 510.

The pitch trim inceptor 524 receives another pilot input (e.g., a beep switch input) or another autopilot input and generates a pitch trim input command signal. For example, the pitch trim inceptor 524 (or other circuitry) performs a table lookup based on the beep switch input to generate the pitch trim input command signal. The beep switch input indicates a deviation from a zero value or a new reference value. As an illustrative, non-limiting example, the beep switch input indicates negative 1 degree nose down. The pitch trim inceptor 524 outputs the pitch trim input command signal to the integrator 504. The integrator 504 receives the pitch trim input command signal from the pitch trim inceptor 524 and integrates the pitch trim input command signal to generate a commanded pitch attitude trim value 544. The integrator 504 outputs the commanded pitch attitude trim value 544 to the first switch 528.

The first switch 528 is configured to output the predicted pitch attitude trim value 442 or the commanded pitch attitude trim value 544 based on the regime signal 540. Responsive to the regime signal 540 indicating a first regime (e.g., a low speed mode), the first switch 528 outputs the commanded pitch attitude trim value 544 as the selected pitch attitude trim value 546. Responsive to the regime signal 540 indicating a second regime (e.g., a high speed mode), the first switch 528 outputs the predicted pitch attitude trim value 442 as the selected pitch attitude trim value 546. The first switch 528 outputs the selected pitch attitude trim value 546 to the pitch command model 506, to the acceleration command circuitry 510, and to the propulsor trim prediction circuitry 404. Thus, in FIG. 5, the control circuitry 130 only uses the predicted pitch attitude trim value 442 in a particular regime (e.g., a high speed mode).

The pitch control inceptor 526 receives another pilot input (e.g., a cyclic fore and aft input) or another autopilot input and generates a pitch attitude input signal 548. For example, the pitch control inceptor 526 (or other circuitry) performs a table lookup using the cyclic input to generate the pitch attitude input signal 548. The pitch control inceptor 526 outputs the pitch attitude input signal 548 to the integrator 504.

The pitch command model 506 generates the aircraft pitch attitude command 550 based on the selected pitch attitude trim value 546 and the pitch attitude input signal 548. The pitch command model 506 outputs the aircraft pitch attitude command 550 to the acceleration command circuitry 510, to the propulsor trim prediction circuitry 404, and to the pitch controller 514.

The pitch controller 514 (e.g., a pitch attitude controller) generates one or more control surface pitch commands 558 based on the aircraft pitch attitude command 550 and outputs the one or more control surface pitch commands 558 to one or more of the pitch actuators 520. The one or more pitch actuators 520 (e.g., pitch moment control actuators) adjust a position of one or more control surfaces 128 of the aircraft 100 based on the one or more control surface pitch commands 558.

The acceleration command circuitry 510 generates an acceleration command mode acceleration command 554 based on the selected pitch attitude trim value 546 and the aircraft pitch attitude command 550 and outputs the acceleration command mode acceleration command 554 to the second switch 530. The speed select circuitry 508 generates a speed select mode acceleration command 552 based on the v-dot command signal 542 and the predicted pitch attitude trim value 442 and outputs the speed select mode acceleration command 552 to the second switch 530. The second switch 530 outputs the speed select mode acceleration command 552 or the acceleration command mode acceleration command 554 to the acceleration controller 512 as a selected acceleration command 556 based on the regime signal 540.

The acceleration controller 512 generates a delta propulsor collective blade pitch command 560 based on the selected acceleration command 556 and the aircraft velocity 422 and outputs the delta propulsor collective blade pitch command 560 to the combiner 516. The delta propulsor collective blade pitch command 560 includes or corresponds to a propulsor maneuver command. To illustrate, the delta propulsor collective blade pitch command 560 indicates a value of collective blade pitch to achieve an amount of thrust indicated by a thrust input to the thrust inceptor 522 (and indicated by the v-dot command signal 542 which is generated based on the thrust input, such as the thrust input 412 of FIG. 4).

The propulsor trim prediction circuitry 404 generates the predicted propulsor collective blade pitch trim value 562 based on the aircraft pitch attitude command 550, the aircraft velocity 422, and the propulsor collective blade pitch feedback 566. The predicted propulsor collective blade pitch trim value 562 corresponds to a particular type of the predicted propulsor trim value 444. The propulsor trim prediction circuitry 404 outputs the predicted propulsor collective blade pitch trim value 562 to the combiner 516.

The combiner 516 generates a combined propulsor command 564 (combined propulsor collective blade pitch command) based on combining (adding) the delta propulsor collective blade pitch command 560 and the predicted propulsor collective blade pitch trim value 562. The combiner 516 outputs the combined propulsor command 564 to the propulsor limiting circuitry 518. The propulsor limiting circuitry 518 generates the propulsor command 452 (a propulsor collective blade pitch angle command) based on the combined propulsor command 564 and one or more limits (e.g., thresholds). As illustrated in FIG. 5, the propulsor limiting circuitry 518 limits the combined propulsor command 564 based on actuator limits 572, engine limits 574 (e.g., engine horsepower (hp) limits), and propulsor limits 576 (e.g., propulsor hp limits) to generate the propulsor command 452. The propulsor limiting circuitry 518 outputs the propulsor command 452 to the propulsor actuator 116 and outputs the propulsor command 452 to the propulsor trim prediction circuitry 404 as the propulsor collective blade pitch feedback 566. The propulsor actuator 116 adjusts one or more of the propulsors 112, 114 based on the propulsor command 452.

Figure 6:
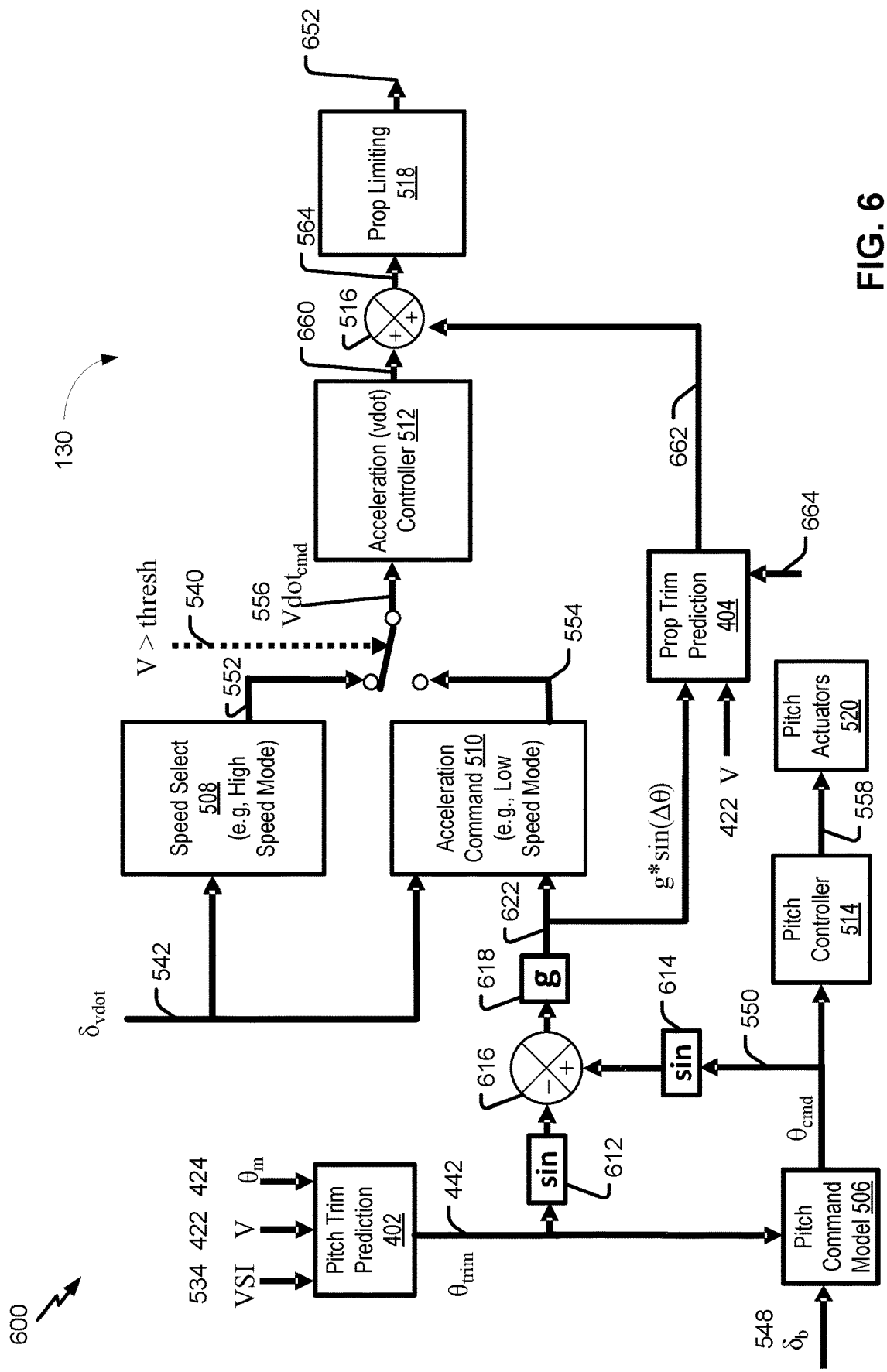
FIG. 6 is a circuit diagram that illustrates another example of the control circuitry of FIG. 1.

FIG. 6 is a circuit diagram 600 that illustrates another example of the circuit of FIG. 5 for a propulsor with nacelle angle control. The circuit diagram 600 can be used to control the aircraft 100 of FIG. 1, such as a tilt-rotor aircraft illustrated in FIGS. 3A-3D. As compared to the circuit diagram 500 of FIG. 5, which controls a collective blade pitch angle of a propulsor, the circuit diagram 600 of FIG. 6 is configured to control a nacelle angle of proprotors of a tilt-rotor aircraft.

The control circuitry 130 of FIG. 6 includes similar components and operates similar to the control circuitry 130 of FIG. 5. However, in FIG. 6, the control circuitry 130 is configured to generate a predicted proprotor nacelle angle trim value 662 and a proprotor nacelle angle command 652 (as compared to the predicted propulsor collective blade pitch trim value 562 and corresponding command). The nacelle angle command 652 is a particular type of the propulsor command 452 of FIG. 4. The control circuitry 130 of FIG. 6 has been simplified and some components and signal of the control circuitry 130 of FIG. 5 are not illustrated for clarity.

Additionally, FIG. 6 illustrates the control circuitry 130 including a gravity compensator. The gravity compensator includes a first sine function circuitry 612, a second sine function circuitry 614, a combiner 616, and a gravity multiplier 618. The gravity compensator is configured to generate a gravity compensated longitudinal acceleration signal 622 ($g*\sin(\Delta\theta)$). In other implementations, such as in the control circuitry 130 of FIG. 5, the acceleration command circuitry 510, the propulsor trim prediction circuitry 404, or both include gravity compensators.

During operation, the first sine function circuitry 612 receives the selected pitch attitude trim value 546 and applies the sine function to the selected pitch attitude trim value 546 to generate the sine of the selected pitch attitude trim value 546. The second sine function circuitry 614 receives the aircraft pitch attitude command 550 and applies the sine function to the aircraft pitch attitude command 550 to generate the sine of the aircraft pitch attitude command 550. The first sine function circuitry 612 and the second sine function circuitry 614 provide the sine of the selected pitch attitude trim value 546 and the sine of the aircraft pitch attitude command 550 to the combiner 616. The combiner 616 generates a longitudinal acceleration signal by subtracting the sine of the selected pitch attitude trim value 546 from the sine of the aircraft pitch attitude command 550. The combiner 616 outputs the longitudinal acceleration signal to the gravity multiplier 618. The gravity multiplier 618 multiplies the longitudinal acceleration signal by gravity (e.g., a gravitational constant or an experienced gravity value) to generate a gravity compensated longitudinal acceleration signal 622. The gravity multiplier 618 outputs the gravity compensated longitudinal acceleration signal 622 to acceleration command circuitry 510 and to the propulsor trim prediction circuitry 404. The gravity compensated longitudinal acceleration signal 622 indicates a pitch attitude deviation from a reference pitch attitude (e.g., a deviation from the aircraft pitch attitude command 550 by the predicted pitch attitude trim value 442 or the commanded pitch attitude trim value 544 of the selected pitch attitude trim value 546).

In the example illustrated in FIG. 6, the propulsor trim prediction circuitry 404 generates a predicted proprotor nacelle angle trim value 662 based on a nacelle angle feedback 664 and the gravity compensated longitudinal acceleration signal 622. The nacelle angle feedback 664 indicates a nacelle angle value and may include or correspond to a previous value of the nacelle angle command 652 or a measured nacelle angle (e.g., indicated by sensor data). The propulsor trim prediction circuitry 404 outputs the predicted proprotor nacelle angle trim value 662 to the combiner 516.

In the example illustrated in FIG. 6, the acceleration controller 512 generates a delta nacelle angle command 660 (e.g., a delta proprotor nacelle value) and outputs the delta nacelle angle command 660 to the combiner 516. The combiner 516 generates the combined propulsor command 564 (a combined proprotor nacelle command) based on the delta nacelle angle command 660 and the predicted proprotor nacelle angle trim value 662. The propulsor limiting circuitry 518 generates the nacelle angle command 652 by limiting the combined propulsor command 564. Although FIGS. 5 and 6 illustrate control circuitry 130 for two types of aircraft, the control circuitry 130 can be modified to control any type of longitudinal thruster for any compound aircraft configuration.

Figure 7:
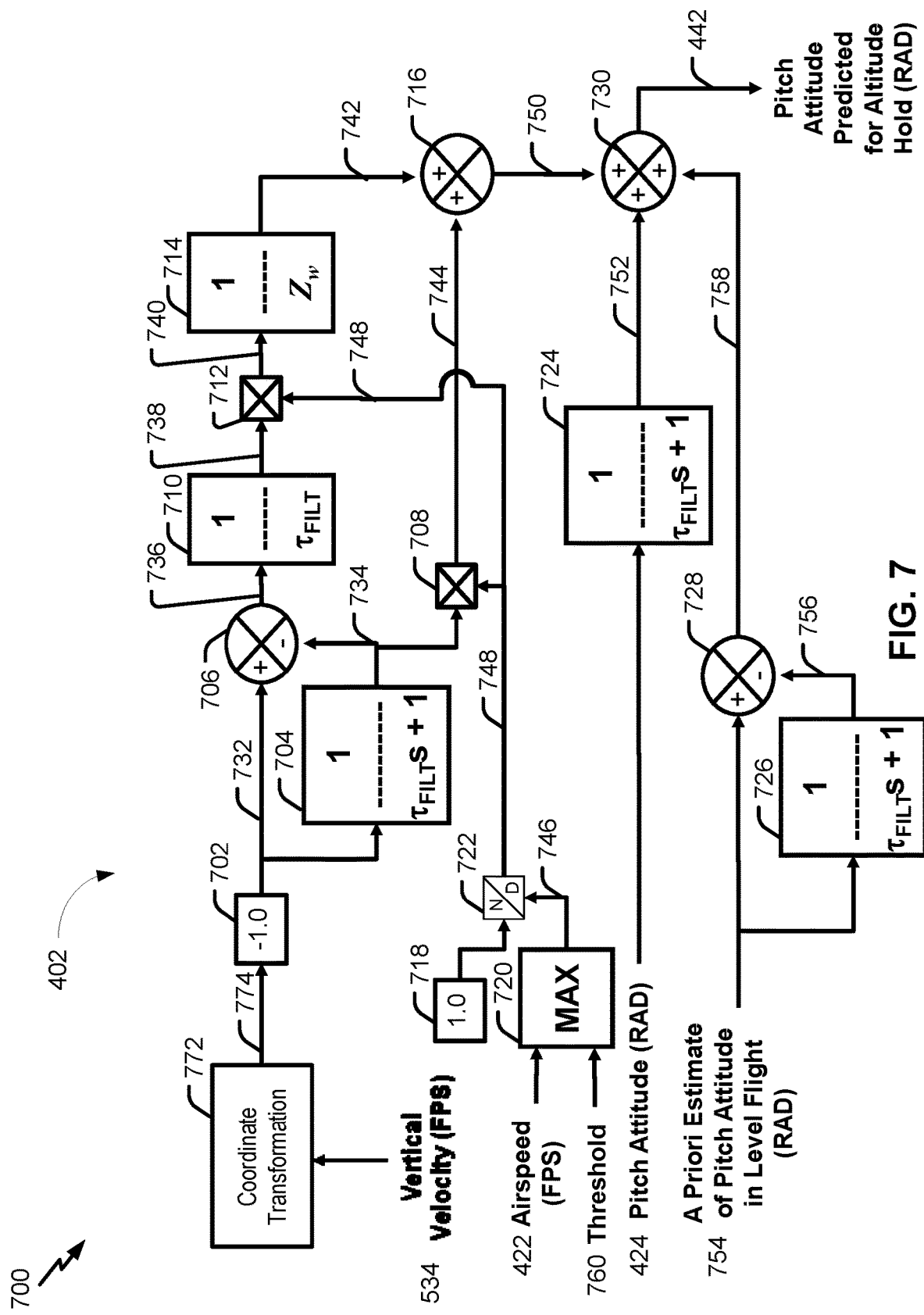
FIG. 7 is a circuit diagram that illustrates an example of a pitch trim prediction circuitry.

FIG. 7 is a circuit diagram 700 that illustrates an example of a circuit for predicting a pitch trim value, such as the pitch trim prediction circuitry 402 of FIGS. 4-6. The circuit diagram 700 can be used to control the aircraft 100 of FIG. 1, such as compound helicopters or tilt-rotor aircraft illustrated in FIGS. 2A-2D and 3A-3D. As illustrated in FIG. 7, the circuit diagram 700 is illustrated as pitch trim prediction circuitry 402 for a compound helicopter. The circuit diagram 700 of FIG. 7 (along with circuit diagrams 800-1400 of FIGS. 8-14) is illustrated in a frequency domain. In FIGS. 8-14, "tau" ("τ" or "τ_filt") represents a time constant (e.g., a trim prediction time constant) of a filter (corresponding to an RC filter time constant in a time domain), and "s" represents a Laplace variable. Additionally, angle values are indicated in radians (RAD) and velocity values are indicated in feet per second (FPS).

As explained above, the pitch trim prediction circuitry 402 generates the predicted pitch attitude trim value 442 based on the vertical velocity 534, the aircraft velocity 422, and the pitch attitude 424. As illustrated in FIG. 7, the pitch trim prediction circuitry 402 is configured to generate the predicted pitch attitude trim value 442 further based on an inverted vertical velocity 732, an estimated aircraft pitch attitude 754 (e.g., an a priori estimate of pitch attitude in level flight), and a vertical damping derivative (Zw). The propulsor trim prediction circuitry 404 includes an inverter 702, low pass filters 704, 724, and 726, combiners 706, 716, and 730, multipliers 708, and 712, a gain circuitry 710, a vertical damping derivative (Zw) circuitry 714, a constant 718, a comparison circuitry 720, and a divider 722. As illustrated in FIG. 7, the low pass filters 704, 724, and 726 are first order low pass filters (τs+1). In other implementations, the low pass filters 704, 724, and 726 may be second order low pass filters or higher order low pass filters.

During operation, the pitch trim prediction circuitry 402 receives the vertical velocity 534, the aircraft velocity 422, the pitch attitude 424, the inverted vertical velocity 732, and the estimated aircraft pitch attitude 754 as inputs. In some implementations, the inverter 702 receives the vertical velocity 534 and generates the inverted vertical velocity 732 based on inverting (e.g., multiplying by negative one, changing a sign bit, etc.) the vertical velocity 534. In other implementations, as shown in FIG. 7, the inverter receives a transformed vertical velocity 774 and generates the inverted vertical velocity 732 based on inverting (e.g., multiplying by negative one, changing a sign bit, etc.) the transformed vertical velocity 774. For example, when the vertical velocity 534 corresponds to VSI, the vertical velocity 534 is transformed from a geodetic coordinate system to a body axis coordinate system by a coordinate transformation circuitry 772. To illustrate the vertical velocity 534 is multiplied by a product of secant(θ)*secant(ϕ) to transform the vertical velocity 534 into the transformed vertical velocity 774, where theta represents a pitch angle of the aircraft and phi represents a yaw angle of the aircraft.

The inverted vertical velocity 732 represents a component of the vertical velocity 534 or the transformed vertical velocity 774, such as a negative component thereof, in a body axis. The inverter 702 provides the inverted vertical velocity 732 to the first low pass filter 704 and to the first combiner 706. The first low pass filter 704 generates a low pass filtered vertical velocity signal 734 by low pass filtering the inverted vertical velocity 732. The first low pass filter 704 provides the low pass filtered vertical velocity signal 734 to the first combiner 706 and to the first multiplier 708.

The first combiner 706 generates a high pass filtered vertical velocity signal 736 based on subtracting the low pass filtered vertical velocity signal 734 from the inverted vertical velocity 732. The first low pass filter 704 and the first combiner 706 act in conjunction to high pass filter the inverted vertical velocity 732 to generate the high pass filtered vertical velocity signal 736. The first combiner 706 provides the high pass filtered vertical velocity signal 736 to the gain circuitry 710. The gain circuitry 710 multiplies the high pass filtered vertical velocity signal 736 by a gain to generate a filtered vertical acceleration 738 and provides the filtered vertical acceleration 738 to the second multiplier 712. As illustrated in FIG. 7, the gain circuitry 710 (e.g., an amplifier) applies a gain of an inverse of the time constant tau (1/τ) of a trim prediction lag filter (e.g., the 704 and 706). To illustrate, the time constant is in seconds, so multiplying a velocity by an inverse of the time constant generates an acceleration.

The comparison circuitry 720 receives the aircraft velocity 422 and an airspeed threshold 760 and outputs the larger of the aircraft velocity 422 and the airspeed threshold 760 as a selected speed 746 to the divider 722. The divider 722 divides the constant 718 (e.g., 1 as illustrated in FIG. 7) by the selected speed 746 to generate an inverse selected speed 748. The divider 722 outputs the inverse selected speed 748 to the first and second multipliers 708, 712. The first multiplier 708 multiplies the low pass filtered vertical velocity signal 734 and the inverse selected speed 748 to generate a vertical flight path angle signal 744 and provides the vertical flight path angle signal 744 to the second combiner 716.

The vertical flight path angle signal 744 represents the filtered pitch attitude change to rotate the aircraft (e.g., a fuselage thereof) such that a body-axis component of geodetic vertical speed becomes zero (e.g., when the vertical velocity 534 includes or corresponds to VSI). Multiplying the low pass filtered vertical velocity signal 734 by the inverse selected speed 748 effectively applies a small angle approximation of a tangent function. Thus, the vertical flight path angle signal 744 represents a small angle approximation of the vertical flight path angle that converges to an exact value of the vertical flight path angle as the error (or difference) between the desired and actual vertical flight path angles approaches zero. FIGS. 7 and 8 illustrate an altitude hold (e.g., a zero vertical velocity target vertical state). For a vertical speed hold state the input to the coordinate transformation circuitry 772, which is the vertical velocity 534 for an altitude hold state, is a signal (e.g., a velocity difference signal) equal to a desired or input value of vertical speed subtracted from the vertical velocity 534. While there is no error signal for a target vertical state in FIG. 7, there is an implied zero vertical speed reference signal, i.e., the inverted vertical velocity 732. To illustrate, applying a gain of negative one is implicitly a target state of zero minus the vertical velocity 534 or the transformed vertical velocity 774. Thus, the inverted vertical velocity 732 represents a zero vertical speed reference signal.

The second multiplier 712 multiplies the filtered vertical acceleration 738 and the inverse selected speed 748 to generate a time rate of change of flight path angle signal 740 and provides the time rate of change of flight path angle signal 740 to the vertical damping derivative (Zw) circuitry 714. The vertical damping derivative (Zw) circuitry 714 divides the time rate of change of flight path angle signal 740 by the vertical damping derivative (Zw) to generate a first signal 742 (e.g., a time rate of change of flight path angle signal divided by the vertical damping derivative (Zw)) and provides the first signal 742 to the second combiner 716.

The second combiner 716 generates a filtered aircraft trim pitch deviation signal 750 based on adding (combining) the first signal 742 and the vertical flight path angle signal 744. The second combiner 716 provides the filtered aircraft trim pitch deviation signal 750 to the fourth combiner 730. In implementations in which the pitch trim prediction circuitry 402 receives the vertical velocity 534, the aircraft velocity 422 indicates a horizontal velocity, such as ground speed, air speed, true speed. Thus, the pitch trim prediction circuitry 402 generates the filtered aircraft trim pitch deviation signal 750 based on vertical and horizontal speeds of the aircraft, i.e., the velocities 422, 534.

The second low pass filter 724 receives the pitch attitude 424 and generates a low pass filtered pitch attitude signal 752 by low pass filtering the pitch attitude 424. The second low pass filter 724 provides the low pass filtered pitch attitude signal 752 to the fourth combiner 730.

The third low pass filter 726 receives the estimated aircraft pitch attitude 754 and generates a low pass filtered estimated pitch attitude 756 by low pass filtering the estimated aircraft pitch attitude 754. The third low pass filter 726 provides the low pass filtered estimated pitch attitude 756 to the third combiner 728. The third combiner 728 generates a high pass filtered estimated pitch attitude 758 based on subtracting the low pass filtered estimated pitch attitude 756 from the estimated aircraft pitch attitude 754. The third low pass filter 726 and the third combiner 728 act in conjunction to high pass filter the estimated aircraft pitch attitude 754 to generate the high pass filtered estimated pitch attitude 758. The third combiner 728 provides the high pass filtered estimated pitch attitude 758 to the fourth combiner 730. The high pass filtered estimated pitch attitude 758 represents a feedforward a priori estimate of the trim pitch attitude.

The fourth combiner 730 (e.g., output circuitry) generates the predicted pitch attitude trim value 442 based on adding (combining) the filtered aircraft trim pitch deviation signal 750, a low pass filtered pitch attitude signal 752, and the high pass filtered estimated pitch attitude 758. The fourth combiner 730 (e.g., the output circuitry) provides the predicted pitch attitude trim value 442 to the first switch 528, as described with reference to FIGS. 5 and 6. In other implementations, the pitch trim prediction circuitry 402 generates the predicted pitch attitude trim value 442 independent of the estimated aircraft pitch attitude 754. The signals 742, 744, 752, and 758 each have a complementary dynamic response such that the signals 742, 744, 752, and 758 may be summed to estimate the trim pitch attitude for the target vertical state.

Figure 8:
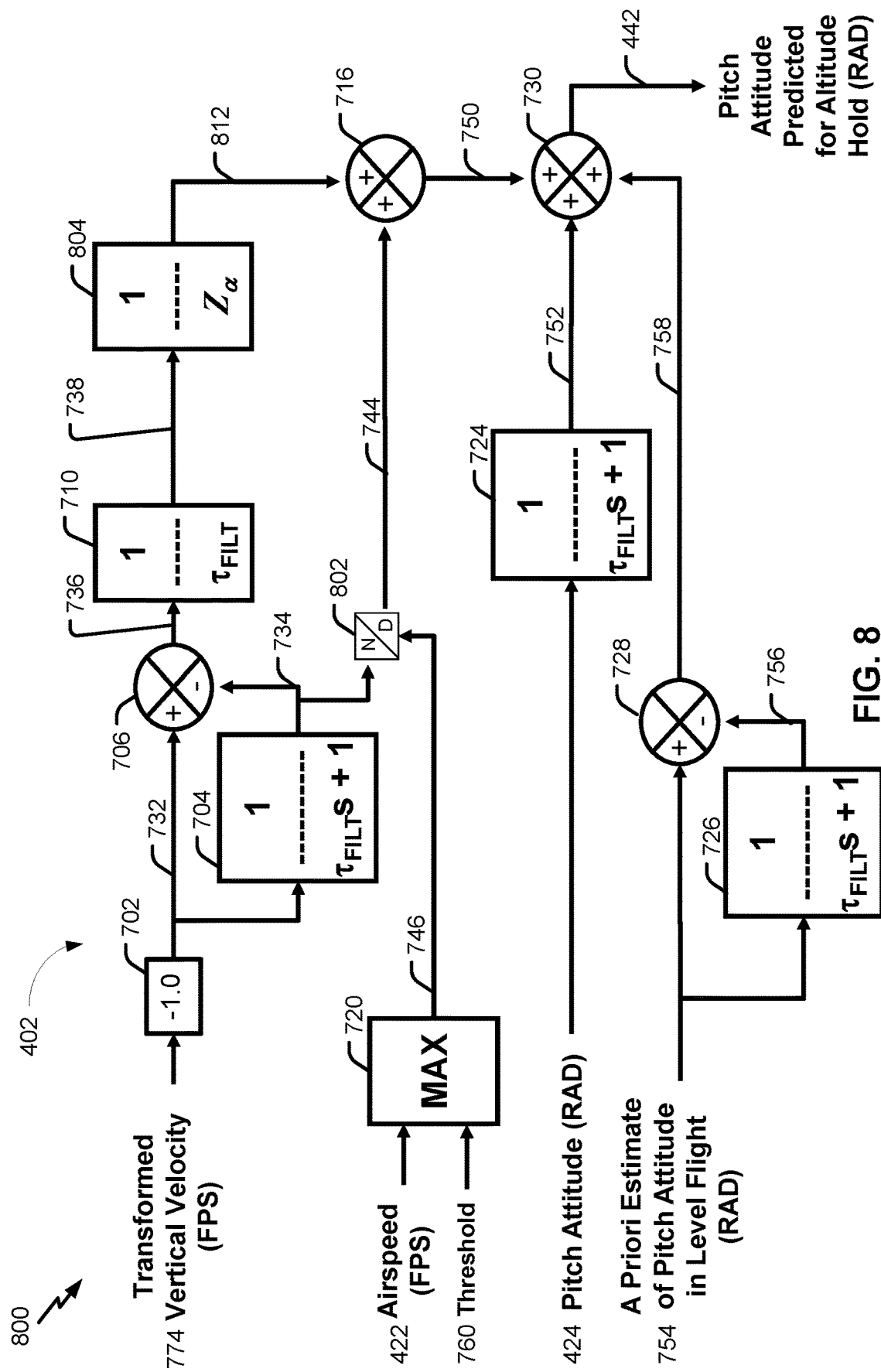
FIG. 8 is a circuit diagram that illustrates another example of a pitch trim prediction circuitry.

FIG. 8 is a circuit diagram 800 that illustrates another example of a circuit for predicting a pitch trim value, such as the pitch trim prediction circuitry 402 of FIGS. 4-6. The circuit diagram 800 can be used to control the aircraft 100 of FIG. 1, such as compound helicopters or tilt-rotor aircraft illustrated in FIGS. 2A-2D and 3A-3D. As illustrated in FIG. 8, the circuit diagram 800 is illustrated as pitch trim prediction circuitry 402 for a compound helicopter.

The circuit diagram 800 of FIG. 8 uses a normalized dimensional aircraft vertical force per angle of attack derivative ($Z\alpha$) instead of using the vertical damping derivative (Zw), as in the circuit diagram 700 of FIG. 7. As compared to the vertical damping derivative (Zw), the normalized dimensional aircraft vertical force per angle of attack derivative ($Z\alpha$) is more complex and more accurate for a high speed mode, a high speed aircraft, and/or aircraft that operate more like airplanes than helicopters. For example, the normalized dimensional aircraft vertical force per angle of attack derivative ($Z\alpha$) varies significantly with speed and multiple the normalized dimensional aircraft vertical force per angle of attack derivative ($Z\alpha$) values are used. A particular normalized dimensional aircraft vertical force per angle of attack derivative ($Z\alpha$) value may be calculated or retrieved from a table during operation.

The vertical damping derivative (Zw) is less complex and is accurate during normal operating envelopes for helicopters and low speed aircraft. For example, the vertical damping derivative (Zw) of a helicopter or a low speed aircraft is substantially constant for operational pitch attitudes and speed. Thus, the vertical damping derivative (Zw) (i.e., a single value) can be approximated and used for a range of aircraft speeds and such that any errors do not affect operation of the control circuitry 130.

As explained above, the pitch trim prediction circuitry 402 generates the predicted pitch attitude trim value 442 based on the vertical velocity 534 (e.g., a transformed vertical velocity 774 as shown in FIG. 8), the aircraft velocity 422, the pitch attitude 424, and the estimated aircraft pitch attitude 754. The propulsor trim prediction circuitry 404 includes the inverter 702, the low pass filters 704, 724, 726, the combiners 706, 716, 730, the gain circuitry 710, the comparison circuitry 720, a divider 802, and a normalized dimensional aircraft vertical force per angle of attack derivative ($Z\alpha$) circuitry 804. The coordinated transformation circuitry 772 is not shown in FIG. 8.

During operation, the pitch trim prediction circuitry 402 of FIG. 8 operates similar to the pitch trim prediction circuitry 402 of FIG. 7. In FIG. 8, the low pass filter 704 provides the low pass filtered vertical velocity signal 734 to a divider 802 (as opposed to the first multiplier 708 in FIG. 7). The divider 802 generates the vertical flight path angle signal 744 based on the selected speed 746 (rather than the inverse selected speed 748 as in the circuit diagram 700 of FIG. 7). The divider 802 provides the vertical flight path angle signal 744 to the second combiner 716 similar to the first multiplier 708 of FIG. 7.

In contrast to FIG. 7, the gain circuitry 710 outputs the filtered vertical acceleration 738 to the normalized dimensional aircraft vertical force per angle of attack derivative ($Z\alpha$) circuitry 804, as opposed to the gain circuitry 710 outputting to the filtered vertical acceleration 738 to the second multiplier 712. The normalized dimensional aircraft vertical force per angle of attack derivative ($Z\alpha$) circuitry 804 divides the filtered vertical acceleration 738 by the normalized dimensional aircraft vertical force per angle of attack derivative (Zα) to generate a second signal 812 and provides the signal 812 to the second combiner 716. The second combiner 716 generates the filtered aircraft trim pitch deviation signal 750 based on adding (combining) the normalized signal 812 and the vertical flight path angle signal 744. The second combiner 716 provides the filtered aircraft trim pitch deviation signal 750 to the fourth combiner 730 similar to FIG. 7.

The fourth combiner 730 generates the predicted pitch attitude trim value 442 based on adding (combining) the filtered aircraft trim pitch deviation signal 750, the low pass filtered pitch attitude signal 752, and the high pass filtered estimated pitch attitude 758. The fourth combiner 730 provides the predicted pitch attitude trim value 442 to the first switch 528, as described with reference to FIGS. 5 and 6. In other implementations, the pitch trim prediction circuitry 402 generates the predicted pitch attitude trim value 442 independent of the estimated aircraft pitch attitude 754.

The signals 742 and 812 represent the filtered pitch attitude change predicted to arrest or inhibit vertical acceleration, i.e., to achieve a target vertical state of zero vertical velocity. The signals are generated based on a high-pass filter of the vertical velocity 534. The pitch trim prediction circuitry 402 uses a priori knowledge (i.e., the estimated aircraft pitch attitude 754) of how pitch attitude affects vertical acceleration for the particular aircraft. The a priori knowledge may be expressed as a change in vertical force per change in angle of attack derivative (Zα) (804) or as a change in vertical force per change in vertical velocity derivative (Zw). In other implementations, the priori knowledge may be expressed as another value in a stability axis, a wind axis, or a body axis.

Figure 9:
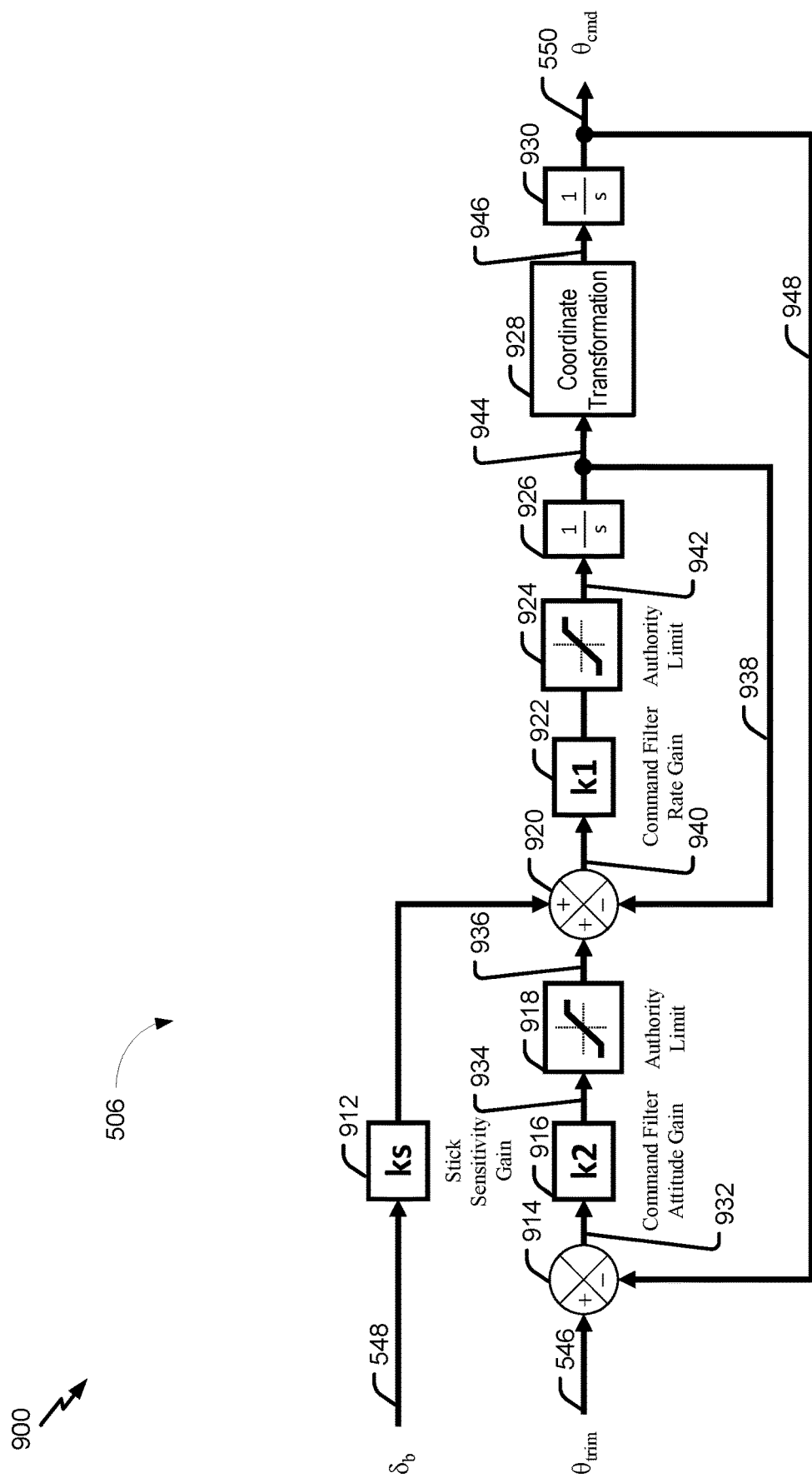
FIG. 9 is a circuit diagram that illustrates an example of a pitch command model.

FIG. 9 is a circuit diagram 900 that illustrates an example of a pitch command model, such as the pitch command model 506 of FIGS. 5 and 6. The circuit diagram 900 can be used to control the aircraft 100 of FIG. 1, such as compound helicopters or tilt-rotor aircraft illustrated in FIGS. 2A-2D and 3A-3D. As illustrated in FIG. 9, the circuit diagram 900 is illustrated as a pitch command model 506 for a compound helicopter.

As explained above, the pitch command model 506 generates the aircraft pitch attitude command 550 based on the selected pitch attitude trim value 546 and the pitch attitude input signal 548. The pitch command model 506 includes multiple amplifiers 912, 916, and 922, combiners 914 and 920, limiters 918 and 924, and integrators 926 and 930 and includes a coordinate transformation circuitry 928. The pitch command model 506 includes two feedback loops, such as an inner feedback loop and an outer feedback loop.

During operation, the first amplifier 912 (e.g., a stick sensitivity amplifier) receives the pitch attitude input signal 548 and amplifies the pitch attitude input signal 548. The first amplifier 912 outputs the amplified pitch attitude input signal 548 to the second combiner 920. The first combiner 914 receives the selected pitch attitude trim value 546 and the outer loop feedback signal 948 and generates an aircraft pitch attitude command error signal 932 by subtracting the outer loop feedback signal 948 from the selected pitch attitude trim value 546. The first combiner 914 outputs the aircraft pitch attitude command error signal 932 to the second amplifier 916 (e.g., a command filter attitude amplifier). The second amplifier 916 generates an aircraft pitch rate command signal 934 by applying gain (e.g., a command filter attitude gain k2) to the aircraft pitch attitude command error signal 932. The second amplifier provides the aircraft pitch rate command signal 934 to the first authority limiter 918.

The first authority limiter 918 generates a limited aircraft pitch rate command 936 by limiting the aircraft pitch rate command signal 934. For example, the first authority limiter 918 reduces or increases a value of the aircraft pitch rate command signal 934 based on one or more thresholds (e.g., authority thresholds). For example, the first authority limiter 918 compares the value of the aircraft pitch rate command signal 934 to a maximum pitch attitude value (e.g., a first threshold) and reduces the value of the aircraft pitch rate command signal 934 to the maximum pitch attitude value. In some implementations, the one or more thresholds of the first authority limiter 918 are based on conditions of the aircraft. To illustrate, the maximum pitch value (e.g., the first threshold) has multiple values (e.g., multiple thresholds or a variable threshold) depending on a speed of the aircraft and a temperature of the ambient air. The first authority limiter 918 outputs the limited aircraft pitch rate command 936 to the second combiner 920.

The second combiner 920 generates an aircraft pitch rate command error signal 940 based on subtracting an inner loop feedback signal 938 from a sum of the amplified pitch attitude input signal 548 and the limited aircraft pitch rate command 936. The second combiner 920 outputs the limited aircraft pitch rate command error signal 940 to the third amplifier 922 (e.g., a command filter rate gain amplifier). The third amplifier 922 generates the amplified aircraft pitch rate command error signal 940 by applying gain (e.g., a command rate filter gain k1) to the aircraft pitch attitude command error signal 932. The amplified aircraft pitch rate command error signal 940 indicates a pitch angular acceleration demand of the aircraft, such as a quantity of pitch moment to add or subtract based on the pitch attitude input signal 548 from the pitch control inceptor 526. The third amplifier 922 provides the amplified aircraft pitch rate command error signal 940 to the second authority limiter 924.

The second authority limiter 924 generates a pitch angular acceleration command 942 by limiting the amplified aircraft pitch rate command error signal 940. For example, the second authority limiter 924 reduces or increases a value of the aircraft pitch rate command error signal 940 based on one or more thresholds (e.g., authority thresholds). For example, the second authority limiter 924 compares the value of the aircraft pitch rate command error signal 940 to a maximum pitch value (e.g., a first threshold) and reduces the value of the aircraft pitch rate command error signal 940 to the maximum pitch value. In some implementations, the one or more thresholds of the second authority limiter 924 are based on conditions of the aircraft. To illustrate, the maximum pitch value (e.g., the first threshold) has multiple values (e.g., multiple thresholds or a variable threshold) depending on a speed of the aircraft 100 and a temperature of the ambient air. The second authority limiter 924 outputs the limited aircraft pitch rate command 936 to the first integrator 926.

The first integrator 926 integrates the pitch angular acceleration command 942 to generate a pitch rate command 944. The first integrator 926 provides the pitch rate command 944 to the coordinate transformation circuitry 928. Additionally, the first integrator 926 provides the pitch rate command 944 as the inner loop feedback signal 938 to the second combiner 920. The coordinate transformation circuitry 928 generates a pitch attitude rate command 946 by transforming the pitch rate command 944 from a first coordinate system to a second coordinate system. For example, the coordinate transformation circuitry 928 applies a Body to Euler coordinate transformation to transform the pitch rate command 944 into Euler coordinates. The coordinate transformation circuitry 928 outputs the pitch attitude rate command 946 to the second integrator 930. The second integrator 930 integrates the pitch attitude rate command 946 to generate the aircraft pitch attitude command 550. Additionally, the second integrator 930 provides the aircraft pitch attitude command 550 as an outer loop feedback signal 948 to the first combiner 914.

Figure 10:
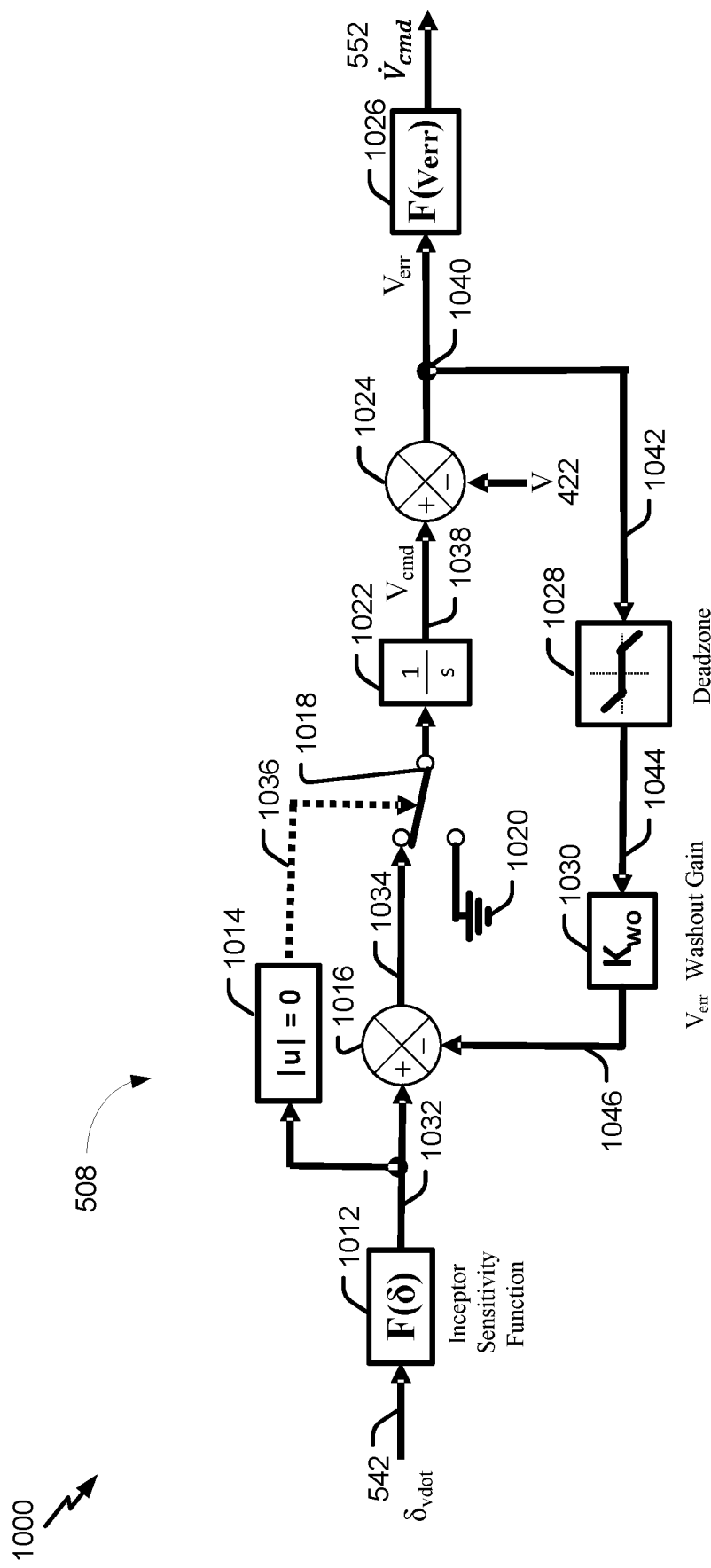
FIG. 10 is a circuit diagram that illustrates an example of a speed select circuitry.

FIG. 10 is a circuit diagram 1000 that illustrates an example of a circuit for a high speed mode or a speed select mode, such as the speed select circuitry 508 of FIGS. 5 and 6. The circuit diagram 1000 can be used to control the aircraft 100 of FIG. 1, such as compound helicopters or tilt-rotor aircraft illustrated in FIGS. 2A-2D and 3A-3D. In FIG. 10, the circuit diagram 1000 is illustrated as speed select circuitry 508 for a compound helicopter.

As explained above, the speed select circuitry 508 generates the speed select mode acceleration command 552 based on the v-dot command signal 542 and the predicted pitch attitude trim value 442. The speed select circuitry 508 includes multiple amplifiers 1012, 1026, and 1030 and combiners 1016 and 1024 and includes a comparison circuitry 1014, a switch 1018, and an integrator 1022. The speed select circuitry 508 includes a feedback loop and one terminal of the switch 1018 is coupled to ground 1020.

The switch 1018 is configured to output a pitch independent acceleration command error signal 1034 or a ground signal based on a control signal 1036 generated by the comparison circuitry 1014. As illustrated in FIG. 10, the switch 1018 is a single-pole, dual-throw switch and for the illustrated comparison condition (i.e., absolute value greater than zero) of the comparison circuitry 1014, the switch 1018 outputs the ground signal when the pitch independent acceleration command error signal 1034 is zero.

During operation, the first amplifier 1012 (e.g., an inceptor sensitivity amplifier) receives the v-dot command signal 542 and applies a first gain (e.g., a function dependent inceptor sensitivity gain F(delta)) to the v-dot command signal 542 to generate a pitch independent acceleration command 1032. For example, the first amplifier 1012 (or other circuitry) performs a table lookup using the v-dot command signal 542 to determine the first gain or to determine the pitch independent acceleration command 1032. As another example, the first amplifier 1012 (or other circuitry) performs a table lookup using another variable (e.g., speed) to determine the first gain, and the first amplifier 1012 applies the first gain to the v-dot command signal 542 to generate the pitch independent acceleration command 1032.

The first amplifier 1012 outputs the pitch independent acceleration command 1032 to the comparison circuitry 1014 and the first combiner 1016. The first combiner 1016 generates the pitch independent acceleration command error signal 1034 based on subtracting the washout signal 1046 from the pitch independent acceleration command 1032. The first combiner 1016 provides the pitch independent acceleration command error signal 1034 to the switch 1018.

The comparison circuitry 1014 generates the control signal 1036 based on a threshold or a comparison condition. As illustrated in FIG. 10, the comparison circuitry 1014 compares an absolute value of the pitch independent acceleration command 1032 to zero. When the absolute value of the pitch independent acceleration command 1032 is greater than zero (e.g., when the pitch independent acceleration command 1032 is not equal to zero), the comparison circuitry 1014 outputs the control signal 1036 having a first logical value (e.g., 1). When the absolute value of the pitch independent acceleration command 1032 is not greater than zero (i.e., when the pitch independent acceleration command 1032 is equal to zero), the comparison circuitry 1014 outputs the control signal 1036 having a second logical value (e.g., 0). As illustrated in FIG. 10, the absolute value of the pitch independent acceleration command 1032 is greater than zero, the comparison circuitry 1014 outputs the control signal 1036 having the first logical value (e.g., 1), and the switch 1018 outputs the control signal 1036 to the integrator 1022.

As illustrated in FIG. 10, the integrator 1022 integrates the pitch independent acceleration command error signal 1034 to generate a pitch independent speed command 1038. The integrator 1022 outputs the pitch independent speed command 1038 to the second combiner 1024. The second combiner 1024 generates a speed error signal 1040 based on subtracting the aircraft velocity 422 from the pitch independent speed command 1038. The second combiner 1024 provides the speed error signal 1040 to the second amplifier 1026 and provides the speed error signal 1040 to the deadzone limiter 1028 as a speed error feedback signal 1042. The second amplifier 1026 (e.g., a velocity error amplifier) receives the speed error signal 1040 and applies a second gain (e.g., a velocity error gain) to the speed error signal 1040 to generate the speed select mode acceleration command 552. The second gain (e.g., the velocity error gain) may be a constant value (Kverr) or a function dependent value (F(verr)). A function dependent gain enables non-linear control of the speed select mode acceleration command 552. The second amplifier 1026 outputs the speed select mode acceleration command 552 to the second switch 530, as illustrated in FIGS. 5 and 6.

The deadzone limiter 1028 generates a limited speed error feedback signal 1044 by limiting the speed error feedback signal 1042. For example, the deadzone limiter 1028 reduces or increases a value of the limited speed error feedback signal 1044 based on one or more thresholds (e.g., deadzone thresholds). For example, the deadzone limiter 1028 compares the value of the speed error feedback signal 1042 to a maximum velocity error value (e.g., a first threshold) and reduces the value of the speed error feedback signal 1042 to the maximum velocity error value. In some implementations, the one or more thresholds of the deadzone limiter 1028 are based on conditions of the aircraft 100. To illustrate, the maximum velocity error value (e.g., the first threshold) has multiple values (e.g., multiple thresholds or a variable threshold) depending on a speed of the aircraft 100 and a temperature of the ambient air. The deadzone limiter 1028 outputs the limited speed error feedback signal 1044 to the third amplifier 1030.

The third amplifier 1030 (e.g., a washout amplifier) receives the limited speed error feedback signal 1044 and applies a third gain (e.g., a washout gain Kwo) to the limited speed error feedback signal 1044 to generate a washout signal 1046. The third amplifier 1030 outputs the washout signal 1046 to the first combiner 1016.

Figure 11:
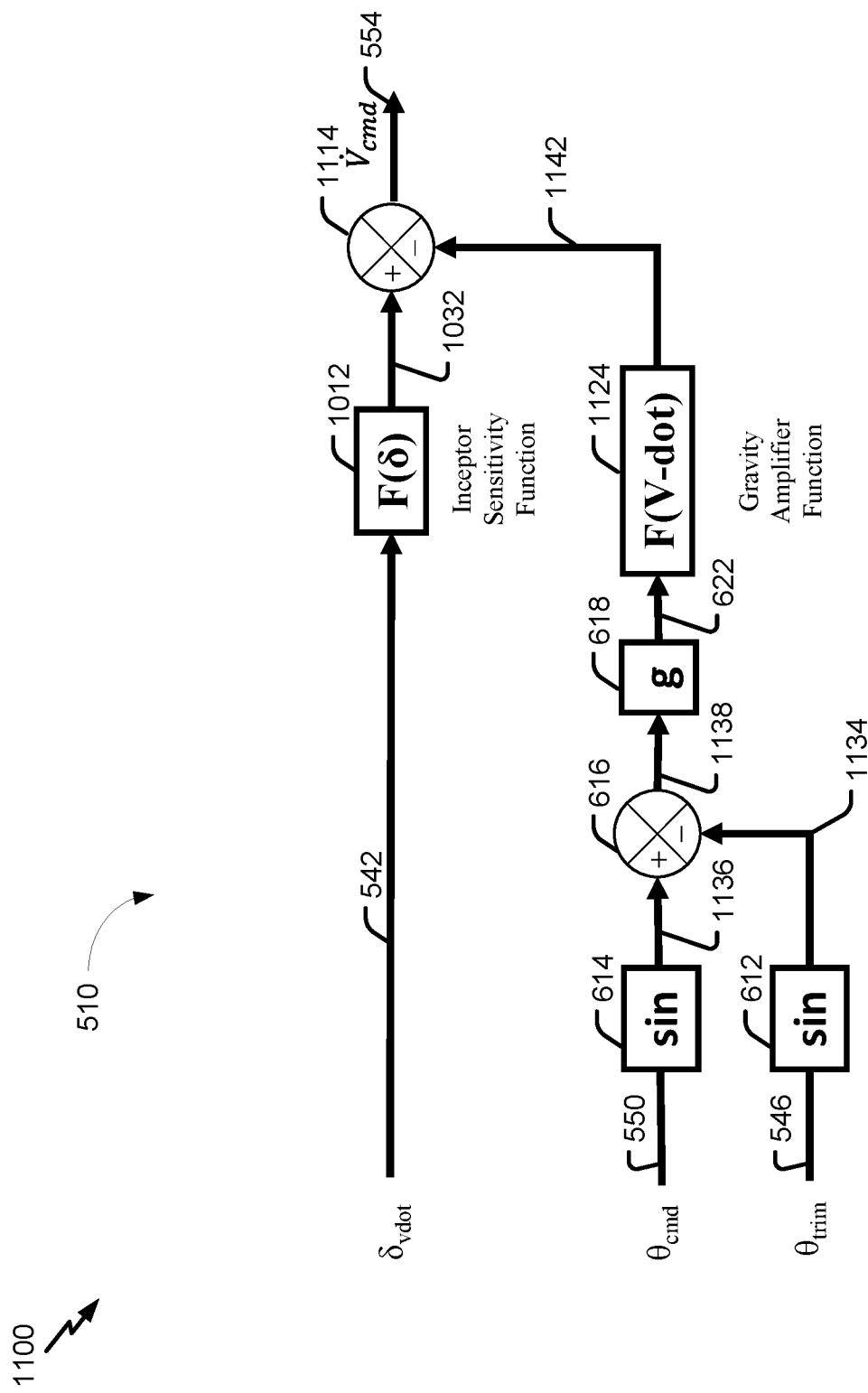
FIG. 11 is a circuit diagram that illustrates an example of an acceleration command circuitry.

FIG. 11 is a circuit diagram 1100 that illustrates an example of a circuit for a low speed mode or an acceleration command mode, such as the acceleration command circuitry 510 of FIGS. 5 and 6. The circuit diagram 1100 can be used to control the aircraft 100 of FIG. 1, such as compound helicopters or tilt-rotor aircraft illustrated in FIGS. 2A-2D and 3A-3D. In FIG. 11, the circuit diagram 1100 is illustrated as acceleration command circuitry 510 for a compound helicopter.

As explained above, the acceleration command circuitry 510 generates the acceleration command mode acceleration command 554 based on the v-dot command signal 542, the selected pitch attitude trim value 546, and the regime signal 540. The acceleration command circuitry 510 includes a first amplifier 1012, a first combiner 1114, the first sine function circuitry 612, the combiner 616, the second sine function circuitry 614, the gravity multiplier 618, and a gravity amplifier 1124.

The gravity amplifier 1124 is configured to amplify the gravity compensated longitudinal acceleration signal 622 by a gain value to generate a gravity amplified signal (a gravity compensated command 1142). In some implementations, the gain value is a function dependent gain and is generated based on one or more variables, such as velocity, acceleration, pitch attitude, etc. In other implementations, the gain is a constant value or the gain is determined by performing a table lookup to a table including gravity amplifier gain values. For example, the table indicates the gain is a value of one for small commanded changes in pitch attitude to provide harmony with the lateral axis. The table indicates a larger gain value (i.e., increases the gain of the gravity amplifier 1124) for larger commanded changes in pitch attitude to avoid large pitch attitudes and the commensurate obstruction of pilot sight lines at large pitch attitudes. Additionally, the gain value may be zero such that commanded changes in pitch attitude do not command changes in velocity. The table lookup is performed based on a single variable (e.g., speed) or based on multiple variables (e.g., speed and pitch attitude).

During operation, the first amplifier 1012 (e.g., an inceptor sensitivity amplifier) receives the v-dot command signal 542 and applies a first gain (e.g., a function dependent inceptor sensitivity gain F(delta)) to the v-dot command signal 542 to generate the pitch independent acceleration command 1032, as described with reference to FIG. 10. The first amplifier 1012 outputs the pitch independent acceleration command 1032 to the first combiner 1114. The first combiner 1114 generates the acceleration command mode acceleration command 554 based on subtracting the gravity compensated command 1142 from the pitch independent acceleration command 1032. The first combiner 1114 provides the acceleration command mode acceleration command 554 to the second switch 530 of FIG. 5, as described with reference to FIGS. 5 and 6.

The first sine function circuitry 612 receives the selected pitch attitude trim value 546 and applies the sine function to the selected pitch attitude trim value 546 to generate a sine of the selected pitch attitude trim value 1134. The second sine function circuitry 614 receives the aircraft pitch attitude command 550 and applies the sine function to the aircraft pitch attitude command 550 to generate a sine of the aircraft pitch attitude command 1136. The first sine function circuitry 612 and the second sine function circuitry 614 provide the sine of the selected pitch attitude trim value 1134 and the sine of the aircraft pitch attitude command 1136 to the combiner 616. The combiner 616 generates a longitudinal acceleration signal 1138 by subtracting the sine of the selected pitch attitude trim value 1134 from the sine of the aircraft pitch attitude command 1136. The combiner 616 outputs the longitudinal acceleration signal 1138 to the gravity multiplier 618. The gravity multiplier 618 multiplies the longitudinal acceleration signal 1138 by gravity (e.g., an acceleration due to gravity constant or an experienced gravity value) to generate the gravity compensated longitudinal acceleration signal 622. The gravity multiplier 618 outputs the gravity compensated longitudinal acceleration signal 622 to the gravity amplifier 1124.

The gravity amplifier 1124 generates the gravity compensated command 1142 based on the gravity compensated longitudinal acceleration signal 622. For example, the gravity amplifier 1124 applies a first gain (e.g., a function dependent gravity amplifier gain F(v-dot)) to the gravity compensated longitudinal acceleration signal 622 to generate the gravity compensated command 1142. The first gain (e.g., the function dependent gravity amplifier gain F(v-dot)) may be dependent on one or more factors, such as velocity, acceleration, attitude, etc. In a particular implementation, the gravity amplifier 1124 retrieves the first gain value from a table. The gravity amplifier 1124 outputs the gravity compensated command 1142 to the first combiner 1114.

Figure 12:
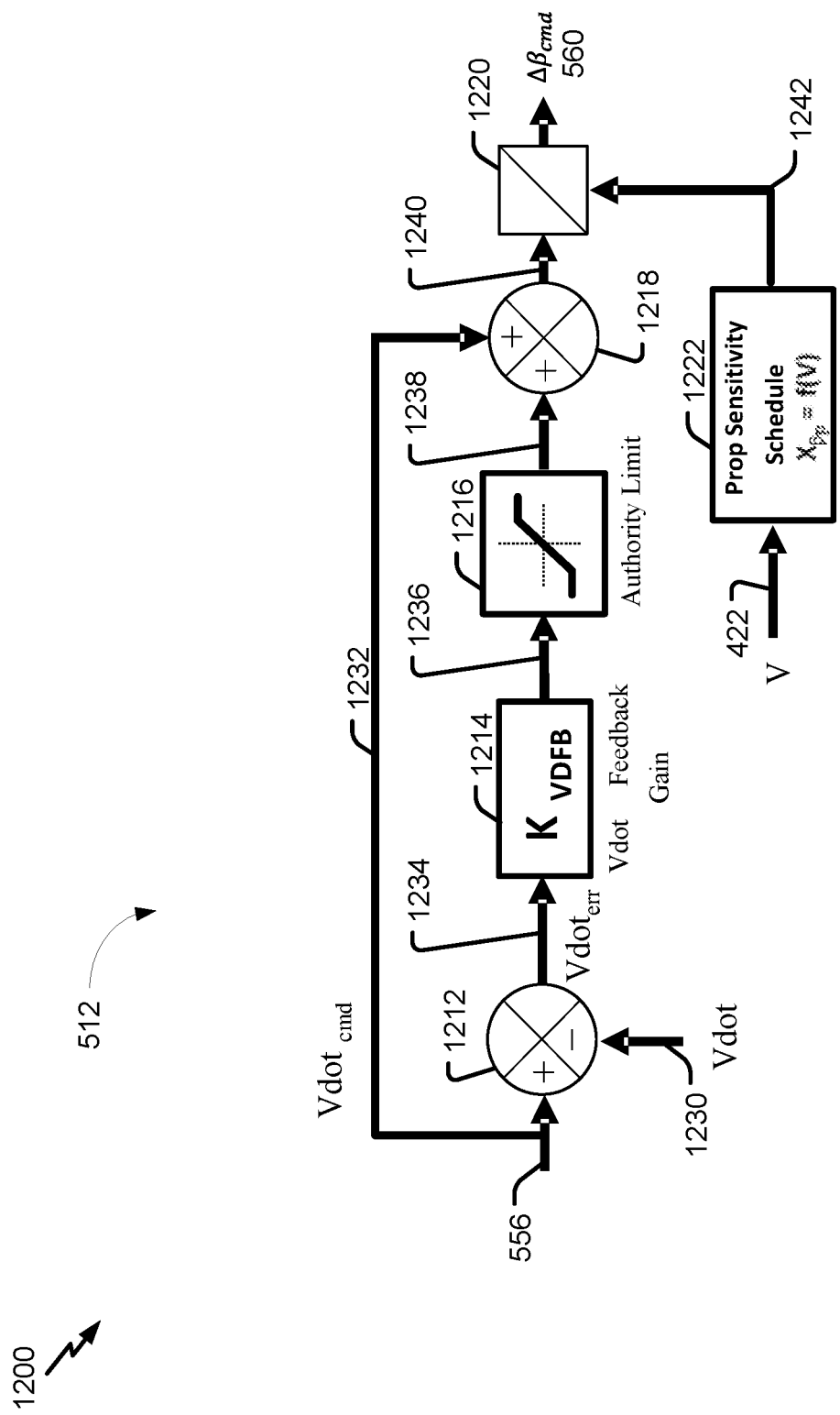
FIG. 12 is a circuit diagram that illustrates an example of an acceleration controller.

FIG. 12 is a circuit diagram 1200 that illustrates an example of a circuit for generating a delta propulsor command, such as the acceleration controller 512 of FIGS. 5 and 6. The circuit diagram 1200 can be used to control the aircraft 100 of FIG. 1, such as compound helicopters or tilt-rotor aircraft illustrated in FIGS. 2A-2D and 3A-3D. In FIG. 12, the circuit diagram 1200 is illustrated as an acceleration controller 512 for a compound helicopter.

As explained above, the acceleration controller 512 generates the delta propulsor collective blade pitch command 560 based on the predicted pitch attitude trim value 442 and the selected acceleration command 556. In FIG. 12, the acceleration controller 512 further generates the delta propulsor collective blade pitch command 560 based on an input v-dot 1230 (e.g., measured acceleration or acceleration feedback). The acceleration controller 512 includes a first combiner 1212, an amplifier 1214, an authority limiter 1216, a second combiner 1218, a divider 1220, and a propulsor sensitivity scheduler 1222.

The propulsor sensitivity scheduler 1222 is configured to generate a propulsor sensitivity value 1242 based on the aircraft velocity 422. For example, the propulsor sensitivity scheduler 1222 generates the propulsor sensitivity value 1242 by performing a table lookup using the aircraft velocity 422. As another example, the propulsor sensitivity scheduler 1222 calculates the propulsor sensitivity value 1242 using a function where the aircraft velocity 422 is an input variable. Other aircraft or propulsor characteristics can be used as the input variable, such as propeller rotational speed. The propulsor sensitivity value 1242 is configured to adjust or convert units of a signal (i.e., perform dimensional conversion or dimensional analysis). For example, as illustrated in FIG. 12, the propulsor sensitivity value 1242 converts the units of a combined acceleration command 1240 (e.g., having a value indicating acceleration) into another type of units (e.g., having a value indicating force in terms of propulsor values, such as force per propulsor collective blade angle).

During operation, the acceleration controller 512 receives the selected acceleration command 556 from the second switch 530 of FIG. 5, as described with reference to FIGS. 5 and 6. The selected acceleration command 556 is provided to the first combiner 1212 and is provided as a feedforward acceleration command 1232 to second combiner 1218. The first combiner 1212 generates an acceleration error signal 1234 by subtracting the input v-dot 1230 from the selected acceleration command 556 and provides the acceleration error signal 1234 to the amplifier 1214 (e.g., a v-dot feedback amplifier). The amplifier 1214 applies a first gain (e.g., a v-dot feedback gain Kvdfb) to the acceleration error signal 1234 to generate an acceleration feedback command 1236. The amplifier 1214 outputs the acceleration feedback command 1236 to the authority limiter 1216 (e.g., authority limiting circuitry).

The authority limiter 1216 generates a limited acceleration feedback command 1238 by limiting the acceleration feedback command 1236. For example, the authority limiter 1216 reduces or increases a value of the acceleration feedback command 1236 based on one or more thresholds (e.g., authority thresholds). For example, the authority limiter 1216 compares the value of the acceleration feedback command 1236 to a maximum (or minimum) velocity error value (e.g., a first threshold) and reduces the value of the acceleration feedback command 1236 to the maximum velocity error value. In some implementations, the one or more thresholds of the authority limiter 1216 are based on conditions of the aircraft 100. To illustrate, the velocity error value (e.g., the first threshold) has multiple values (e.g., multiple thresholds or a variable threshold) depending on a speed of the aircraft 100 and a temperature of the ambient air. The authority limiter 1216 outputs the limited acceleration feedback command 1238 to the second combiner 1218.

The second combiner 1218 generates the combined acceleration command 1240 by adding (combining) the feedforward acceleration command 1232 and the limited acceleration feedback command 1238 and provides the combined acceleration command 1240 to the divider 1220. The divider 1220 generates the delta propulsor collective blade pitch command 560 by dividing the combined acceleration command 1240 by a propulsor sensitivity value 1242. The propulsor sensitivity scheduler 1222 generates the propulsor sensitivity value 1242 based on the aircraft velocity 422. The divider 1220 outputs the delta propulsor collective blade pitch command 560 to the combiner 516 of FIG. 5, as described with reference to FIGS. 5 and 6.

Figure 13:
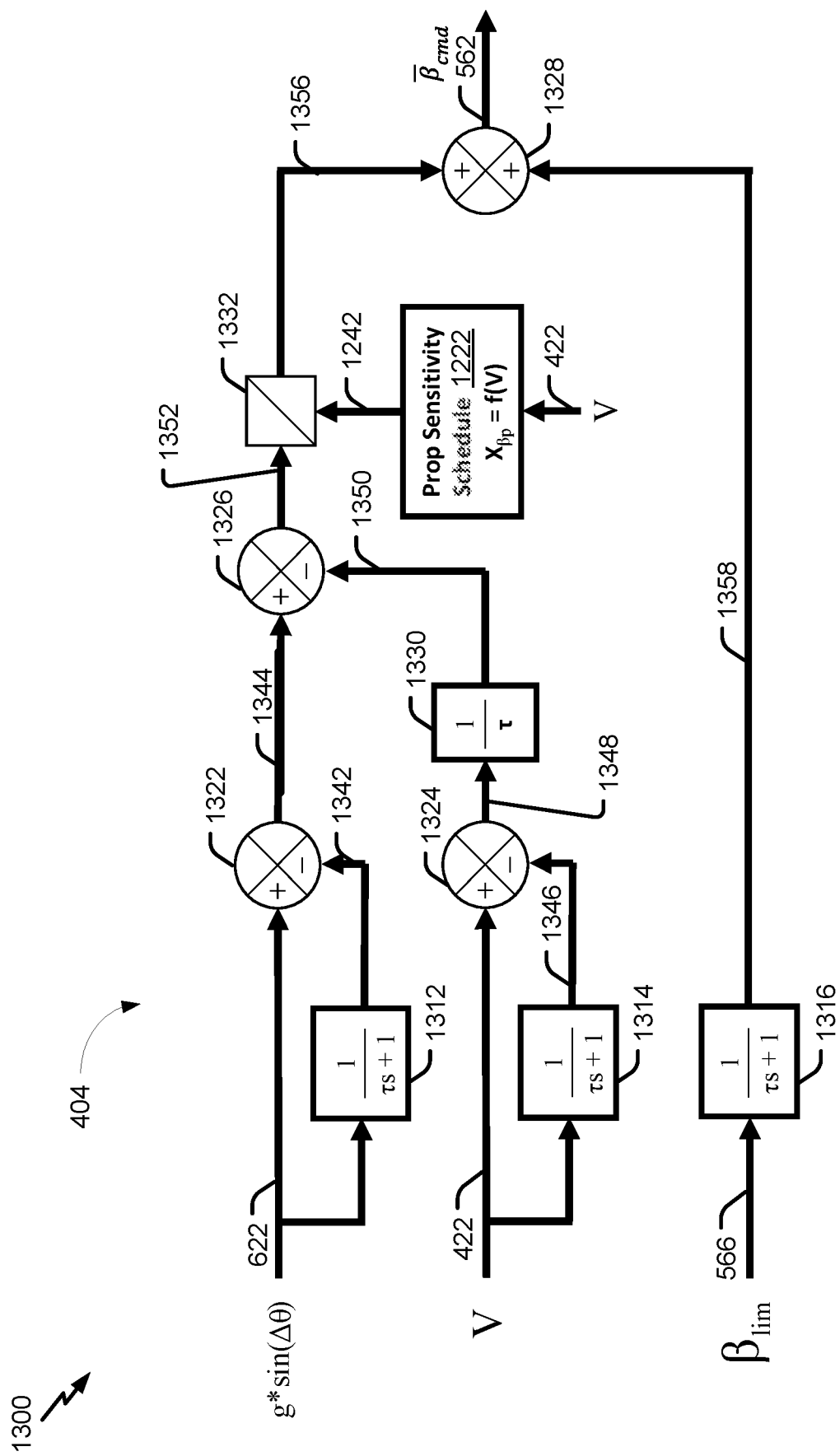
FIG. 13 is a circuit diagram that illustrates an example of a propulsor trim prediction circuitry.

FIG. 13 is a circuit diagram 1300 that illustrates an example of a circuit for predicting a propulsor trim value, such as the propulsor trim prediction circuitry 404 of FIGS. 4-6. The circuit diagram 1300 can be used to control the aircraft 100 of FIG. 1, such as compound helicopters or tilt-rotor aircraft illustrated in FIGS. 2A-2D and 3A-3D. In FIG. 13, the circuit diagram 1300 is illustrated as propulsor trim prediction circuitry 404 for a compound helicopter.

As explained with reference to FIGS. 4-6, the propulsor trim prediction circuitry 404 is configured to generate the predicted propulsor collective blade pitch trim value 562 based on the aircraft velocity 422, the propulsor collective blade pitch feedback 566, the gravity compensated longitudinal acceleration signal 622, or a combination thereof. The propulsor trim prediction circuitry 404 includes low pass filters 1312-1316, combiners 1322-1328, a gain circuitry 1330, a divider 1332, and the propulsor sensitivity scheduler 1222. Although, the propulsor trim prediction circuitry 404 receives the gravity compensated longitudinal acceleration signal 622 in FIG. 13, in other implementations, the propulsor trim prediction circuitry 404 receives selected pitch attitude trim value 546 and the aircraft pitch attitude command 550, as illustrated in FIG. 5. In such implementations, the propulsor trim prediction circuitry 404 includes a gravity compensator (e.g., the components 612-618 of FIG. 6) configured to generate the gravity compensated longitudinal acceleration signal 622 based on the selected pitch attitude trim value 546 and the aircraft pitch attitude command 550, as described wither reference to FIGS. 6 and 11.

During operation, the propulsor trim prediction circuitry 404 receives the aircraft velocity 422, the propulsor collective blade pitch feedback 566, and the gravity compensated longitudinal acceleration signal 622. As illustrated in FIG. 13, the first low pass filter 1312 and the first combiner 1322 receive the gravity compensated longitudinal acceleration signal 622. The first low pass filter 1312 filters the gravity compensated longitudinal acceleration signal 622 to generate a low pass filtered gravity compensated longitudinal acceleration signal 1342. The first combiner 1322 further receives the low pass filtered gravity compensated longitudinal acceleration signal 1342 and subtracts the low pass filtered gravity compensated longitudinal acceleration signal 1342 from the gravity compensated longitudinal acceleration signal 622 to generate a high pass filtered gravity compensated longitudinal acceleration signal 1344. The first combiner 1322 outputs the high pass filtered gravity compensated longitudinal acceleration signal 1344 to the third combiner 1326.

The second low pass filter 1314 and the second combiner 1324 receive the aircraft velocity 422 (or a scalar value, i.e., speed). The second low pass filter 1314 filters the aircraft velocity 422 to generate a low pass filtered aircraft velocity 1346. The second combiner 1324 further receives the low pass filtered aircraft velocity 1346 and subtracts the low pass filtered aircraft velocity 1346 from the aircraft velocity 422 to generate a high pass filtered aircraft velocity 1348 (or a high pass filtered speed). The second combiner 1324 outputs the high pass filtered aircraft velocity 1348 to the gain circuitry 1330. The gain circuitry 1330 applies a gain to the high pass filtered aircraft velocity 1348 to generate a filtered acceleration feedback 1350. The filtered acceleration feedback 1350 is a signal that indicates an estimated acceleration of the aircraft. As illustrated in FIG. 13, the aircraft velocity 422 is filtered by a first order low pass filter ($\tau s+1$) and then the difference of the aircraft velocity 422 and the low pass filtered aircraft velocity 1346 (i.e., the high pass filtered aircraft velocity 1348) is multiplied by a gain of the inverse of the trim prediction lag filter time constant ($1/\tau$) to generate the filtered acceleration feedback 1350. Thus, the filtered acceleration feedback 1350 has a transfer function of $s/(\tau s+1)$, where "s" represents a derivative of speed, i.e., acceleration. The gain circuitry 1330 outputs the filtered acceleration feedback 1350 to the third combiner 1326.

The third combiner 1326 (e.g., intermediary circuitry) subtracts the filtered acceleration feedback 1350 from the high pass filtered gravity compensated longitudinal acceleration signal 1344 to generate an offset value 1352 (e.g., a longitudinal acceleration offset value). The third combiner 1326 outputs the offset value 1352 to the divider 1332. The divider 1332 divides the offset value 1352 by the propulsor sensitivity value 1242 to generate a filtered longitudinal control effector error 1356 (e.g., a propulsor force offset value). The filtered longitudinal control effector error 1356 (e.g., a derived propulsor value) indicates an error based on (e.g., of or from) the pitch attitude deviation in terms of an amount of propulsor force or a propulsor setting value.

As explained with reference to FIG. 12, the propulsor sensitivity scheduler 1222 generates the propulsor sensitivity value 1242 (propulsor control derivative or propulsor sensitivity or propulsor control sensitivity) based on the aircraft velocity 422. For example, as illustrated in FIG. 13, the propulsor sensitivity value 1242 converts the units of the offset value 1352 (e.g., having a value indicating acceleration) into another type of units (e.g., having a value indicating force in terms of propulsor values, such as force per propulsor collective blade angle). In some implementations, the propulsor sensitivity value 1242 includes or corresponds to normalized dimensional aircraft longitudinal force per propulsor collective blade pitch angle derivative value.

The third low pass filter 1316 receives the propulsor collective blade pitch feedback 566 and low pass filters the propulsor collective blade pitch feedback 566 to generate a low pass filtered propulsor collective blade pitch feedback 1358. The third low pass filter 1316 outputs the low pass filtered propulsor collective blade pitch feedback 1358 to the fourth combiner 1328. The fourth combiner 1328 (e.g., output circuitry) combines the filtered longitudinal control effector error 1356 and the low pass filtered propulsor collective blade pitch feedback 1358 to generate the predicted propulsor collective blade pitch trim value 562. The fourth combiner 1328 (e.g., the output circuitry) outputs the predicted propulsor collective blade pitch trim value 562 to the combiner 516 of FIG. 5, as described with reference to FIG. 5.

In other implementations, other types of filters or equivalent circuitry may be used in FIGS. 7-13. For example, a high pass filter may be used in place of a combiner and a low pass filter. As another example, a high pass filter and combiner may be used in place of a low pass filter to generate a low pass filtered signal.

Figure 14:
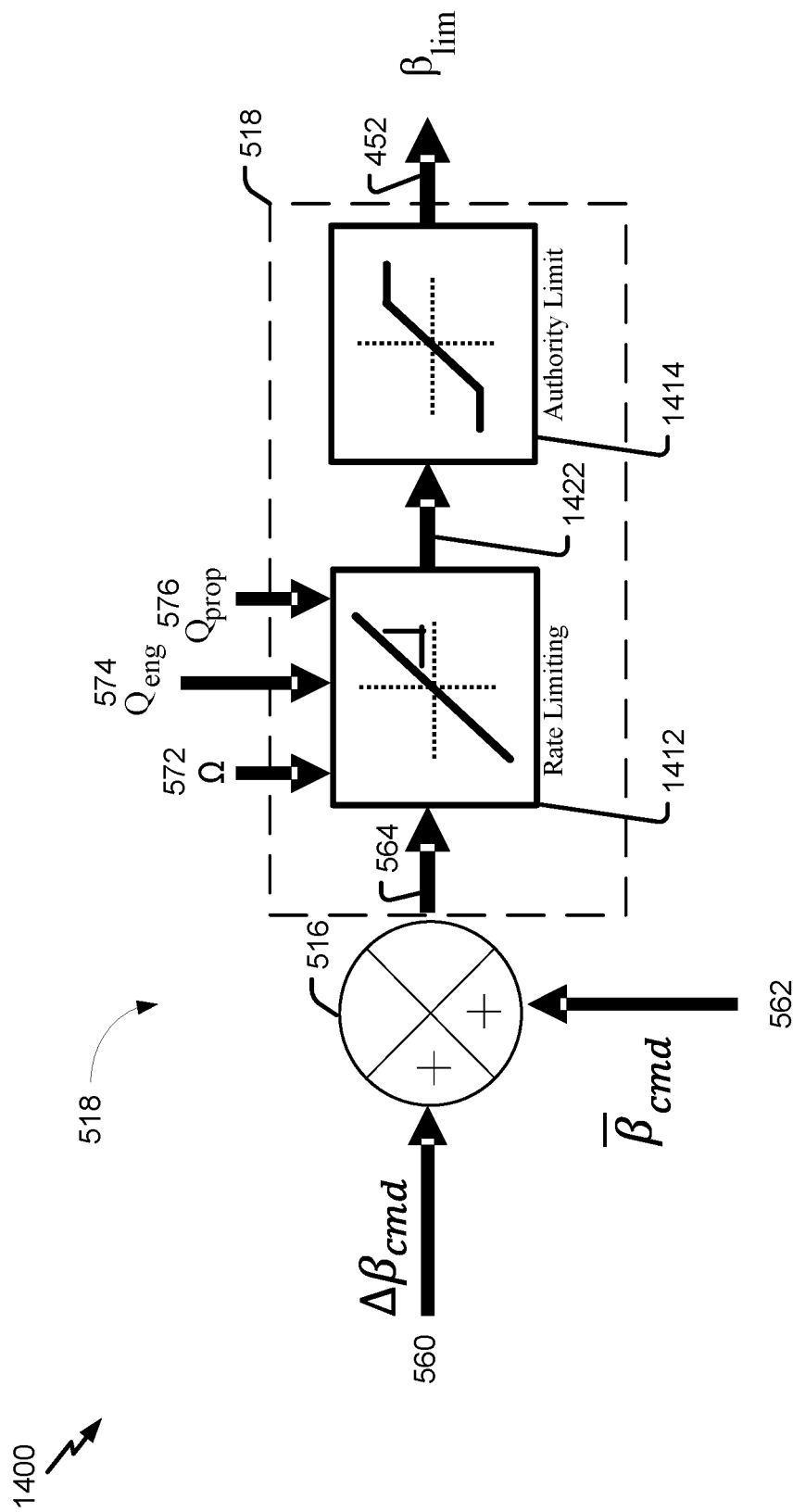
FIG. 14 is a circuit diagram that illustrates an example of a propulsor limiting circuitry.

FIG. 14 is a circuit diagram 1400 that illustrates an example of a circuit for propulsor limiting, such as the propulsor limiting circuitry 518 of FIGS. 5 and 6. The circuit diagram 1400 can be used to control the aircraft 100 of FIG. 1, such as compound helicopters or tilt-rotor aircraft illustrated in FIGS. 2A-2D and 3A-3D. In FIG. 14, the circuit diagram 1400 is illustrated as propulsor limiting circuitry 518 for a compound helicopter.

As explained with reference to FIG. 5, the propulsor limiting circuitry 518 is configured to output the propulsor command 452 based on the combined propulsor command 564. As illustrated in FIG. 14, the propulsor limiting circuitry 518 includes rate limiting circuitry 1412 and authority limiting circuitry 1414. The rate limiting circuitry 1412 is configured to limit changes in the combined propulsor command 564 based on characteristics of the propulsor. For example, the rate limiting circuitry 1412 is configured to limit an amount of change in the combined propulsor command 564 over time (e.g., a difference between a current value and a previous value of the combined propulsor command 564). As illustrated in FIG. 14, the rate limiting circuitry 1412 generates a rate limited propulsor command 1422 based on the combined propulsor command 564. As an illustrative, non-limiting example, the rate limiting circuitry 1412 calculates a difference value between a previous value of the combined propulsor command 564 and a current value of the combined propulsor command 564. The rate limiting circuitry 1412 compares the difference value to one more thresholds (e.g., rate thresholds). Based on the difference value exceeding a first threshold value or failing to a meet a second threshold value, the value of the combined propulsor command 564 is adjusted to one of the threshold values.

The authority limiting circuitry 1414 is configured to limit changes in the rate limited propulsor command 1422 (or the combined propulsor command 564) based on characteristics of the propulsor and conditions of the propulsor and aircraft 100. As illustrated in FIG. 14, the authority limiting circuitry 1414 generates the propulsor command 452 based on the rate limited propulsor command 1422. For example, the authority limiting circuitry 1414 is configured to limit a value of the rate limited propulsor command 1422. As an illustrative, non-limiting example, the authority limiting circuitry 1414 compares the value of the combined propulsor command 564 or the rate limited propulsor command 1422 to one more thresholds (e.g., one or more maximum and minimum values. In some implementations, the thresholds (e.g., authority thresholds) have different values based on current conditions of the aircraft 100.

During operation, the combiner 516 generates the combined propulsor command 564 based on the delta propulsor collective blade pitch command 560 and the predicted propulsor collective blade pitch trim value 562, as described with reference to FIG. 5. The combiner 516 provides the combined propulsor command 564 to the rate limiting circuitry 1412 of the propulsor limiting circuitry 518. The rate limiting circuitry 1412 generates the rate limited propulsor command 1422 based on the combined propulsor command 564. The rate limiting circuitry 1412 outputs the rate limited propulsor command 1422 to the authority limiting circuitry 1414. The authority limiting circuitry 1414 generates the propulsor command 452 based on the rate limited propulsor command 1422. The authority limiting circuitry 1414 outputs the propulsor command 452 to the propulsor actuator 116 of FIGS. 1 and 5, as described with reference to FIG. 5.

Figure 15:
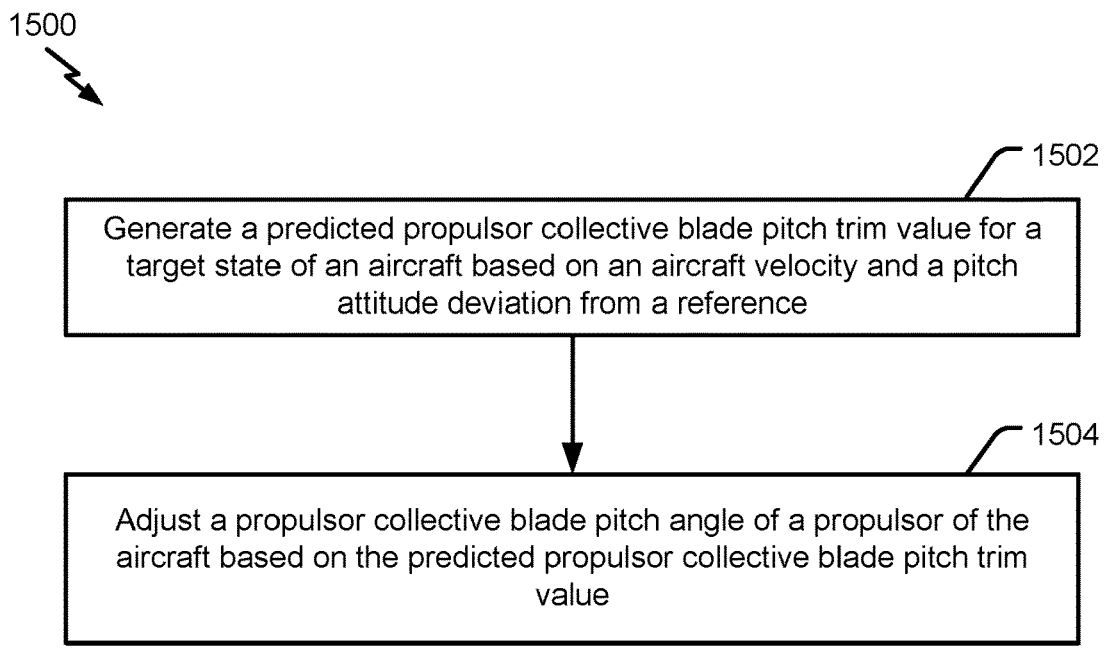
FIG. 15 is a flow chart of an example of a method for controlling an aircraft.

FIG. 15 illustrates a particular example of a method 1500 for controlling an aircraft, such as the aircraft 100 of FIG. 1. In some implementations, the aircraft is a compound helicopter, a multi-rotor aircraft, a high speed vertical takeoff and landing (VTOL) aircraft, or a combination thereof. The method 1500 may be performed by a control circuitry or components thereof, such as the control circuitry 130 of FIGS. 1 and 4-14.

The method 1500 includes, at 1502, generating a predicted propulsor collective blade pitch trim value for a target state of the aircraft based on an aircraft velocity and a pitch attitude deviation from a reference. For example, the predicted propulsor collective blade pitch trim value may include or correspond to the predicted propulsor trim value 444 of FIG. 4 or the predicted propulsor collective blade pitch trim value 562 of FIG. 5. The target state may include, or correspond to, a target horizontal state (e.g., an airspeed hold state or an acceleration hold state). The aircraft velocity may include, or correspond to, the aircraft velocity 422 of FIG. 4 or the vertical velocity 534 of FIG. 5, and the pitch attitude deviation from the reference may include, or correspond to, the aircraft pitch attitude command 550 of FIG. 5 or the gravity compensated longitudinal acceleration signal 622 of FIG. 6.

The method 1500 includes, at 1504, adjusting propulsor collective blade pitch angle of a propulsor of the aircraft based on the predicted propulsor collective blade pitch trim value. For example, the propulsor actuator 116 adjusts a collective blade pitch angle of a propulsor (e.g., a propeller) of the aircraft 100 of FIGS. 2A-2D, as described with reference to FIGS. 1, 2A, 4, 5, and 13.

In some implementations, the predicted propulsor collective blade pitch trim value is an estimated value of a collective blade pitch angle setting of the propulsor that produces a magnitude of thrust for an airspeed hold state or an acceleration hold state of the aircraft. Additionally or alternatively, the propulsor collective blade pitch angle command is configured to adjust a magnitude of thrust generated by the propulsor, and the propulsor collective blade pitch angle command is configured to cause the aircraft to operate in an airspeed hold state or an acceleration hold state of the aircraft. In a particular implementation, the propulsor collective blade pitch angle command (e.g., the propulsor command 452) is output by output circuitry that includes, or corresponds to, the combiner 516, the propulsor limiting circuitry 518, or a combination thereof.

In some implementations, the method 1500 further includes generating a gravity compensated longitudinal acceleration based on a sine value of a selected aircraft trim pitch attitude value and a sine value of a commanded pitch attitude, where the predicted propulsor collective blade pitch trim value is generated based on the gravity compensated longitudinal acceleration. For example, the gravity compensator 612-618 generates the gravity compensated longitudinal acceleration signal 622 based on the sine value of the selected pitch attitude trim value 1134 and the sine of the aircraft pitch attitude command 1136, as described with reference to FIGS. 6 and 11. The propulsor trim prediction circuitry 404 generates the predicted propulsor trim value 444 based on the gravity compensated longitudinal acceleration signal 622, as described with reference to FIG. 13.

In some implementations, the method 1500 further includes operating in a speed select mode based on a regime signal. In a particular implementation, operating in the speed select mode includes generating a pitch independent speed command based on a pitch independent acceleration command, where the pitch independent acceleration command is generated based on one or more pilot inputs. Operating in the speed select mode also includes generating a speed error signal based on subtracting the aircraft velocity from the pitch independent speed command, and applying a gain function to the speed error signal to generate a speed select mode acceleration command. Operating in the speed select mode further includes generating the propulsor collective blade pitch angle command based on the speed select mode acceleration command and the predicted propulsor collective blade pitch trim value, the propulsor collective blade pitch angle of the propulsor adjusted based on the propulsor collective blade pitch angle command. For example, the speed select circuitry 508 generates the pitch independent acceleration command 1032 by performing a table lookup using the v-dot command signal 542 (e.g., thumbwheel inceptor input). The speed select circuitry 508 generates the pitch independent acceleration command error signal 1034 based on the independent acceleration command 1032 and integrates the pitch independent acceleration command error signal 1034 to generate the pitch independent speed command 1038. The speed select circuitry 508 generates the speed error signal 1040 based on subtracting the aircraft velocity 422 from the pitch independent speed command 1038 and applies the velocity error gain F(verr) to the speed error signal 1040 to generate the speed select mode acceleration command 552, as described with reference to FIG. 10.

In some implementations, the method 1500 further includes operating in an acceleration command mode based on a regime signal. In a particular implementation, operating in the acceleration command mode includes generating an acceleration command mode acceleration command based on a pitch independent acceleration command and a gravity amplified longitudinal acceleration command, where the pitch independent acceleration command is generated based on one or more pilot inputs. Operating in the acceleration command mode further includes generating the propulsor collective blade pitch angle command based on the acceleration command mode acceleration command and the predicted propulsor collective blade pitch trim value, the propulsor collective blade pitch angle of the propulsor adjusted based on the propulsor collective blade pitch angle command. For example, the acceleration command circuitry 510 (e.g., the acceleration command mode circuitry) generates the pitch independent acceleration command 1032 by performing a table lookup using the v-dot command signal 542 (e.g., thumbwheel inceptor input). The acceleration command circuitry 510 generates the acceleration command mode acceleration command 554 based on combining the pitch independent acceleration command 1032 and the gravity compensated command 1142 generated by the gravity amplifier 1124.

Figure 16:
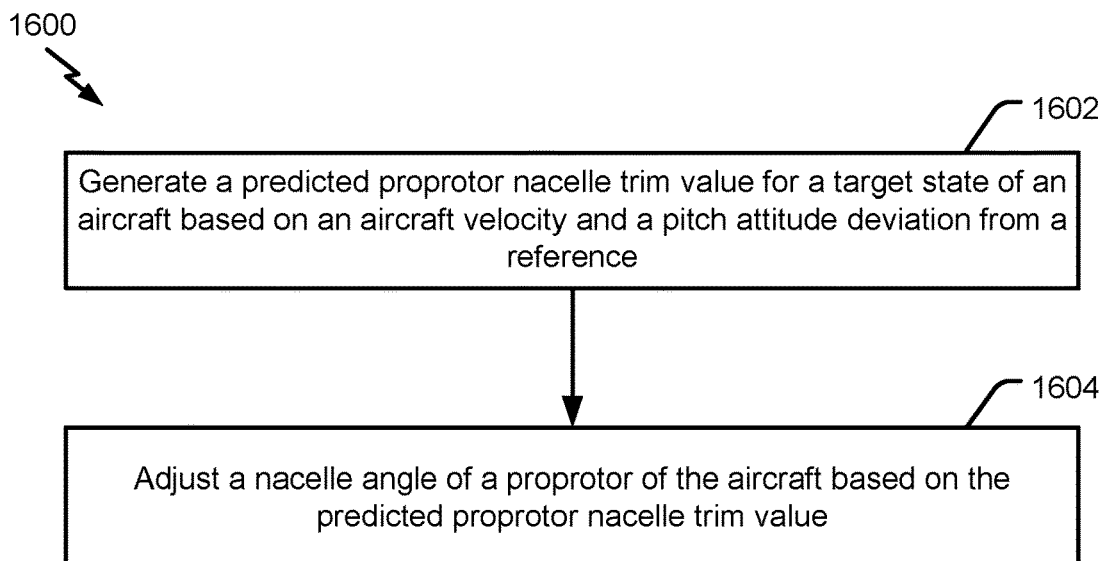
FIG. 16 is a flow chart of another example of a method for controlling an aircraft.

FIG. 16 illustrates a particular example of a method 1600 for controlling an aircraft, such as the aircraft 100 of FIG. 1. The method 1600 may be performed by a control circuitry or components thereof, such as the control circuitry 130 of FIGS. 1 and 4-14.

The method 1600 includes, at 1602, generating a predicted proprotor nacelle trim value for a target state of the aircraft based on an aircraft velocity and a pitch attitude deviation from a reference. For example, the predicted proprotor nacelle trim value may include, or correspond to, the predicted propulsor trim value 444 of FIG. 4 or the predicted proprotor nacelle angle trim value 662 of FIG. 6. The target state may include, or correspond to, a target horizontal state (e.g., an airspeed hold state or an acceleration hold state). The aircraft velocity may include, or correspond to, the aircraft velocity 422 of FIG. 4 or the vertical velocity 534 of FIG. 5, and the pitch attitude deviation from the reference may include, or correspond to, the aircraft pitch attitude command 550 of FIG. 5 or the gravity compensated longitudinal acceleration signal 622 of FIG. 6.

The method 1600 includes, at 1604, adjusting a nacelle angle of a proprotor of the aircraft based on the predicted proprotor nacelle trim value. For example, the propulsor actuator 116 adjusts a nacelle pitch angle (in the pitch axis) of a proprotor the aircraft 100 of FIGS. 3A-3D, as described with reference to FIGS. 1, 3A, 4-6, and 13.

In some implementations, the predicted proprotor nacelle trim value indicates an estimated value of a pitch angle of a nacelle of the proprotor that produces a magnitude of thrust for an airspeed hold state or an acceleration hold state of the aircraft. In some implementations, the proprotor nacelle command is output to an actuator and is configured to cause the actuator to adjust a magnitude of proprotor thrust generated by adjusting a direction of the thrust in a pitch axis. In a particular implementation, the proprotor nacelle command is configured to cause the aircraft to operate in an airspeed hold state or an acceleration hold state of the aircraft.

In some implementations, the method 1600 further includes generating the pitch attitude deviation from the reference based on an input pitch command and a selected pitch trim value. For example, the propulsor trim prediction circuitry 404 generates the aircraft pitch attitude command 550 of FIG. 5 and the gravity compensated longitudinal acceleration signal 622 of FIG. 6 based on the pitch attitude input signal 548 and the selected pitch attitude trim value 546.

In some implementations, the method 1600 further includes generating a predicted pitch attitude trim value based on an aircraft velocity and a pitch attitude of the aircraft. The method 1600 includes adjusting an aircraft pitch attitude command based on a pitch attitude input signal and based on the predicted pitch attitude trim value or a commanded pitch attitude trim value. For example, the pitch trim prediction circuitry 402 generates the predicted pitch attitude trim value 442 based on the aircraft velocity 422 and the measured pitch attitude 424 and the pitch command model 506 adjusts the aircraft pitch attitude command 550 (e.g., a previous value of the aircraft pitch attitude command 550 provided as the outer loop feedback signal 948) based on pitch attitude input signal 548 and based on the predicted pitch attitude trim value 442 or the commanded pitch attitude trim value 544, as described with reference to FIG. 9.

In some implementations, the method 1600 further includes operating in a high speed mode. In a particular implementation, operating in the high speed mode includes generating the aircraft pitch attitude command based on the predicted pitch attitude trim value and generating the predicted proprotor nacelle angle trim value 662 based on the pitch attitude trim value 442. For example, the first switch 528 provides the pitch attitude trim value 442 to the pitch command model 506 and to the propulsor trim prediction circuitry 404 based on the regime signal 540 indicating a high speed mode. The pitch command model 506 generates the aircraft pitch attitude command 550 based on the predicted pitch attitude trim value 442 and the propulsor trim prediction circuitry 404 generates the predicted proprotor nacelle angle trim value 662 based on the predicted pitch attitude trim value 442 (or the gravity compensated longitudinal acceleration signal 622, which is generated based on the predicted pitch attitude trim value 442).

Additionally, operating in the high speed mode may further include generating a proprotor nacelle command based on a speed select mode acceleration command and the predicted proprotor nacelle trim value. For example, the propulsor limiting circuitry 518 generates the propulsor command 452 or the nacelle angle command 652 based on the delta nacelle angle command 660 (which is generated based on the speed select mode acceleration command 552) and the predicted proprotor nacelle angle trim value 662, as described with reference to FIGS. 4-6. As another example, the combiner 516 generates the combined propulsor command 564 based on the speed select mode acceleration command 552 and the predicted proprotor nacelle angle trim value 662.

In a particular implementation, generating the speed select mode acceleration command includes generating a pitch independent speed command based on a pitch independent acceleration command. The pitch independent acceleration command is generated based on one or more pilot inputs. Generating the speed select mode acceleration command also includes generating a speed error signal based on subtracting the aircraft velocity from the pitch independent speed command. Generating the speed select mode acceleration command further includes applying a gain to the speed error signal to generate the speed select mode acceleration command. For example, the speed select circuitry 508 generates the pitch independent acceleration command 1032 by performing a table lookup using the v-dot command signal 542 (e.g., thumbwheel inceptor input). The speed select circuitry 508 generates the pitch independent acceleration command error signal 1034 based on the independent acceleration command 1032 and integrates the pitch independent acceleration command error signal 1034 to generate the pitch independent speed command 1038. The speed select circuitry 508 generates the speed error signal 1040 based on subtracting the aircraft velocity 422 from the pitch independent speed command 1038 and applies the velocity error gain F(verr) to the speed error signal 1040 to generate the speed select mode acceleration command 552, as described with reference to FIG. 10.

In some implementations, the method 1600 further includes operating in a low speed mode. In a particular implementation, operating in the low speed mode includes generating the aircraft pitch attitude command based on the commanded pitch attitude trim value and generating the predicted proprotor nacelle trim value based on the commanded pitch attitude trim value. For example, the first switch 528 provides the commanded pitch attitude trim value 544 to the pitch command model 506 and to the propulsor trim prediction circuitry 404 based on the regime signal 540 indicating a low speed mode. The pitch command model 506 generates the aircraft pitch attitude command 550 based on the commanded pitch attitude trim value 544, and the propulsor trim prediction circuitry 404 generates the predicted proprotor nacelle angle trim value 662 based on the commanded pitch attitude trim value 544 (or the gravity compensated longitudinal acceleration signal 622, which is generated based on the commanded pitch attitude trim value 544).

Additionally, operating in the low speed mode may include generating an acceleration command mode acceleration command based on the commanded pitch attitude trim value and generating a proprotor nacelle command based on the acceleration command mode acceleration command and the predicted proprotor nacelle trim value. For example, the first switch 528 provides the commanded pitch attitude trim value 544 acceleration command circuitry 510, and the acceleration command circuitry 510 generates the acceleration command mode acceleration command 554 based on the commanded pitch attitude trim value 544, which is used to generate the nacelle angle command 652, as described with reference to FIGS. 6 and 11.

In a particular implementation, generating the acceleration command mode acceleration command includes generating a pitch independent acceleration command by performing a table lookup based on a pilot input, where the pitch independent acceleration command is generated based on the one or more pilot inputs. Generating the acceleration command mode acceleration command also includes generating a gravity amplified longitudinal acceleration command by performing a table lookup based on a gravity compensated longitudinal acceleration. Generating the acceleration command mode acceleration command further includes generating the acceleration command mode acceleration command based on the pitch independent acceleration command and the gravity amplified longitudinal acceleration command. For example, the acceleration command circuitry 510 generates the pitch independent acceleration command 1032 by performing a table lookup using the v-dot command signal 542 (e.g., thumbwheel inceptor input). The acceleration command circuitry 510 generates the acceleration command mode acceleration command 554 based on combining the pitch independent acceleration command 1032 and the gravity compensated command 1142 generated by the gravity amplifier 1124.

Figure 17:
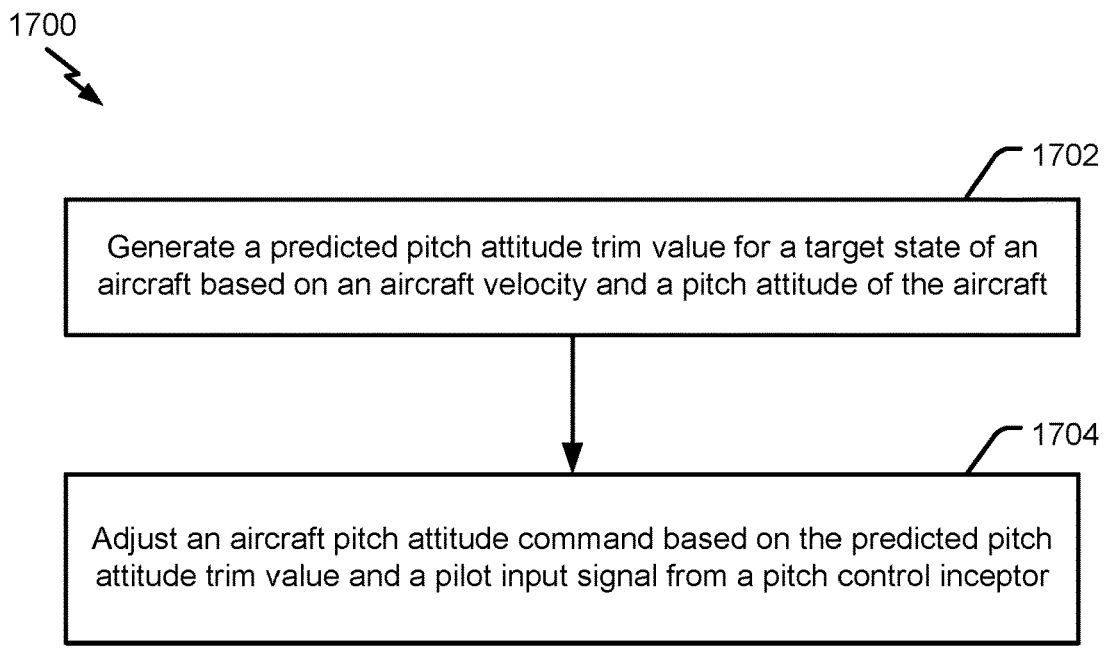
FIG. 17 is a flow chart of an example of a method for controlling an aircraft.

FIG. 17 illustrates a particular example of a method 1700 for controlling an aircraft, such as the aircraft 100 of FIGS. 1, 2A-2D, and 3A-3D. The method 1700 may be performed by a control circuitry or components thereof, such as the control circuitry 130 of FIGS. 1 and 4-14.

The method 1700 includes, at 1702, generating a predicted pitch attitude trim value for a target state of an aircraft based on an aircraft velocity and a pitch attitude of the aircraft. For example, the predicted pitch attitude trim value may include or correspond to the predicted pitch attitude trim value 442 of FIG. 4. The aircraft velocity may include or correspond to the aircraft velocity 422 of FIG. 4, and the pitch attitude may include or correspond to the measured pitch attitude 424 of FIG. 4. To illustrate, the pitch trim prediction circuitry 402 generates the predicted pitch attitude trim value 442 based on the aircraft velocity 422 and the measured pitch attitude 424 for a target vertical state (e.g., an altitude hold state or a vertical speed hold state), as described with reference to FIGS. 4-8.

The method 1700 includes, at 1704, adjusting an aircraft pitch attitude command based on the predicated pitch attitude trim value and a pilot input signal from a pitch control inceptor. For example, the aircraft pitch attitude command may include or correspond to the pitch attitude command 454 of FIG. 4, the aircraft pitch attitude command 550, or the control surface pitch command 558 of FIG. 5. To illustrate, the control surface actuator 410 of FIG. 4 adjusts the control surfaces 128 based on the pitch attitude command 454 and the second pilot input 414 (e.g., the pitch maneuver input) or a pitch control inceptor input used to generate the pitch attitude input signal 548 from the pitch control inceptor 526, as described with reference to FIGS. 4 and 5. Alternatively, the pitch actuators 520 of FIG. 5 adjust the control surfaces 128 based on the control surface pitch command 558, as described with reference to FIGS. 5-8. In a particular implementation, the aircraft pitch attitude command is output by output circuitry that includes or corresponds to the pitch command model 506, the pitch controller 514, or a combination thereof.

In some implementations, generating the aircraft pitch attitude command includes generating an aircraft pitch attitude command error signal based on subtracting commanded aircraft pitch attitude feedback from a selected aircraft trim pitch attitude value. Generating the aircraft pitch attitude command also includes generating a limited aircraft pitch rate command value (e.g., the limited aircraft pitch rate command 936 of FIG. 9) based on the aircraft pitch attitude command error signal. Generating the aircraft pitch attitude command further includes generating an aircraft pitch rate command error signal based on the limited aircraft pitch rate command value, a pitch attitude input signal, and pitch trim feedback, where the aircraft pitch attitude command is generated based on the aircraft pitch rate command error signal. For example, the pitch command model 506 generates the aircraft pitch attitude command 550 as described with reference to FIG. 9.

In some implementations, the method 1700 further includes outputting the predicted pitch attitude trim value to a propulsor trim prediction circuitry, the propulsor trim prediction circuitry configured to generate a predicted propulsor collective blade pitch trim value based on the predicted pitch attitude trim value. For example, the pitch trim prediction circuitry 402 outputs the predicted pitch attitude trim value 442 to the propulsor trim prediction circuitry 404 which generates the predicted propulsor collective blade pitch trim value 562 based on the predicted pitch attitude trim value 442.

In some implementations, the method 1700 further includes outputting the pitch attitude trim value to an acceleration command circuitry, the acceleration command circuitry configured to generate an acceleration command based on the predicted pitch attitude trim value. For example, the pitch trim prediction circuitry 402 outputs the pitch attitude trim value 442 to the acceleration command circuitry 510, which generates the acceleration command mode acceleration command 554 based on the predicted pitch attitude trim value 442.

Figure 18:
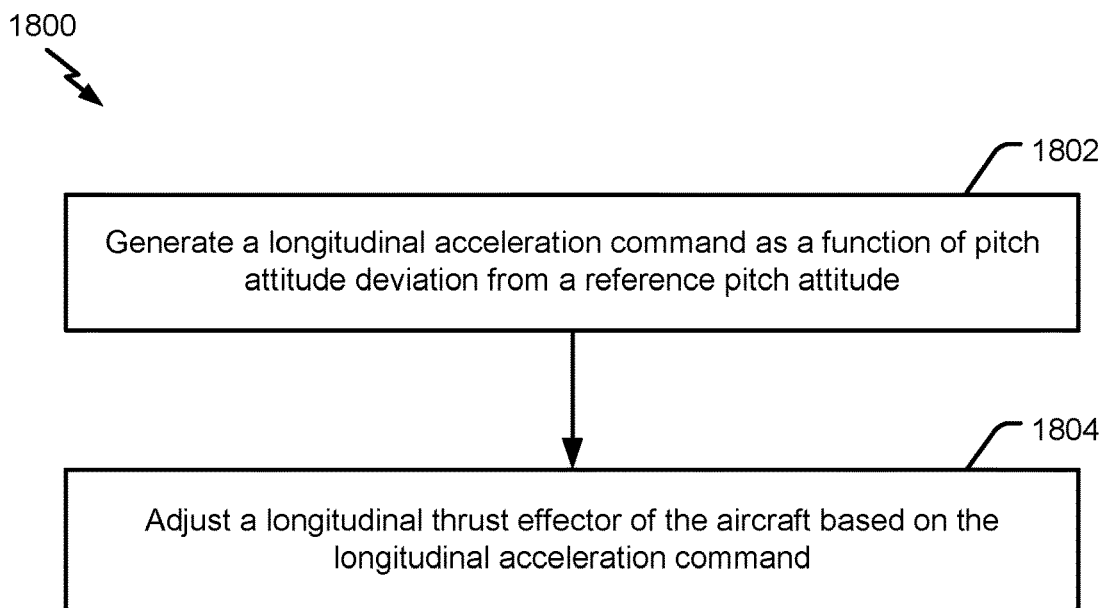
FIG. 18 is a flow chart of an example of a method for controlling an aircraft.

FIG. 18 illustrates a particular example of a method 1800 for controlling an aircraft, such as the aircraft 100 of FIG. 1. The method 1800 may be performed by a control circuitry or components thereof, such as the control circuitry 130 of FIGS. 1 and 4-14, the gravity compensator 612-618 of FIG. 6, or the gravity amplifier 1124 of FIG. 11 or a combination thereof.

The method 1800 includes, at 1802, generating a longitudinal acceleration command as a function of pitch attitude deviation from a reference pitch attitude. For example, the longitudinal acceleration command may include or correspond to the gravity compensated command 1142 of FIG. 11. The pitch attitude deviation may include or correspond to the aircraft pitch attitude command 550 of FIG. 5 or the gravity compensated longitudinal acceleration signal 622 of FIG. 6. To illustrate, the gravity amplifier 1124 generates the gravity compensated command 1142 by performing a table lookup using the gravity compensated longitudinal acceleration signal 622.

The method 1800 includes, at 1804, adjusting a longitudinal thrust effector of the aircraft based on the longitudinal acceleration command. For example, the propulsor actuator 116 adjusts a collective blade pitch angle of a propulsor (e.g., a propeller) of the aircraft 100 of FIGS. 2A-2D or a nacelle angle of a proprotor of the aircraft 100 of FIGS. 3A-3D based on the gravity compensated command 1142, as described with reference to FIGS. 1, 2A, 3A, 4, 5, and 13. Alternatively, the propulsor actuator 116 adjusts a nacelle angular rate, a nozzle size, a nozzle direction, a fuel flow rate, a bypass ratio, thrust bleeding, or thrust vectoring, etc. of one or more of the propulsors 112, 114 of the aircraft 100 based on the gravity compensated command 1142.

Figure 19:
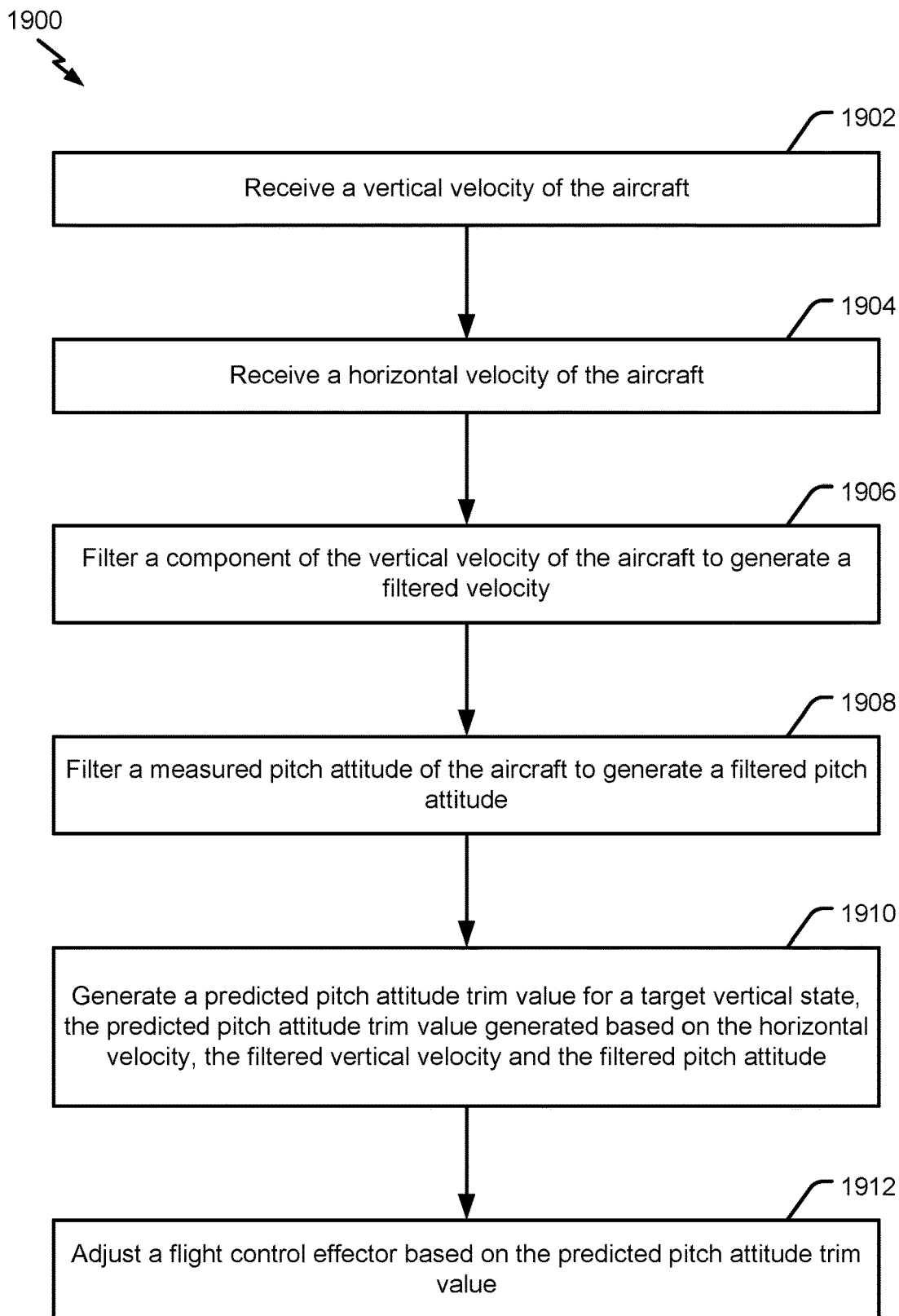
FIG. 19 is a flow chart of an example of a method of controlling an aircraft.

FIG. 19 illustrates a particular example of a method 1900 for controlling an aircraft, such as the aircraft 100 of FIGS. 1, 2A-2D, and 3A-3D. The method 1900 may be performed by a control circuitry or components thereof, such as the control circuitry 130 of FIGS. 1 and 4-14.

The method 1900 includes, at 1902, receiving a vertical velocity of the aircraft. For example, the vertical velocity may include or correspond to the vertical velocity 534 of FIG. 5. The method 1900 includes, at 1904, receiving a horizontal velocity of the aircraft. For example, the vertical velocity may include or correspond to the aircraft velocity 422 (e.g., the horizontal velocity) of FIG. 4. To illustrate, the pitch trim prediction circuitry 402 receives the vertical velocity 534 and the aircraft velocity 422 (e.g., the horizontal velocity) from the sensors 132 of FIG. 1 or from the FCC 126 of FIG. 1.

The method 1900 includes, at 1906, filtering a component of the vertical velocity of the aircraft to generate a filtered vertical velocity. For example, the first low pass filter 704 and the first combiner 706 function to high pass filter the inverted vertical velocity 732, as described with reference to FIGS. 7 and 8.

The method 1900 includes, at 1908, filtering a measured pitch attitude of the aircraft to generate a filtered pitch attitude. For example, the second low pass filter 724 low pass filters the measured pitch attitude 424 to generate the low pass filtered pitch attitude signal 752 (a low pass filtered measured pitch attitude signal), as described with reference to FIGS. 7 and 8.

The method 1900 includes, at 1910, generating a predicted pitch attitude trim value for a target vertical state, the predicted pitch attitude trim value generated based on the horizontal velocity, the filtered vertical velocity, and the filtered pitch attitude. For example, the fourth combiner 730 generates the predicted pitch attitude trim value 442 based on combining at least the filtered aircraft trim pitch deviation signal 750 (generated based on the high pass filtered vertical velocity signal 736 and the aircraft velocity 422 (e.g., the horizontal velocity)) and the low pass filtered pitch attitude signal 752.

The method 1900 includes, at 1912, adjusting a flight control effector based on the predicted pitch attitude trim value. For example, the control surface actuator 410 or the pitch actuator 520 adjusts one or more control surfaces 128 based on the pitch attitude command 454 or the control surface pitch command 558 (e.g., an aircraft pitch control surface aircraft pitch attitude command) respectively, which are generated based on the predicted pitch attitude trim value 442. In some implementations, the flight control effector includes or corresponds to a flight control surface (e.g., the control surfaces 128) or a propulsor (e.g., the propulsors 112, 114). In a particular implementation, the target vertical state is a vertical speed hold state or an altitude hold state.

In some implementations, the flight control effector includes or corresponds to a flight control surface (e.g., the control surface 128) of the aircraft. Additionally or alternatively, the flight control surface includes or corresponds to an elevator, a flaps, a slat, an aileron (e.g., a flaperon), a spoiler, a tab, or another pitch attitude control surface. In such implementations, adjusting the flight control surface based on the predicted pitch attitude trim value includes generating a pitch attitude command for the target vertical state based on the predicted pitch attitude trim value and adjusting the flight control surface of the aircraft based on the pitch attitude command. For example, the processing circuitry 408 generates the pitch attitude command 454 for the target vertical state based on the predicted pitch attitude trim value 442 and the control surface actuator 410 adjusts the control surface 128 of the aircraft based on the pitch attitude command 454.

In some implementations, the method 1900 further includes generating a longitudinal thrust effector command for a target horizontal state based on the predicted pitch attitude trim value and adjusting a longitudinal thrust effector of the aircraft based on the longitudinal thrust effector command. For example, the processing circuitry 406 generates the propulsor command 452 for a target horizontal state based on the predicted pitch attitude trim value 442 and the propulsor actuator 116 adjusts one or more of the propulsors 112, 114 of the aircraft 100 based on the propulsor command 452.

In some implementations, the flight control effector is a longitudinal thrust effector of the aircraft and the method 1900 further includes generating a predicted longitudinal thrust effector trim value for a target horizontal state based on the predicted pitch attitude trim value, generating a longitudinal thrust effector command for the target horizontal state based on the predicted longitudinal thrust effector trim value, and adjusting the longitudinal thrust effector of the aircraft based on the longitudinal thrust effector command. For example, the propulsor trim prediction circuitry 404 generates the predicted propulsor trim value (e.g., one of the trim values 562, 662) for a target horizontal state based on the predicted pitch attitude trim value 442, the propulsor limiting circuitry 518 generates the propulsor command 452 for the target horizontal state based on the combined propulsor command 564 (which is generated based on the predicted propulsor trim value (e.g., one of the trim values 562, 662)), and the propulsor actuator 116 adjusts one or more of the propulsors 112, 114 of the aircraft 100 based on the propulsor command 452. In some implementation, the longitudinal thrust effector (e.g., a propulsor) includes or corresponds a propeller, a proprotor, a ducted fan, a contra-rotating fan, a turbojet engine, a turbofan engine, or another longitudinal thrust effector.

In some implementations, the method 1900 further includes generating a second predicted pitch attitude trim value for a second target vertical state and generating a commanded pitch attitude trim value based on a pilot input. For example, the pitch trim prediction circuitry 402 generates a second predicted pitch attitude trim value 442 for a second target vertical state and the integrator 504 generates the commanded pitch attitude trim value 544 based on a pilot input (e.g., a pitch trim inceptor input) to the pitch trim inceptor 524. The second predicted pitch attitude trim value 442 is generated at a second time that is after a first time when the predicted pitch attitude trim value 442 was generated. In a particular implementation, the method 1900 also includes selecting, based on a regime control signal, the commanded pitch attitude trim value as a selected pitch attitude trim value and adjusting the flight control effector based on the selected pitch attitude trim value and independent of the second predicted pitch attitude trim value. For example, the first switch 528 selects, based on the regime signal 540, the commanded pitch attitude trim value 544 and outputs the commanded pitch attitude trim value 544 as the selected pitch attitude trim value 546. A particular pitch actuator 520 adjusts a particular control surface 128 based on the selected pitch attitude trim value 546 and independent of the second predicted pitch attitude trim value 442. Additionally or alternatively, a particular propulsor actuator 116 adjusts a particular propulsor based on the selected pitch attitude trim value 546 and independent of the second predicted pitch attitude trim value 442.

In some implementations, the method 1900 further includes generating a vertical flight path angle signal based on a selected airspeed and the filtered vertical velocity. For example, the first multiplier 708 generates the vertical flight path angle signal 744 based on the inverse selected speed 748 and the low pass filtered vertical velocity signal 734. As another example, the divider 802 generates the vertical flight path angle signal 744 based on the selected speed 746 and the low pass filtered vertical velocity signal 734.

In some implementations, the method 1900 further includes filtering the high pass filtered vertical velocity to generate a filtered vertical acceleration, dividing the filtered vertical acceleration by an inverted selected speed to generate a time rate of change of flight path angle signal, multiplying the time rate of change of flight path angle signal by a vertical damping derivative to generate a damped signal, where the predicted pitch attitude trim value is generated further based on the damped signal. For example, the circuitry 710 applies a gain of the inverse of the time constant to the high pass filtered vertical velocity signal 736 to generate the filtered vertical acceleration 738. The multiple 712 multiplies the filtered vertical acceleration 738 by the inverse selected speed 748 to generate the time rate of change of flight path angle signal 740. The vertical damping derivative (Zw) circuitry 714 divides the time rate of change of flight path angle signal 740 by a vertical damping derivative (Zw) to generate the first signal 742, which is used to generate the predicted pitch attitude trim value 442.

In some implementations, the method 1900 further includes generating a filtered aircraft trim pitch deviation signal based on combining a vertical flight path angle and the first signal, where generating the predicted pitch attitude trim value for the target vertical state includes combining at least the filtered aircraft trim pitch deviation signal and the filtered pitch attitude. For example, the second combiner 716 generates the filtered aircraft trim pitch deviation signal 750 based on combining the vertical flight path angle signal 744 and the first signal 742. The fourth combiner 730 generates the predicted pitch attitude trim value 442 for the target vertical state by combining at least the filtered aircraft trim pitch deviation signal 750 and the low pass filtered pitch attitude signal 752.

In some implementations, the method 1900 further includes filtering the high pass vertical velocity to generate a filtered vertical acceleration and dividing the filtered vertical acceleration by a normalized dimensional aircraft vertical force per angle of attack derivative to generate a normalized signal, where the predicted pitch attitude trim value is generated further based on the normalized signal. For example, the gain circuitry 710 multiplies the high pass filtered vertical velocity signal 736 by a gain of the inverse of the time constant to generate the filtered vertical acceleration 738 and the normalized dimensional aircraft vertical force per angle of attack derivative ($Z\alpha$) circuitry 804 divides the filtered vertical acceleration 738 by the normalized dimensional aircraft vertical force per angle of attack derivative ($Z\alpha$) to generate the normalized signal 812.

In some implementations, the method 1900 further includes generating a filtered aircraft trim pitch deviation signal based on combining a vertical flight path angle and the normalized signal, where generating the predicted pitch attitude trim value for the target vertical state includes combining at least the filtered aircraft trim pitch deviation signal and the filtered pitch attitude. For example, the second combiner 716 generates the filtered aircraft trim pitch deviation signal 750 based on combining the vertical flight path angle signal 744 and the normalized signal 812. The fourth combiner 730 generates the predicted pitch attitude trim value 442 for the target vertical state based on combining at least the filtered aircraft trim pitch deviation signal 750 and the filtered pitch attitude signal 752.

In some implementations, generating the aircraft pitch attitude command includes generating an aircraft pitch attitude command error signal based on subtracting commanded aircraft pitch attitude feedback from a selected aircraft trim pitch attitude value, generating a limited aircraft pitch rate command value based on the aircraft pitch attitude command error signal and generating an aircraft pitch rate command error signal based on the limited aircraft pitch rate command value, a pitch attitude input signal, and pitch trim feedback, where the aircraft pitch attitude command is generated based on the aircraft pitch rate command error signal. For example, the first combiner 914 generates the aircraft pitch attitude command error signal 932 based on subtracting the outer loop feedback signal 948 from the selected pitch attitude trim value 546. The first authority limiter 918 generates the limited aircraft pitch rate command 936 based on the aircraft pitch attitude command error signal 932. The second combiner 920 generates the aircraft pitch rate command error signal 940 based on the limited aircraft pitch rate command 936, the pitch attitude input signal 548, and the inner loop feedback signal 938 (pitch trim feedback). The pitch command model generates the aircraft pitch attitude command 550 based on the aircraft pitch rate command error signal 940, as described with reference to FIG. 9. The aircraft pitch attitude command 550 indicates a pitch attitude deviation from a reference pitch attitude (e.g., a deviation from the pitch attitude input signal 548 by the predicted pitch attitude trim value 442 or the commanded pitch attitude trim value 544 of the selected pitch attitude trim value 546).

In some implementations, generating the aircraft pitch attitude command includes generating an aircraft pitch attitude command error signal based on subtracting commanded aircraft pitch attitude feedback from a selected aircraft trim pitch attitude value. Generating the aircraft pitch attitude command includes generating an aircraft pitch trim rate feedback signal by applying a gain to the aircraft pitch attitude command error signal. Generating the aircraft pitch attitude command also includes generating a limited aircraft pitch rate command value based on limiting the aircraft pitch trim rate feedback signal. Generating the aircraft pitch attitude command includes generating an aircraft pitch rate command error signal based on the limited aircraft pitch rate command value, a pitch attitude input signal, and pitch trim feedback. Generating the aircraft pitch attitude command also includes amplifying the aircraft pitch rate command error signal to generate an amplified aircraft pitch rate command error signal. Generating the aircraft pitch attitude command includes generating a pitch angular acceleration command based on limiting the amplified aircraft pitch rate command error signal. Generating the aircraft pitch attitude command also includes integrating the pitch angular acceleration command to generate a pitch rate command. Generating the aircraft pitch attitude command includes applying a coordination transformation to the pitch rate command to generate a pitch attitude rate command. Generating the aircraft pitch attitude command further includes integrating the pitch attitude rate command to generate the aircraft pitch attitude command. For example, the pitch command model 506 generates the aircraft pitch attitude command 550 as described with reference to FIG. 9.

Figure 20:
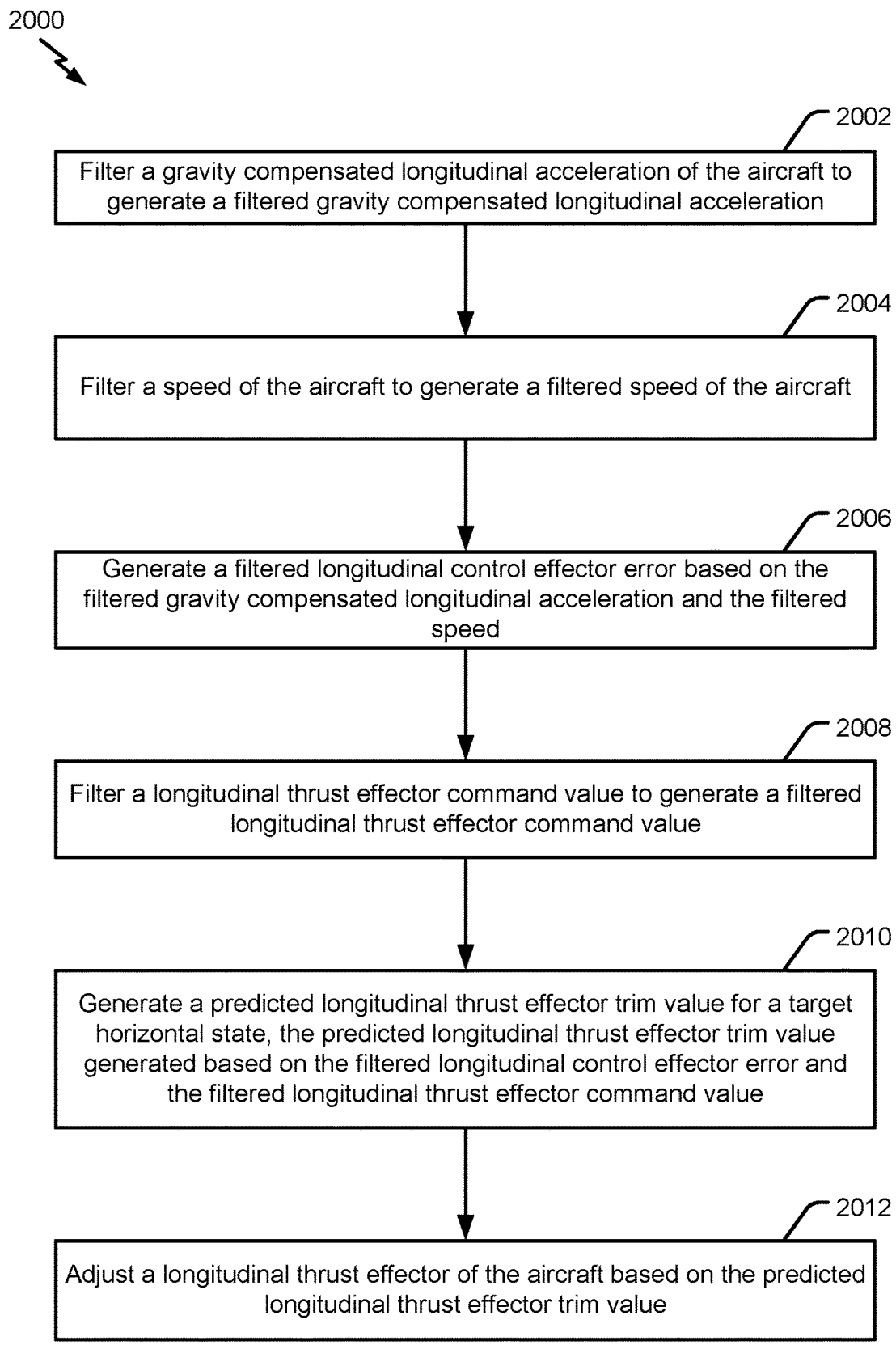
FIG. 20 is a flow chart of an example of a method of controlling an aircraft.

FIG. 20 illustrates a particular example of a method 2000 of method for controlling an aircraft, such as the aircraft 100 of FIGS. 1, 2A-2D, and 3A-3D. The method 2000 may be performed by a control circuitry or components thereof, such as the control circuitry 130 of FIGS. 1 and 4-14.

The method 2000 includes, at 2002, filtering a gravity compensated longitudinal acceleration of the aircraft to generate a filtered gravity compensated longitudinal acceleration. For example, the gravity compensated longitudinal acceleration may include, or correspond to, the gravity compensated longitudinal acceleration signal 622 of FIG. 6. The filtered gravity compensated longitudinal acceleration may include, or correspond to, the high pass filtered gravity compensated longitudinal acceleration signal 1344 of FIG. 13. To illustrate, the first low pass filter 1312 and the first combiner 1322 function to high pass filter the gravity compensated longitudinal acceleration signal 622 to generate the high pass filtered gravity compensated longitudinal acceleration signal 1344, as described with reference to FIG. 13.

The method 2000 includes, at 2004, filtering a speed of the aircraft to generate a filtered speed of the aircraft. For example, the speed may include, or correspond to, the aircraft velocity 422 of FIG. 4, such as a horizontal velocity. To illustrate, the second low pass filter 1314 and the second combiner 1324 function to high pass filter the aircraft velocity 422 to generate the high pass filtered aircraft velocity 1348, as described with reference to FIG. 13.

The method 2000 includes, at 2006, generating a filtered longitudinal control effector error based on the filtered gravity compensated longitudinal acceleration and the filtered speed. For example, the third combiner 1326 combines the high pass filtered gravity compensated longitudinal acceleration signal 1344 and the filtered acceleration feedback 1350 (which is generated based on the high pass filtered aircraft velocity 1348) to generate the offset value 1352 and the divider 1332 divides the offset value 1352 by the propulsor sensitivity value 1242 to generate the filtered longitudinal control effector error 1356, as described with reference to FIG. 13.

The method 2000 includes, at 2008, filtering a longitudinal thrust effector command value to generate a filtered longitudinal thrust effector command value. For example, the longitudinal thrust effector command value includes, or corresponds to, the propulsor feedback value 432 of FIG. 4, the propulsor collective blade pitch feedback 566 of FIG. 5, or the nacelle angle feedback 664 of FIG. 6. To illustrate, the third low pass filter 1316 low pass filters the propulsor collective blade pitch feedback 566 to generate the low pass filtered propulsor collective blade pitch feedback 1358, as described with reference to FIG. 13. In other implementations, the filtered longitudinal thrust effector command value is a low pass filtered longitudinal thrust effector command value generated based on a measured value determined based on sensor data, as opposed to feedback value, as explained with reference to FIG. 4.

The method 2000 includes, at 2010, generating a predicted longitudinal thrust effector trim value for a target horizontal state, the predicted longitudinal thrust effector trim value generated based on the filtered longitudinal control effector error and the filtered longitudinal thrust effector command value. For example, the predicted longitudinal thrust effector trim value includes or corresponds to the predicted propulsor trim value 444 of FIG. 4, the predicted propulsor collective blade pitch trim value 562 of FIG. 5, or the predicted proprotor nacelle angle trim value 662 of FIG. 6. To illustrate, the fourth combiner 1328 generates the 562 based on combining the filtered longitudinal control effector error 1356 (generated based on the offset value 1352) and the low pass filtered propulsor collective blade pitch feedback 1358.

The method 2000 includes, at 2012, adjusting a longitudinal thrust effector of the aircraft based on the predicted longitudinal thrust effector trim value. For example, the propulsor actuator 116 adjusts one or more components of the propulsors 112, 114 based on the propulsor command 452 (which is generated based on the predicted propulsor trim value 444), as described with reference to FIG. 4.

In some implementations, the longitudinal thrust effector of the aircraft includes or corresponds to a propeller, a proprotor, a rotor, a ducted fan, a contra-rotating propeller, a turbojet engine, a turbofan engine, or a rocket. In a particular implementation, the target horizontal state includes or corresponds to an airspeed hold state or an acceleration hold state.

In some implementations, the longitudinal thrust effector is adjusted by an actuator. For example, the propulsors 112, 114 are adjusted by the propulsor actuator 116, as described with reference to FIG. 1. In a particular implementation, the actuator includes, or corresponds to, a propulsor collective actuator, a propulsor cyclic actuator, a nacelle actuator, a propulsor nozzle actuator, or a fuel flow rate actuator. Additionally or alternatively, adjusting the longitudinal thrust effector causes the aircraft to operate in the airspeed hold state or the acceleration hold state.

In a particular implementation, generating the gravity compensated longitudinal acceleration includes generating a pitch attitude deviation from a reference by subtracting a sine value of a selected trim pitch attitude value and a sine value of a commanded pitch attitude and generating the gravity compensated longitudinal acceleration by multiplying the pitch attitude deviation from the reference by an acceleration due to gravity constant. For example, the combiner 616 generates the longitudinal acceleration signal 1138 by subtracting the sine value of the selected pitch attitude trim value 1134 and the sine of the aircraft pitch attitude command 1136. The gravity multiplier 618 generates the gravity compensated longitudinal acceleration signal 622 by multiplying the longitudinal acceleration signal 1138 by the acceleration due to gravity constant (e.g., approximately 9.8 meters per second squared).

In some implementations, the selected pitch attitude trim value 546 is generated based on a predicted pitch attitude trim value 442 for a target vertical state, such as when the control circuitry 130 is operating in a high speed mode and the regime signal 540 indicates the high speed mode, as described with reference to FIG. 5.

In some implementations, the longitudinal thrust effector command value is a measured value determined based on sensor data or a feedback value including a prior longitudinal thrust effector command value. For example, the propulsor feedback value 432 is either generated based on sensor data from the sensors 132 of FIG. 1 or is generated based on a previous value (e.g., a feedback value) of the propulsor command 452, as described with reference to FIG. 4.

In some implementations, the method 2000 further includes generating an offset value based on subtracting the filtered acceleration feedback from the filtered gravity compensated longitudinal acceleration, where generating the filtered longitudinal control effector error includes dividing the offset value by a propeller sensitivity value, and where generating the predicted longitudinal thrust effector trim value includes combining the filtered longitudinal control effector error and the filtered longitudinal thrust effector command value. For example, the third combiner 1326 generates the offset value 1352 by subtracting the filtered acceleration feedback 1350 from the filtered gravity compensated longitudinal acceleration signal 1344 and divider 1332 divides the offset value by the propulsor sensitivity value 1242 to generate the filtered longitudinal control effector error 1356. The fourth combiner 1328 generates the predicted propulsor collective blade pitch trim value 562 by combining the filtered longitudinal control effector error 1356 and the low pass filtered propulsor collective blade pitch feedback 1358.

In some implementations, the method 2000 further includes generating the propeller sensitive value by performing a table lookup to a propeller sensitivity schedule based on the speed of the aircraft or a propeller rotational speed. For example, the propulsor sensitivity scheduler 1222 generates the propulsor sensitivity value 1242 by performing a table lookup to the propeller sensitivity schedule based on the aircraft velocity 422.

In some implementations, the method 2000 further includes generating a longitudinal thrust effector command for the target horizontal state. In a particular implementation, generating the longitudinal thrust effector command for the target horizontal state includes generating the predicted longitudinal thrust effector trim value based on combining a filtered longitudinal control effector error and the filtered longitudinal thrust effector command value, the filtered longitudinal control effector error generated based on the offset value, combining a delta propulsor command with the predicted longitudinal thrust effector trim value to generate a combined propulsor command, and limiting the combined propulsor command to generate the longitudinal thrust effector command. For example, the fourth combiner 1328 generates the predicted propulsor collective blade pitch trim value 562 based on combining the filtered longitudinal control effector error 1356 and the low pass filtered propulsor collective blade pitch feedback 1358, the combiner 516 combines the delta propulsor collective blade pitch command 560 with the predicted propulsor collective blade pitch trim value 562 to generate the combined propulsor command 564, and the propulsor limiting circuitry 518 limits the combined propulsor command 564 to generate the propulsor command 452.

In some implementations, the delta propulsor command is generated based on the speed select mode acceleration command. For example, the acceleration controller 512 receives the speed select mode acceleration command from the second switch 530 based on the regime signal 540 indicating the high speed regime or mode. In such implementations, generating the speed select mode acceleration command 552 includes performing a table lookup based on a pilot input to generate a pitch independent acceleration command and generating a pitch independent speed command based on the pitch independent acceleration command. For example, the speed select circuitry 508 performs a table lookup based on the v-dot command signal 542 (which is generated based on a pilot input to the thrust inceptor 522) to generate the pitch independent acceleration command 1032 and the integrator 1022 generates the pitch independent speed command 1038 based on the pitch independent acceleration command 1032 by integrating the pitch independent acceleration command error signal 1034. Generating the speed select mode acceleration command 552 further includes generating a speed error signal based on subtracting the speed of the aircraft from the pitch independent speed command, applying a gain to the speed error signal to generate a speed feedback acceleration command, and outputting the speed select mode acceleration command to a switch. For example, the second combiner 1024 generates the speed error signal 1040 based on subtracting the aircraft velocity 422 from the pitch independent speed command 1038, and the second amplifier 1026 applies the velocity error gain (F(verr)) to the speed error signal 1040 to generate the speed select mode acceleration command 552 and outputs the speed select mode acceleration command 552 to the second switch 530.

In some implementations, generating the speed select mode acceleration command further includes generating a washout signal based on the speed error signal and generating a pitch independent acceleration command error signal based on subtracting the washout signal from the pitch independent acceleration command. For example, the third amplifier 1030 (e.g., a washout amplifier) receives the limited speed error feedback signal 1044 and applies the washout gain Kwo to the limited speed error feedback signal 1044 to generate the washout signal 1046 and the first combiner 1016 subtracts the washout signal 1046 from the pitch independent acceleration command 1032 to generate the pitch independent acceleration command error signal 1034. In a particular implementation, generating the pitch independent speed command 1038 includes integrating the pitch independent acceleration command error signal 1034 to generate the pitch independent speed command 1038.

In some implementations, the delta propulsor command is generated based on the acceleration command mode acceleration command, and the method 2000 further includes generating the acceleration command mode acceleration command based on a pitch independent acceleration command and a gravity amplified longitudinal acceleration command. For example, the acceleration command circuitry 510 generates the acceleration command mode acceleration command 554 based on the pitch independent acceleration command 1032 and a gravity compensated command 1142, as described with reference to FIG. 11. In a particular implementation, the pitch independent acceleration command 1032 is generated based on a pilot input. For example, the thrust inceptor 522 receives a pilot input and generates the v-dot command signal 542 based on the pilot input.

In some implementations, the method 2000 further includes providing an acceleration command to a combiner as an acceleration feedforward command. For example, the acceleration controller 512 provides the selected acceleration command 556 to the second combiner 1218 as the feedforward acceleration command 1232. The acceleration command corresponds to the speed select mode acceleration command 552 or the acceleration command mode acceleration command 554. The method 2000 includes generating an acceleration error signal based on the acceleration command and a measured acceleration of the aircraft. For example, the first combiner 1212 generates the acceleration error signal 1234 based on combining the selected acceleration command 556 and the measured acceleration of the aircraft, i.e., the input v-dot 1230. The method 2000 includes applying gain to the acceleration error signal to generate an acceleration feedback command. For example, the first amplifier 1214 applies acceleration feedback gain (Kvdfb) to the acceleration error signal 1234 to generate the acceleration feedback command 1236. The method 2000 includes authority limiting the acceleration feedback command to generate a limited acceleration feedback command. For example, the authority limiter 1216 limits the acceleration feedback command 1236 to generate the limited acceleration feedback command 1238 based on one or more authority limit thresholds. The method 2000 includes generating, by the combiner, a combined acceleration command based on the limited acceleration feedback command and the feedforward acceleration command. For example, the combiner 1218 generates the combined acceleration command 1240 based on combining the limited acceleration feedback command 1238 and the feedforward acceleration command 1232. The method 2000 includes generating the delta propulsor command based on dividing the combined acceleration command by a propulsor thrust sensitivity value, where the propulsor command is generated further based on the delta propulsor command. For example, the divider 1220 generates the delta propulsor collective blade pitch command 560 based on dividing the combined acceleration command 1240 by the propulsor sensitivity value 1242.

The methods 1500-2000 of FIGS. 15-20 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1500 of FIG. 15 can be initiated or controlled by one or more processors, such as one or more processors included in a control system. In some implementations, a portion of one of the methods FIGS. 15-20 may be combined with a second portion of one of the methods of FIGS. 15-20. Additionally, one or more operations described with reference to the FIGS. 15-20 may be optional, may be performed at least partially concurrently, and/or may be performed in a different order than shown or described.

Figure 21:
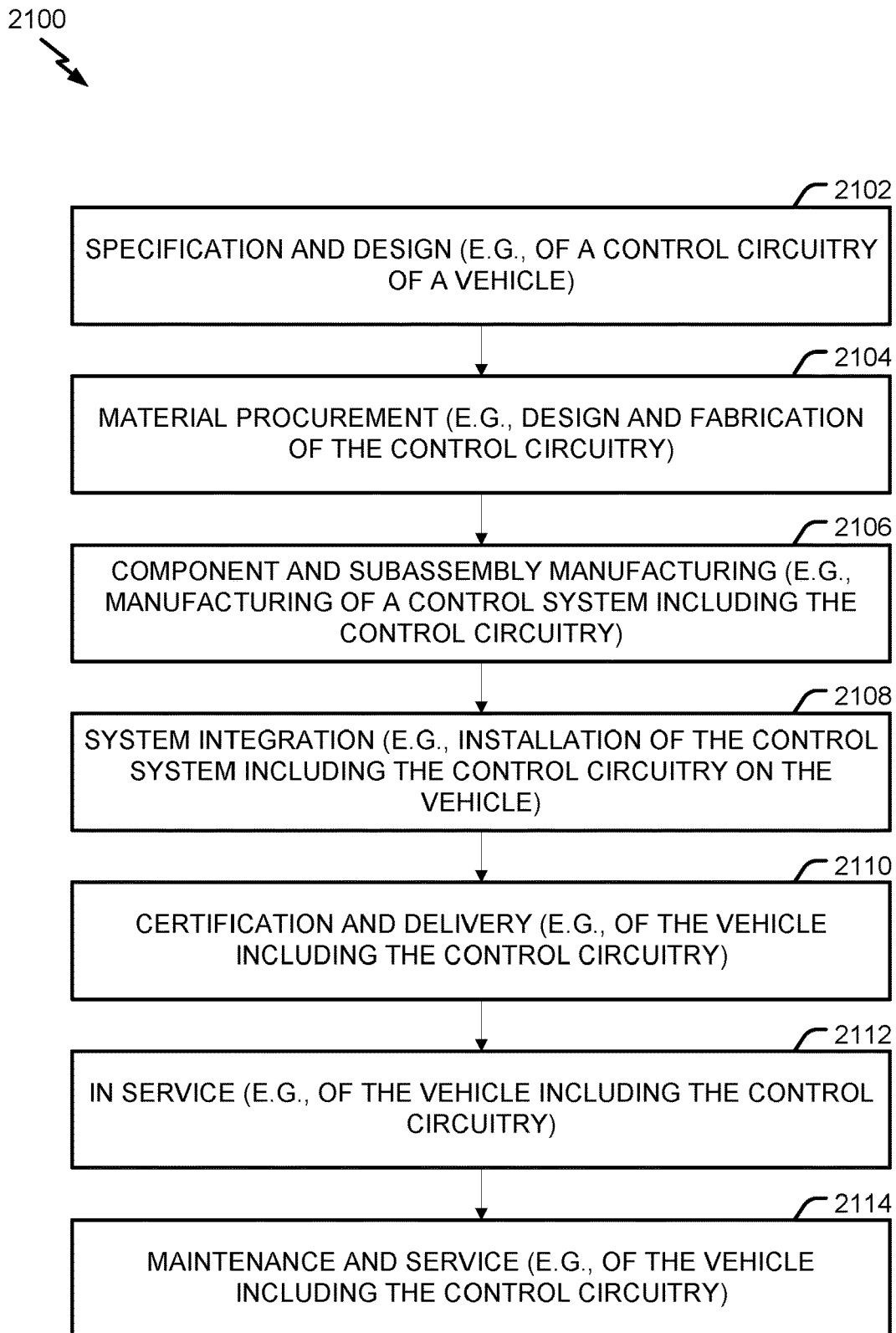
FIG. 21 is a flow chart of an example of a method of operating a control circuitry manufacturing system.
Figure 22:
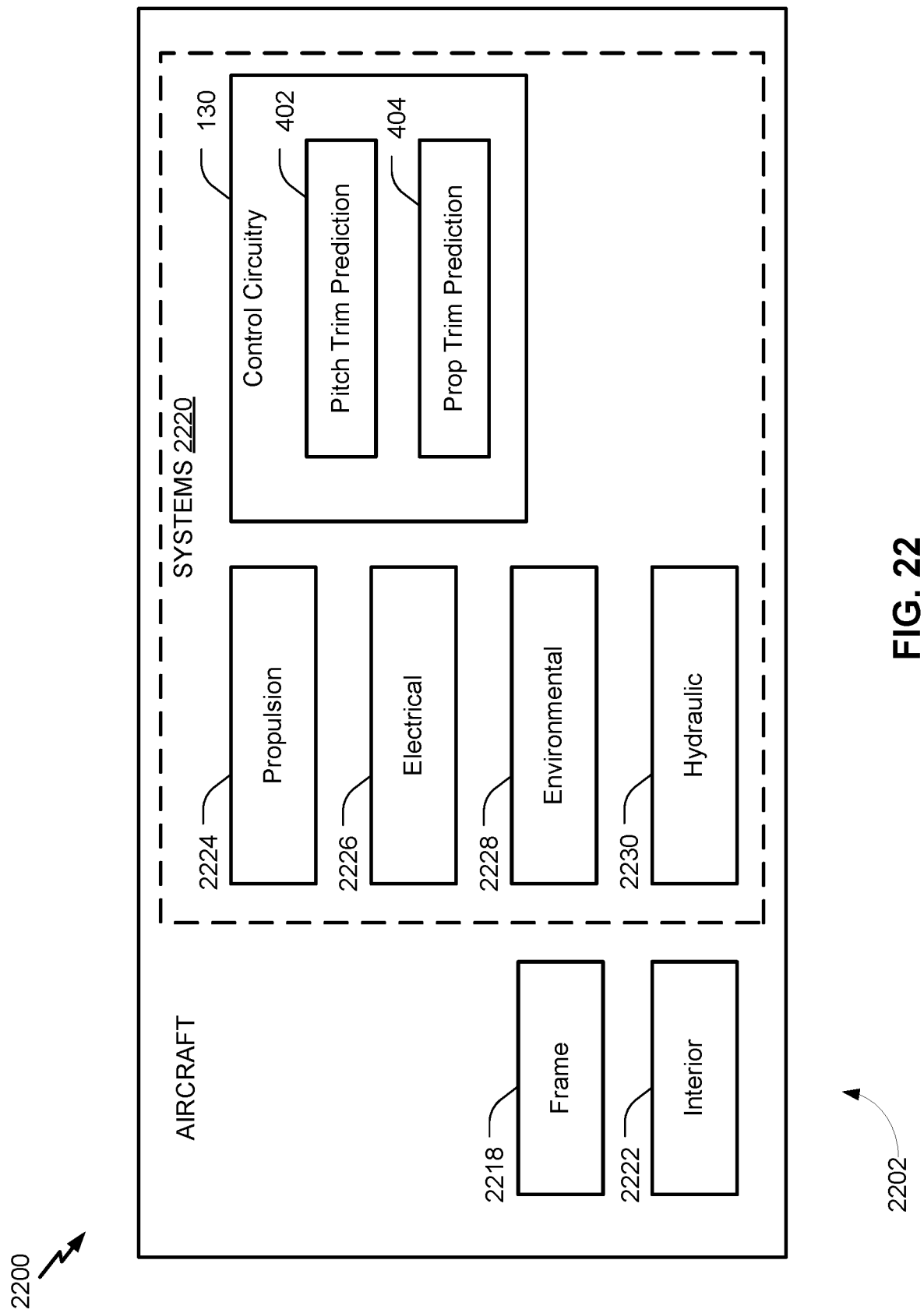
FIG. 22 is a block diagram that illustrates an example of a vehicle including a control circuitry.

Referring to FIGS. 21 and 22, examples of the disclosure are described in the context of a vehicle manufacturing and service method 2100 as illustrated by the flow chart of FIG. 21 and a vehicle 2202 as illustrated by the block diagram 2200 of FIG. 22. A vehicle produced by the vehicle manufacturing and service method 2100 of FIG. 21, such as the vehicle 2202 of FIG. 22, may include an aircraft, an airship, a rocket, a satellite, a submarine, or another vehicle, as illustrative, non-limiting examples. The vehicle 2202 may be manned or unmanned (e.g., a drone or an unmanned aerial vehicle (UAV)).

Referring to FIG. 21, a flowchart of an illustrative example of a method of control circuitry manufacturing and service is shown and designated 2100. During pre-production, the exemplary method 2100 includes, at 2102, specification and design of a vehicle, such as a vehicle 2202 described with reference to FIG. 22. During the specification and design of the vehicle 2202, the method 2100 may include specifying a design of a control circuitry, such as the control circuitry 130 of FIG. 1. At 2104, the method 2100 includes material procurement. For example, the method 2100 may include procuring materials for the control circuitry of the vehicle 2202.

During production, the method 2100 includes, at 2106, component and subassembly manufacturing and, at 2108, system integration of the vehicle 2202. The method 2100 may include component and subassembly manufacturing (e.g., manufacturing and or programming the control circuitry 130 of FIG. 1) of the vehicle 2202 and system integration (e.g., coupling the control circuitry 130 of FIG. 1 to one or more components of the vehicle 2202). At 2110, the method 2100 includes certification and delivery of the vehicle 2202 and, at 2112, placing the vehicle 2202 in service. Certification and delivery may include certifying the control circuitry 130 of FIG. 1 by inspection or non-destructive testing. While in service by a customer, the vehicle 2202 may be scheduled for routine maintenance and service (which may also include modification, reconfiguration, refurbishment, and so on). At 2114, the method 2100 includes performing maintenance and service on the vehicle 2202. The method 2100 may include performing maintenance and service of the control circuitry 130. For example, maintenance and service of the communications system may include replacing the control circuitry 130 or updating the control circuitry 130.

Each of the processes of the method 2100 may be performed or carried out by a system integrator, a third party, and/or an operator (e.g., a customer). For the purposes of this description, a system integrator may include without limitation any number of vehicle manufacturers and major-system subcontractors; a third party may include without limitation any number of vendors, subcontractors, and suppliers; and an operator may be an airline, leasing company, military entity, service organization, and so on.

Referring to FIG. 22, a block diagram 2200 of an illustrative implementation of the vehicle 2202 that includes a control circuitry, such as the control circuitry 130 of FIG. 1. To illustrate, the vehicle 2202 may include an aircraft, as an illustrative, non-limiting example. The vehicle 2202 may have been produced by at least a portion of the method 2100 of FIG. 21. As shown in FIG. 22, the vehicle 2202 (e.g., the aircraft 100 of FIG. 1) includes an airframe 2218, an interior 2222, the control circuitry 130, and a plurality of systems 2220. The plurality of systems 2220 may include one or more of a propulsion system 2224, an electrical system 2226, an environmental system 2228, or a hydraulic system 2230. The control circuitry 130 may include the pitch trim prediction circuitry 402, the propulsor trim prediction circuitry 404, or both. The control circuitry 130 (or components thereof) may be configured to perform one or more steps of the methods 1500-2000 of FIGS. 15-20 and/or as described with reference to FIG. 1.

Apparatus and methods included herein may be employed during any one or more of the stages of the method 2100 of FIG. 21. For example, components or subassemblies corresponding to production process 2108 may be fabricated or manufactured in a manner similar to components or subassemblies produced while the vehicle 2202 is in service, at 2112 for example and without limitation. Also, one or more apparatus implementations, method implementations, or a combination thereof may be utilized during the production stages (e.g., stages 2102-2110 of the method 2100), for example, by substantially expediting assembly of or reducing the cost of the vehicle 2202. Similarly, one or more of apparatus implementations, method implementations, or a combination thereof, may be utilized while the vehicle 2202 is in service, at 2112 for example and without limitation, to maintenance and service, at 2114.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system for an aircraft, the system comprising:
    a longitudinal thrust effector;
    control circuitry coupled to the longitudinal thrust effector, wherein the control circuitry comprises:
        a first filter configured to filter a gravity compensated longitudinal acceleration of the aircraft to generate a filtered gravity compensated longitudinal acceleration;
        a second filter configured to generate a filtered speed of the aircraft based on a speed of the aircraft;
        intermediary circuitry configured to generate a filtered longitudinal control effector error based on the gravity compensated longitudinal acceleration and the filtered speed;
        a third filter configured to generate a filtered longitudinal thrust effector command value based on a longitudinal thrust effector command value; and
        output circuitry configured to generate a predicted longitudinal thrust effector trim value for a target horizontal state, the predicted longitudinal thrust effector trim value generated based on the filtered longitudinal control effector error and the filtered longitudinal thrust effector command value; and an actuator coupled to the control circuitry and the longitudinal thrust effector, wherein the actuator is configured to receive a command based on the predicted longitudinal thrust effector trim value and adjust the longitudinal thrust effector based on the command.

2. The system of claim 1, wherein the longitudinal thrust effector comprises a propeller, a proprotor, a rotor, a ducted fan, a contra-rotating propeller, a turbojet engine, a turbofan engine, or a rocket, and wherein the target horizontal state includes an airspeed hold state or an acceleration hold state.

3. The system of claim 1, wherein the actuator comprises a propulsor collective actuator, a propulsor cyclic actuator, a nacelle actuator, a propulsor nozzle actuator, or a fuel flow rate actuator, and wherein adjustment of the longitudinal thrust effector is configured to cause the aircraft to operate in an airspeed hold state or an acceleration hold state.

4. The system of claim 1, wherein the first filter comprises a high pass filter configured to generate a high pass filtered gravity compensated longitudinal acceleration based on high pass filtering the gravity compensated longitudinal acceleration.

5. The system of claim 4, wherein the first filter includes:
a low pass filter configured to low pass filter the gravity compensated longitudinal acceleration to generate a low pass filtered gravity compensated longitudinal acceleration; and
a combiner configured to subtract the low pass filtered gravity compensated longitudinal acceleration from the gravity compensated longitudinal acceleration to generate the high pass filtered gravity compensated longitudinal acceleration.

6. The system of claim 1, wherein the speed of the aircraft comprises a horizontal velocity of the aircraft, and wherein the second filter comprises a high pass filter configured to generate a high pass filtered speed of the aircraft based on high pass filtering the speed of the aircraft.

7. The system of claim 6, further comprising a gain circuitry configured to generate a filtered acceleration feedback of the aircraft based on multiplying the high pass filtered speed of the aircraft by a gain value of an inverse of a time constant of the control circuitry, wherein the filtered longitudinal control effector error is generated based on the filtered acceleration feedback.

8. The system of claim 1, wherein the third filter comprises a low pass filter configured to low pass filter the longitudinal thrust effector command value to generate a low pass filtered longitudinal thrust effector command value.

9. A method of controlling an aircraft, the method comprising:
filtering a gravity compensated longitudinal acceleration of the aircraft to generate a filtered gravity compensated longitudinal acceleration;
filtering a speed of the aircraft to generate a filtered speed of the aircraft;
generating a filtered longitudinal control effector error based on the gravity compensated longitudinal acceleration and the filtered speed;
filtering a longitudinal thrust effector command value to generate a filtered longitudinal thrust effector command value;
generating a predicted longitudinal thrust effector trim value for a target horizontal state, the predicted longitudinal thrust effector trim value generated based on the filtered longitudinal control effector error and the filtered longitudinal thrust effector command value; and
adjusting a longitudinal thrust effector of the aircraft based on the predicted longitudinal thrust effector trim value.

10. The method of claim 9, wherein generating the gravity compensated longitudinal acceleration comprises:
applying a sine function to a selected trim pitch attitude value to generate a sine of the selected trim pitch attitude value;
applying a sine function to a pitch attitude command to generate a sine of the pitch attitude command;
generating a longitudinal acceleration signal by subtracting the sine of the selected trim pitch attitude value from the sine of the pitch attitude command; and
generating the gravity compensated longitudinal acceleration by multiplying the longitudinal acceleration signal by an acceleration due to gravity constant.

11. The method of claim 10, wherein the selected trim pitch attitude value is generated based on a predicted pitch attitude trim value for a target vertical state.

12. The method of claim 9, wherein the longitudinal thrust effector command value comprises a measured value determined based on sensor data or a feedback value comprising a prior longitudinal thrust effector command value.

13. The method of claim 9, further comprising generating an offset value based on subtracting a filtered acceleration feedback from the filtered gravity compensated longitudinal acceleration, wherein generating the filtered longitudinal control effector error includes dividing the offset value by a propeller sensitivity value, and wherein generating the predicted longitudinal thrust effector trim value includes combining the filtered longitudinal control effector error and the filtered longitudinal thrust effector command value.

14. The method of claim 13, further comprising generating the propeller sensitivity value by performing a table lookup to a propeller sensitivity schedule based on the speed of the aircraft or a propeller rotational speed.

15. The method of claim 9, further comprising generating a longitudinal thrust effector command for the target horizontal state, wherein generating the longitudinal thrust effector command for the target horizontal state includes:
generating the predicted longitudinal thrust effector trim value based on combining the filtered longitudinal control effector error and the filtered longitudinal thrust effector command value;
combining a delta propulsor command with the predicted longitudinal thrust effector trim value to generate a combined propulsor command; and
limiting the combined propulsor command to generate the longitudinal thrust effector command, wherein the longitudinal thrust effector of the aircraft is adjusted based on the longitudinal thrust effector command.

16. The method of claim 15, further comprising generating the delta propulsor command based on a speed select mode acceleration command or an acceleration command mode acceleration command.

17. The method of claim 16, wherein the delta propulsor command is generated based on the speed select mode acceleration command, and further comprising generating the speed select mode acceleration command, wherein generating the speed select mode acceleration command includes:
performing a table lookup based on a pilot input to generate a pitch independent acceleration command;
generating a pitch independent speed command based on the pitch independent acceleration command;

generating a speed error signal based on subtracting the speed of the aircraft from the pitch independent speed command;

applying a gain to the speed error signal to generate the speed select mode acceleration command; and outputting the speed select mode acceleration command to a switch.

18. The method of claim 17, wherein generating the speed select mode acceleration command further includes:

generating a washout signal based on the speed error signal; and generating a pitch independent acceleration command error signal based on subtracting the washout signal from the pitch independent acceleration command, wherein generating the pitch independent speed command includes integrating the pitch independent acceleration command error signal to generate a pitch independent speed command.

19. The method of claim 16, wherein the delta propulsor command is generated based on the acceleration command mode acceleration command, and further comprising generating the acceleration command mode acceleration command based on a pitch independent acceleration command and a gravity amplified longitudinal acceleration command, wherein the pitch independent acceleration command is generated based on a pilot input.

20. The method of claim 15, further comprising:

providing an acceleration command to a combiner as an acceleration feedforward command, wherein the acceleration command corresponds to a speed select mode acceleration command or an acceleration command mode acceleration command;

generating an acceleration error signal based on the acceleration command and a measured acceleration of the aircraft;

applying gain to the acceleration error signal to generate an acceleration feedback command;

authority limiting the acceleration feedback command to generate a limited acceleration feedback command;

generating, by the combiner, a combined acceleration command based on the limited acceleration feedback command and the feedforward acceleration command; and generating the delta propulsor command based on dividing the combined acceleration command by a propulsor thrust sensitivity value.

\* \* \* \* \*